United States Patent
Buller et al.

(10) Patent No.: US 10,144,176 B1
(45) Date of Patent: Dec. 4, 2018

(54) THREE-DIMENSIONAL PRINTING SYSTEMS AND METHODS OF THEIR USE

(71) Applicant: Velo3D, Inc., Campbell, CA (US)

(72) Inventors: Benyamin Buller, Cupertino, CA (US); Zachary Ryan Murphree, San Jose, CA (US)

(73) Assignee: VELO3D, INC., Campbell, CA (US)

( * ) Notice: Subject to any disclaimer, the term of this patent is extended or adjusted under 35 U.S.C. 154(b) by 0 days.

(21) Appl. No.: 15/871,763

(22) Filed: Jan. 15, 2018

(51) Int. Cl.
| | |
|---|---|
| *B33Y 10/00* | (2015.01) |
| *B22F 3/105* | (2006.01) |
| *B29C 64/286* | (2017.01) |
| *B29C 64/245* | (2017.01) |
| *B29C 64/268* | (2017.01) |
| *B29C 64/232* | (2017.01) |
| *B29C 64/25* | (2017.01) |
| *B29C 64/214* | (2017.01) |
| *B29C 64/255* | (2017.01) |
| *B33Y 30/00* | (2015.01) |
| *B33Y 70/00* | (2015.01) |

(52) U.S. Cl.
CPC .......... *B29C 64/286* (2017.08); *B22F 3/1055* (2013.01); *B29C 64/232* (2017.08); *B29C 64/245* (2017.08); *B29C 64/25* (2017.08); *B29C 64/268* (2017.08); *B22F 2003/1057* (2013.01); *B29C 64/214* (2017.08); *B29C 64/255* (2017.08); *B33Y 30/00* (2014.12); *B33Y 70/00* (2014.12)

(58) Field of Classification Search
CPC ... B29C 64/286; B29C 64/245; B29C 64/264; B29C 64/232; B29C 64/25; B29C 64/214; B29C 64/255; B22F 3/1055; B22F 2003/1057; B33Y 70/00; B33Y 30/00
See application file for complete search history.

(56) References Cited

U.S. PATENT DOCUMENTS

| | | |
|---|---|---|
| 430,047 A | 6/1890 | Tylee |
| 3,790,787 A | 2/1974 | Geller |
| 3,864,809 A | 2/1975 | Donachie |
| 4,177,087 A | 12/1979 | Hills et al. |
| 4,323,756 A | 4/1982 | Brown et al. |
| 4,359,622 A | 11/1982 | Dostoomian et al. |

(Continued)

FOREIGN PATENT DOCUMENTS

| | | |
|---|---|---|
| CN | 101835554 A | 9/2010 |
| CN | 102076456 A | 5/2011 |

(Continued)

OTHER PUBLICATIONS

Adam, et al. Design for additive manufacturing—element transitions and aggregated structures. CIRP Journal of Manufacturing Science and Technology. Nov. 2014; 7:20-28.

(Continued)

*Primary Examiner* — Nahida Sultana
(74) *Attorney, Agent, or Firm* — Wilson Sonsini Goodrich & Rosati; Ronit Buller

(57) ABSTRACT

The present disclosure describes three-dimensional (3D) printing apparatuses, processes, software, and systems for producing high quality 3D objects. Described herein are printing apparatuses that facilitate control of energy beam characteristics using an optical mask during one or more printing operations.

30 Claims, 17 Drawing Sheets

(56) References Cited

U.S. PATENT DOCUMENTS

| | | |
|---|---|---|
| 4,823,158 A | 4/1989 | Casey et al. |
| 4,863,538 A | 9/1989 | Deckard |
| 4,927,582 A | 5/1990 | Bryson |
| 4,938,816 A | 7/1990 | Beaman et al. |
| 4,961,154 A | 10/1990 | Pomerantz et al. |
| 4,962,988 A | 10/1990 | Swann |
| 5,088,047 A | 2/1992 | Bynum |
| 5,127,037 A | 6/1992 | Bynum |
| 5,155,321 A | 10/1992 | Grube et al. |
| 5,156,697 A | 10/1992 | Bourell et al. |
| 5,162,660 A | 11/1992 | Popil |
| 5,202,837 A | 4/1993 | Coe et al. |
| 5,203,944 A | 4/1993 | Prinz et al. |
| 5,204,055 A | 4/1993 | Sachs et al. |
| 5,208,431 A | 5/1993 | Uchiyama et al. |
| 5,252,264 A | 10/1993 | Forderhase et al. |
| 5,255,057 A | 10/1993 | Stelter et al. |
| 5,286,573 A | 2/1994 | Prinz et al. |
| 5,296,062 A | 3/1994 | Bourell et al. |
| 5,303,141 A | 4/1994 | Batchelder et al. |
| 5,342,919 A | 8/1994 | Dickens, Jr. et al. |
| 5,352,405 A | 10/1994 | Beaman et al. |
| 5,354,414 A | 10/1994 | Feygin |
| 5,387,380 A | 2/1995 | Cima et al. |
| 5,393,482 A | 2/1995 | Benda et al. |
| 5,396,333 A | 3/1995 | Aleshin et al. |
| 5,430,666 A | 7/1995 | Deangelis et al. |
| 5,460,758 A | 10/1995 | Langer et al. |
| 5,508,489 A | 4/1996 | Benda et al. |
| 5,527,877 A | 6/1996 | Dickens, Jr. et al. |
| 5,534,104 A | 7/1996 | Langer et al. |
| 5,536,467 A | 7/1996 | Reichle et al. |
| 5,582,876 A | 12/1996 | Langer et al. |
| 5,593,531 A | 1/1997 | Penn |
| 5,594,652 A | 1/1997 | Penn et al. |
| 5,647,931 A | 7/1997 | Retallick et al. |
| 5,648,450 A | 7/1997 | Dickens, Jr. et al. |
| 5,658,412 A | 8/1997 | Retallick et al. |
| 5,665,401 A | 9/1997 | Serbin et al. |
| 5,730,925 A | 3/1998 | Mattes et al. |
| 5,733,497 A | 3/1998 | McAlea et al. |
| 5,745,834 A | 4/1998 | Bampton et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,786,562 A | 7/1998 | Larson |
| 5,818,718 A | 10/1998 | Thomas et al. |
| 5,821,475 A | 10/1998 | Morehead et al. |
| 5,824,259 A | 10/1998 | Allanic et al. |
| 5,832,415 A | 11/1998 | Wilkening et al. |
| 5,876,550 A | 3/1999 | Feygin et al. |
| 5,876,767 A | 3/1999 | Mattes et al. |
| 5,904,890 A | 5/1999 | Lohner et al. |
| 5,908,569 A | 6/1999 | Wilkening et al. |
| 5,932,059 A | 8/1999 | Langer et al. |
| 5,951,864 A | 9/1999 | Hazrati et al. |
| 6,042,774 A | 3/2000 | Wilkening et al. |
| 6,066,285 A | 5/2000 | Kumar |
| 6,085,122 A | 7/2000 | Manning |
| 6,106,659 A | 8/2000 | Spence et al. |
| 6,126,276 A | 10/2000 | Davis et al. |
| 6,136,257 A | 10/2000 | Graf et al. |
| 6,143,378 A | 11/2000 | Harwell et al. |
| 6,151,345 A | 11/2000 | Gray |
| 6,169,605 B1 | 1/2001 | Penn et al. |
| 6,175,422 B1 | 1/2001 | Penn et al. |
| 6,206,672 B1 | 3/2001 | Grenda |
| 6,207,097 B1 | 3/2001 | Iverson |
| 6,215,093 B1 | 4/2001 | Meiners et al. |
| 6,251,488 B1 | 6/2001 | Miller et al. |
| 6,261,077 B1 | 7/2001 | Bishop et al. |
| 6,268,584 B1 | 7/2001 | Keicher et al. |
| 6,336,480 B2 | 1/2002 | Gaylo et al. |
| 6,337,459 B1 | 1/2002 | Terwijn et al. |
| 6,376,148 B1 | 4/2002 | Liu et al. |
| 6,391,251 B1 | 5/2002 | Keicher et al. |
| 6,483,596 B1 | 11/2002 | Philippi et al. |
| 6,492,651 B2 | 12/2002 | Kerekes |
| 6,531,086 B1 | 3/2003 | Larsson |
| 6,554,600 B1 | 4/2003 | Hofmann et al. |
| 6,583,379 B1 | 6/2003 | Meiners et al. |
| 6,636,676 B1 | 10/2003 | Renn |
| 6,656,409 B1 | 12/2003 | Keicher et al. |
| 6,656,410 B2 | 12/2003 | Hull et al. |
| 6,672,343 B1 | 1/2004 | Perret et al. |
| 6,682,688 B1 | 1/2004 | Higashi et al. |
| 6,688,886 B2 | 2/2004 | Hughes et al. |
| 6,722,872 B1 | 4/2004 | Swanson et al. |
| 6,767,499 B1 | 7/2004 | Hory et al. |
| 6,811,744 B2 | 11/2004 | Keicher et al. |
| 6,814,823 B1 | 11/2004 | White |
| 6,815,636 B2 | 11/2004 | Chung et al. |
| 6,823,124 B1 | 11/2004 | Renn et al. |
| 6,824,714 B1 | 11/2004 | Tuerck et al. |
| 6,861,613 B1 | 3/2005 | Meiners et al. |
| 6,905,645 B2 | 6/2005 | Iskra |
| 6,930,278 B1 | 8/2005 | Chung et al. |
| 6,932,935 B1 | 8/2005 | Oberhofer et al. |
| 6,945,638 B2 | 9/2005 | Teung et al. |
| 6,949,216 B2 | 9/2005 | Brice et al. |
| 6,955,023 B2 | 10/2005 | Rotheroe |
| 6,986,654 B2 | 1/2006 | Imiolek et al. |
| 6,989,115 B2 | 1/2006 | Russell et al. |
| 6,994,894 B2 | 2/2006 | Hofmeister |
| 7,008,209 B2 | 3/2006 | Iskra et al. |
| 7,027,887 B2 | 4/2006 | Gaylo et al. |
| 7,045,015 B2 | 5/2006 | Renn et al. |
| 7,047,098 B2 | 5/2006 | Lindemann et al. |
| 7,073,442 B2 | 7/2006 | Fedor et al. |
| 7,084,370 B2 | 8/2006 | Hagemeister et al. |
| 7,108,894 B2 | 9/2006 | Renn |
| 7,149,596 B2 | 12/2006 | Berger et al. |
| 7,153,463 B2 | 12/2006 | Leuterer et al. |
| 7,229,272 B2 | 6/2007 | Leuterer et al. |
| 7,241,415 B2 | 7/2007 | Khoshnevis |
| 7,261,542 B2 | 8/2007 | Hickerson et al. |
| 7,261,550 B2 | 8/2007 | Herzog |
| 7,270,844 B2 | 9/2007 | Renn |
| 7,294,366 B2 | 11/2007 | Renn et al. |
| 7,326,377 B2 | 2/2008 | Adams |
| 7,419,632 B2 | 9/2008 | Keller |
| 7,435,368 B2 | 10/2008 | Davidson et al. |
| 7,452,500 B2 | 11/2008 | Uckelmann |
| 7,454,262 B2 | 11/2008 | Larsson |
| 7,485,345 B2 | 2/2009 | Renn et al. |
| 7,515,986 B2 | 4/2009 | Huskamp |
| 7,521,652 B2 | 4/2009 | Chung et al. |
| 7,537,722 B2 | 5/2009 | Andersson et al. |
| 7,540,738 B2 | 6/2009 | Larsson et al. |
| 7,604,768 B2 | 10/2009 | Kritchman |
| 7,615,179 B2 | 11/2009 | Dumond et al. |
| 7,628,600 B2 | 12/2009 | Perret |
| 7,635,825 B2 | 12/2009 | Larsson |
| 7,639,267 B1 | 12/2009 | Desimone et al. |
| 7,658,163 B2 | 2/2010 | Renn et al. |
| 7,661,948 B2 | 2/2010 | Perret et al. |
| 7,665,979 B2 | 2/2010 | Heugel |
| 7,674,107 B2 | 3/2010 | Perret et al. |
| 7,674,671 B2 | 3/2010 | Renn et al. |
| 7,686,605 B2 | 3/2010 | Perret et al. |
| 7,704,432 B2 | 4/2010 | Dumond et al. |
| 7,713,048 B2 | 5/2010 | Perret et al. |
| 7,713,454 B2 | 5/2010 | Larsson |
| 7,740,683 B2 | 6/2010 | Thorsson et al. |
| 7,741,578 B2 | 6/2010 | Adams et al. |
| 7,789,037 B2 | 9/2010 | Teulet et al. |
| 7,799,253 B2 | 9/2010 | Hochsmann et al. |
| 7,820,241 B2 | 10/2010 | Perret et al. |
| 7,833,465 B2 | 11/2010 | Larsson |
| 7,837,458 B2 | 11/2010 | Perret et al. |
| 7,847,212 B2 | 12/2010 | Renz et al. |
| 7,850,885 B2 | 12/2010 | Philippi et al. |
| 7,863,544 B2 | 1/2011 | Serruys et al. |
| 7,871,551 B2 | 1/2011 | Wallgren et al. |

(56) References Cited

U.S. PATENT DOCUMENTS

| | | |
|---|---|---|
| 7,879,394 B1 | 2/2011 | Keicher et al. |
| 7,891,095 B2 | 2/2011 | Jonsson et al. |
| 7,901,604 B2 | 3/2011 | Oberhofer et al. |
| 7,931,462 B2 | 4/2011 | Mattes |
| 7,936,352 B2 | 5/2011 | Baran et al. |
| 7,938,079 B2 | 5/2011 | King et al. |
| 7,938,341 B2 | 5/2011 | Renn et al. |
| 7,946,840 B2 | 5/2011 | Perret et al. |
| 7,976,302 B2 | 7/2011 | Halder et al. |
| 7,987,813 B2 | 8/2011 | Renn et al. |
| 7,991,465 B2 | 8/2011 | Bartic et al. |
| 8,025,831 B2 | 9/2011 | Kong et al. |
| 8,031,384 B2 | 10/2011 | Perret et al. |
| 8,034,279 B2 | 10/2011 | Dimter et al. |
| 8,048,359 B2 | 11/2011 | Wang et al. |
| 8,073,315 B2 | 12/2011 | Philippi |
| 8,075,814 B2 | 12/2011 | Fruth et al. |
| 8,083,513 B2 | 12/2011 | Montero-Escuder et al. |
| 8,110,247 B2 | 2/2012 | Renn et al. |
| 8,124,192 B2 | 2/2012 | Paasche et al. |
| 8,132,744 B2 | 3/2012 | Renn et al. |
| 8,137,739 B2 | 3/2012 | Philippi et al. |
| 8,172,562 B2 | 5/2012 | Mattes |
| 8,186,414 B2 | 5/2012 | Furlong et al. |
| 8,186,990 B2 | 5/2012 | Perret et al. |
| 8,187,521 B2 | 5/2012 | Larsson et al. |
| 8,187,522 B2 | 5/2012 | Higashi et al. |
| 8,249,480 B2 | 8/2012 | Aslam et al. |
| 8,260,447 B2 | 9/2012 | Mattes et al. |
| 8,272,579 B2 | 9/2012 | King et al. |
| 8,299,208 B2 | 10/2012 | Muller et al. |
| 8,303,886 B2 | 11/2012 | Philippi |
| 8,308,466 B2 | 11/2012 | Ackelid et al. |
| 8,313,087 B2 | 11/2012 | Hesse et al. |
| 8,317,508 B2 | 11/2012 | Bokodi et al. |
| 8,366,432 B2 | 2/2013 | Perret et al. |
| 8,414,281 B2 | 4/2013 | Schleiss et al. |
| 8,455,051 B2 | 6/2013 | Renn et al. |
| 8,488,994 B2 | 7/2013 | Hanson et al. |
| 8,501,075 B2 | 8/2013 | Philippi et al. |
| 8,502,107 B2 | 8/2013 | Uckelmann |
| 8,524,142 B2 | 9/2013 | Uckelmann et al. |
| 8,525,071 B2 | 9/2013 | Leuterer |
| 8,556,981 B2 | 10/2013 | Jones et al. |
| 8,570,534 B1 | 10/2013 | Loewgren |
| 8,590,157 B2 | 11/2013 | Kruth et al. |
| 8,640,975 B2 | 2/2014 | King |
| 8,658,078 B2 | 2/2014 | Weidinger et al. |
| 8,705,144 B2 | 4/2014 | Gullentops et al. |
| 8,710,144 B2 | 4/2014 | Hesse et al. |
| 8,728,387 B2 | 5/2014 | Jones et al. |
| 8,734,694 B2 | 5/2014 | Perret et al. |
| 8,753,105 B2 | 6/2014 | Scott |
| 8,784,720 B2 | 7/2014 | Oberhofer et al. |
| 8,784,721 B2 | 7/2014 | Philippi et al. |
| 8,794,263 B2 | 8/2014 | Scott et al. |
| 8,796,146 B2 | 8/2014 | Renn et al. |
| 8,803,073 B2 | 8/2014 | Philippi |
| 8,845,319 B2 | 9/2014 | Oberhofer et al. |
| 8,884,186 B2 | 11/2014 | Uckelmann et al. |
| 8,887,658 B2 | 11/2014 | Essien et al. |
| 8,895,893 B2 | 11/2014 | Perret et al. |
| 8,906,216 B2 | 12/2014 | Detor et al. |
| 8,915,620 B2 | 12/2014 | Vaes et al. |
| 8,967,990 B2 | 3/2015 | Weidinger et al. |
| 8,968,625 B2 | 3/2015 | Tan |
| 8,994,592 B2 | 3/2015 | Scott et al. |
| 9,011,982 B2 | 4/2015 | Muller et al. |
| 9,037,068 B2 | 5/2015 | Kojima |
| 9,064,671 B2 | 6/2015 | Ljungblad et al. |
| 9,073,265 B2 | 7/2015 | Snis |
| 9,079,248 B2 | 7/2015 | Ackelid |
| 9,114,478 B2 | 8/2015 | Scott et al. |
| 9,114,652 B1 | 8/2015 | Wayman |
| 9,117,039 B1 | 8/2015 | Mosterman et al. |
| 9,126,167 B2 | 9/2015 | Ljungblad |
| 9,162,393 B2 | 10/2015 | Ackelid |
| 9,162,394 B2 | 10/2015 | Ackelid |
| 9,192,054 B2 | 11/2015 | King et al. |
| 9,205,691 B1 | 12/2015 | Jones et al. |
| 9,221,100 B2 | 12/2015 | Schwarze et al. |
| 9,233,507 B2 | 1/2016 | Bibas |
| 9,254,535 B2 | 2/2016 | Buller et al. |
| 9,272,369 B2 | 3/2016 | Bruck et al. |
| 9,308,583 B2 | 4/2016 | El-Dasher et al. |
| 9,314,972 B2 | 4/2016 | Green |
| 9,327,450 B2 | 5/2016 | Hein et al. |
| 9,327,451 B2 | 5/2016 | Teulet |
| 9,346,127 B2 | 5/2016 | Buller et al. |
| 9,366,422 B2 | 6/2016 | McClure et al. |
| 9,399,256 B2 | 7/2016 | Buller et al. |
| 9,403,235 B2 | 8/2016 | Buller et al. |
| 9,415,443 B2 | 8/2016 | Ljungblad et al. |
| 9,486,878 B2 | 11/2016 | Buller et al. |
| 9,498,921 B2 | 11/2016 | Teulet et al. |
| 9,505,057 B2 | 11/2016 | Nordkvist et al. |
| 9,522,426 B2 | 12/2016 | Das et al. |
| 9,527,246 B2 | 12/2016 | Wiesner et al. |
| 9,533,452 B2 | 1/2017 | Guenster et al. |
| 9,550,207 B2 | 1/2017 | Ackelid et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,592,554 B2 | 3/2017 | Abe et al. |
| 9,662,840 B1 | 5/2017 | Buller et al. |
| 9,676,145 B2 | 6/2017 | Buller et al. |
| 9,757,760 B2 | 9/2017 | Halder et al. |
| 9,827,717 B2 | 11/2017 | Huang et al. |
| 9,835,568 B2 | 12/2017 | Woods et al. |
| 9,886,526 B2 | 2/2018 | Huang et al. |
| 9,919,360 B2 | 3/2018 | Buller et al. |
| 9,919,476 B2 | 3/2018 | Paternoster et al. |
| 1,003,518 A1 | 7/2018 | Weilhammer et al. |
| 1,003,530 A1 | 7/2018 | Reinarz et al. |
| 2002/0020945 A1 | 2/2002 | Cho et al. |
| 2002/0041818 A1 | 4/2002 | Abe et al. |
| 2002/0079601 A1 | 6/2002 | Russell et al. |
| 2002/0090410 A1 | 7/2002 | Tochimoto et al. |
| 2002/0104973 A1 | 8/2002 | Kerekes |
| 2002/0145213 A1 | 10/2002 | Liu et al. |
| 2002/0152002 A1 | 10/2002 | Lindemann et al. |
| 2002/0158054 A1 | 10/2002 | Manetsberger et al. |
| 2002/0195747 A1 | 12/2002 | Hull et al. |
| 2003/0201255 A1 | 10/2003 | Manetsberger et al. |
| 2003/0222066 A1 | 12/2003 | Low et al. |
| 2003/0232512 A1 | 12/2003 | Dickinson et al. |
| 2004/0003738 A1 | 1/2004 | Imiolek et al. |
| 2004/0003741 A1 | 1/2004 | Iskra et al. |
| 2004/0004303 A1 | 1/2004 | Iskra |
| 2004/0004653 A1 | 1/2004 | Pryor et al. |
| 2004/0005182 A1 | 1/2004 | Gaylo et al. |
| 2004/0026807 A1 | 2/2004 | Andersson et al. |
| 2004/0045941 A1 | 3/2004 | Herzog et al. |
| 2004/0056022 A1 | 3/2004 | Meiners et al. |
| 2004/0061260 A1 | 4/2004 | Heugel |
| 2004/0084814 A1 | 5/2004 | Boyd et al. |
| 2004/0094728 A1 | 5/2004 | Herzog et al. |
| 2004/0099996 A1 | 5/2004 | Herzog |
| 2004/0118309 A1 | 6/2004 | Fedor et al. |
| 2004/0173946 A1 | 9/2004 | Pfeifer et al. |
| 2004/0179808 A1 | 9/2004 | Renn |
| 2004/0197493 A1 | 10/2004 | Renn et al. |
| 2004/0204785 A1 | 10/2004 | Richardson |
| 2004/0217095 A1 | 11/2004 | Herzog |
| 2004/0222549 A1 | 11/2004 | Sano et al. |
| 2004/0228004 A1 | 11/2004 | Sercel et al. |
| 2004/0262261 A1 | 12/2004 | Fink et al. |
| 2005/0035285 A1 | 2/2005 | Tan et al. |
| 2005/0116391 A1 | 6/2005 | Lindemann et al. |
| 2005/0133527 A1 | 6/2005 | Dullea et al. |
| 2005/0142024 A1 | 6/2005 | Herzog |
| 2005/0156991 A1 | 7/2005 | Renn |
| 2005/0163917 A1 | 7/2005 | Renn |
| 2005/0186716 A1 | 8/2005 | Kasumi |

(56) References Cited

U.S. PATENT DOCUMENTS

| | | |
|---|---|---|
| 2005/0207901 A1 | 9/2005 | Klobucar et al. |
| 2005/0258570 A1 | 11/2005 | Kong et al. |
| 2005/0278933 A1 | 12/2005 | Macke, Jr. et al. |
| 2005/0287031 A1 | 12/2005 | Macke, Jr. et al. |
| 2006/0003095 A1 | 1/2006 | Bullen et al. |
| 2006/0019232 A1 | 1/2006 | Fischer et al. |
| 2006/0054079 A1 | 3/2006 | Withey et al. |
| 2006/0118532 A1 | 6/2006 | Chung et al. |
| 2006/0156978 A1 | 7/2006 | Lipson et al. |
| 2006/0192322 A1 | 8/2006 | Abe et al. |
| 2006/0208396 A1 | 9/2006 | Abe et al. |
| 2006/0228248 A1 | 10/2006 | Larsson |
| 2006/0249485 A1 | 11/2006 | Partanen et al. |
| 2006/0280866 A1 | 12/2006 | Marquez et al. |
| 2007/0001342 A1 | 1/2007 | Oberhofer et al. |
| 2007/0003656 A1 | 1/2007 | Labossiere et al. |
| 2007/0019028 A1 | 1/2007 | Renn et al. |
| 2007/0023977 A1 | 2/2007 | Braun et al. |
| 2007/0035069 A1 | 2/2007 | Wust et al. |
| 2007/0051704 A1 | 3/2007 | Husmann et al. |
| 2007/0057412 A1 | 3/2007 | Weiskopf et al. |
| 2007/0122562 A1 | 5/2007 | Adams |
| 2007/0142914 A1 | 6/2007 | Jones et al. |
| 2007/0154634 A1 | 7/2007 | Renn |
| 2007/0175875 A1 | 8/2007 | Uckelmann et al. |
| 2007/0183918 A1 | 8/2007 | Monsheimer et al. |
| 2007/0196561 A1 | 8/2007 | Philippi et al. |
| 2007/0241482 A1 | 10/2007 | Giller et al. |
| 2007/0290409 A1 | 12/2007 | Brice et al. |
| 2008/0006334 A1 | 1/2008 | Davidson et al. |
| 2008/0013299 A1 | 1/2008 | Renn |
| 2008/0014457 A1 | 1/2008 | Gennaro et al. |
| 2008/0060330 A1 | 3/2008 | Davidson et al. |
| 2008/0131540 A1 | 6/2008 | Perret et al. |
| 2008/0138515 A1 | 6/2008 | Williams |
| 2008/0151951 A1 | 6/2008 | Elliott et al. |
| 2008/0204748 A1 | 8/2008 | Nomaru et al. |
| 2008/0206460 A1 | 8/2008 | Rhoades et al. |
| 2008/0208268 A1 | 8/2008 | Bartic et al. |
| 2009/0004380 A1 | 1/2009 | Hochsmann et al. |
| 2009/0017220 A1 | 1/2009 | Muller et al. |
| 2009/0025638 A1 | 1/2009 | Inoue |
| 2009/0035411 A1 | 2/2009 | Seibert et al. |
| 2009/0039570 A1 | 2/2009 | Clark |
| 2009/0042050 A1 | 2/2009 | Matteazzi et al. |
| 2009/0045553 A1 | 2/2009 | Weidinger et al. |
| 2009/0047165 A1 | 2/2009 | Syvanen et al. |
| 2009/0061077 A1 | 3/2009 | King et al. |
| 2009/0090298 A1 | 4/2009 | King et al. |
| 2009/0114151 A1 | 5/2009 | Renn et al. |
| 2009/0152771 A1 | 6/2009 | Philippi et al. |
| 2009/0206065 A1 | 8/2009 | Kruth et al. |
| 2009/0206522 A1 | 8/2009 | Hein et al. |
| 2009/0314391 A1 | 12/2009 | Crump et al. |
| 2010/0006228 A1 | 1/2010 | Abe et al. |
| 2010/0044547 A1 | 2/2010 | Higashi et al. |
| 2010/0125356 A1 | 5/2010 | Shkolnik et al. |
| 2010/0140550 A1 | 6/2010 | Keller et al. |
| 2010/0163405 A1 | 7/2010 | Ackelid |
| 2010/0173096 A1 | 7/2010 | Kritchman et al. |
| 2010/0174392 A1 | 7/2010 | Fink et al. |
| 2010/0215856 A1 | 8/2010 | Kritchman |
| 2010/0233012 A1 | 9/2010 | Higashi et al. |
| 2010/0242843 A1 | 9/2010 | Peretti et al. |
| 2010/0305743 A1 | 12/2010 | Larsson |
| 2011/0029093 A1 | 2/2011 | Bojarski et al. |
| 2011/0042031 A1 | 2/2011 | Furlong et al. |
| 2011/0046916 A1 | 2/2011 | Yu et al. |
| 2011/0052927 A1 | 3/2011 | Martinoni et al. |
| 2011/0106290 A1 | 5/2011 | Hoevel et al. |
| 2011/0123383 A1 | 5/2011 | Fuwa et al. |
| 2011/0133367 A1 | 6/2011 | Weidinger et al. |
| 2011/0135840 A1 | 6/2011 | Doye et al. |
| 2011/0165339 A1 | 7/2011 | Skoglund et al. |
| 2011/0165340 A1 | 7/2011 | Baumann |
| 2011/0168091 A1 | 7/2011 | Baumann et al. |
| 2011/0190904 A1 | 8/2011 | Lechmann et al. |
| 2011/0221100 A1 | 9/2011 | Wesselky et al. |
| 2011/0223349 A1 | 9/2011 | Scott |
| 2011/0259862 A1 | 10/2011 | Scott et al. |
| 2011/0278773 A1 | 11/2011 | Bokodi et al. |
| 2011/0287185 A1 | 11/2011 | Felstead et al. |
| 2011/0293771 A1 | 12/2011 | Oberhofer et al. |
| 2012/0000893 A1 | 1/2012 | Broude et al. |
| 2012/0010741 A1 | 1/2012 | Hull et al. |
| 2012/0052145 A1 | 3/2012 | Chen et al. |
| 2012/0090734 A1 | 4/2012 | Heinlein |
| 2012/0100031 A1 | 4/2012 | Ljungblad et al. |
| 2012/0106150 A1 | 5/2012 | Vaes et al. |
| 2012/0107496 A1 | 5/2012 | Thoma |
| 2012/0119399 A1 | 5/2012 | Fruth |
| 2012/0126457 A1 | 5/2012 | Abe et al. |
| 2012/0130525 A1 | 5/2012 | Tsai et al. |
| 2012/0134386 A1 | 5/2012 | Bender et al. |
| 2012/0139166 A1 | 6/2012 | Abe et al. |
| 2012/0145806 A1 | 6/2012 | Yang |
| 2012/0155606 A1 | 6/2012 | Simon et al. |
| 2012/0164322 A1 | 6/2012 | Teulet |
| 2012/0186779 A1 | 7/2012 | Tan et al. |
| 2012/0211926 A1 | 8/2012 | Larsson et al. |
| 2012/0213615 A1 | 8/2012 | Sakaue |
| 2012/0223059 A1 | 9/2012 | Ackelid |
| 2012/0228492 A1 | 9/2012 | Franzen |
| 2012/0228807 A1 | 9/2012 | Teulet |
| 2012/0231175 A1 | 9/2012 | Tan |
| 2012/0231576 A1 | 9/2012 | King et al. |
| 2012/0234671 A1 | 9/2012 | Ackelid |
| 2012/0251378 A1 | 10/2012 | Abe et al. |
| 2012/0267347 A1 | 10/2012 | Arjakine et al. |
| 2012/0308781 A1 | 12/2012 | Abe et al. |
| 2012/0318777 A1 | 12/2012 | Kwok et al. |
| 2013/0016400 A1 | 1/2013 | Yamashita |
| 2013/0064706 A1 | 3/2013 | Schwarze et al. |
| 2013/0089642 A1 | 4/2013 | Lipson et al. |
| 2013/0093866 A1 | 4/2013 | Ohlhues et al. |
| 2013/0101746 A1 | 4/2013 | Keremes et al. |
| 2013/0112672 A1 | 5/2013 | Keremes et al. |
| 2013/0134637 A1 | 5/2013 | Wiesner et al. |
| 2013/0162643 A1 | 6/2013 | Cardle |
| 2013/0168902 A1 | 7/2013 | Herzog et al. |
| 2013/0171019 A1 | 7/2013 | Gessler et al. |
| 2013/0180959 A1 | 7/2013 | Weston et al. |
| 2013/0186558 A1 | 7/2013 | Comb et al. |
| 2013/0228302 A1 | 9/2013 | Rickenbacher et al. |
| 2013/0256953 A1 | 10/2013 | Teulet |
| 2013/0270750 A1 | 10/2013 | Green |
| 2013/0272746 A1 | 10/2013 | Hanson et al. |
| 2013/0277891 A1 | 10/2013 | Teulet |
| 2013/0280547 A1 | 10/2013 | Brandl et al. |
| 2013/0300035 A1 | 11/2013 | Snis |
| 2013/0300286 A1 | 11/2013 | Ljungblad et al. |
| 2013/0312928 A1 | 11/2013 | Mercelis et al. |
| 2013/0330470 A1 | 12/2013 | Gersch et al. |
| 2014/0034626 A1 | 2/2014 | Illston |
| 2014/0049964 A1 | 2/2014 | McClure et al. |
| 2014/0065194 A1 | 3/2014 | Yoo et al. |
| 2014/0086654 A1 | 3/2014 | Kojima |
| 2014/0086780 A1 | 3/2014 | Miller et al. |
| 2014/0123458 A1 | 5/2014 | Fearon et al. |
| 2014/0150992 A1 | 6/2014 | Koontz et al. |
| 2014/0154088 A1 | 6/2014 | Etter et al. |
| 2014/0157579 A1 | 6/2014 | Chhabra et al. |
| 2014/0163717 A1 | 6/2014 | Das et al. |
| 2014/0176127 A1 | 6/2014 | Kogej et al. |
| 2014/0251481 A1 | 9/2014 | Kroll et al. |
| 2014/0252687 A1 | 9/2014 | El-Dasher et al. |
| 2014/0265045 A1 | 9/2014 | Cullen et al. |
| 2014/0271221 A1 | 9/2014 | Soucy et al. |
| 2014/0271328 A1 | 9/2014 | Burris et al. |
| 2014/0287080 A1 | 9/2014 | Scott et al. |
| 2014/0288890 A1 | 9/2014 | Khainson et al. |
| 2014/0301883 A1 | 10/2014 | Wiesner et al. |
| 2014/0314609 A1 | 10/2014 | Ljungblad et al. |
| 2014/0314964 A1 | 10/2014 | Ackelid |

(56) References Cited

U.S. PATENT DOCUMENTS

| | | |
|---|---|---|
| 2014/0329953 A1 | 11/2014 | Paternoster |
| 2014/0332507 A1 | 11/2014 | Fockele et al. |
| 2014/0335313 A1 | 11/2014 | Chou et al. |
| 2014/0348691 A1 | 11/2014 | Ljungblad et al. |
| 2014/0348692 A1 | 11/2014 | Bessac et al. |
| 2014/0348969 A1 | 11/2014 | Scott |
| 2014/0361464 A1 | 12/2014 | Holcomb |
| 2014/0363585 A1 | 12/2014 | Pialot et al. |
| 2014/0370323 A1 | 12/2014 | Ackelid |
| 2014/0377117 A1 | 12/2014 | Herrmann et al. |
| 2015/0004046 A1 | 1/2015 | Graham et al. |
| 2015/0014281 A1 | 1/2015 | Trimmer et al. |
| 2015/0017013 A1 | 1/2015 | Tozzi et al. |
| 2015/0021815 A1 | 1/2015 | Albrecht et al. |
| 2015/0021832 A1 | 1/2015 | Yerazunis et al. |
| 2015/0034606 A1 | 2/2015 | Blackmore |
| 2015/0037599 A1 | 2/2015 | Blackmore |
| 2015/0048528 A1 | 2/2015 | Barton |
| 2015/0049082 A1 | 2/2015 | Coffey et al. |
| 2015/0050463 A1 | 2/2015 | Nakano et al. |
| 2015/0054191 A1 | 2/2015 | Ljungblad |
| 2015/0060042 A1 | 3/2015 | Shilpiekandula et al. |
| 2015/0061170 A1 | 3/2015 | Engel et al. |
| 2015/0061195 A1 | 3/2015 | Defelice et al. |
| 2015/0064047 A1 | 3/2015 | Hyde et al. |
| 2015/0071809 A1 | 3/2015 | Nordkvist et al. |
| 2015/0076739 A1 | 3/2015 | Batchelder |
| 2015/0084240 A1 | 3/2015 | Shuck et al. |
| 2015/0088295 A1 | 3/2015 | Hellestam et al. |
| 2015/0093720 A1 | 4/2015 | Beeby et al. |
| 2015/0097307 A1 | 4/2015 | Batchelder et al. |
| 2015/0097308 A1 | 4/2015 | Batchelder et al. |
| 2015/0110910 A1 | 4/2015 | Hartmann et al. |
| 2015/0115490 A1 | 4/2015 | Reinarz |
| 2015/0139849 A1 | 5/2015 | Pialot, Jr. et al. |
| 2015/0142153 A1 | 5/2015 | Chun et al. |
| 2015/0145169 A1 | 5/2015 | Liu et al. |
| 2015/0158249 A1 | 6/2015 | Goto |
| 2015/0165525 A1 | 6/2015 | Jonasson |
| 2015/0165545 A1 | 6/2015 | Goehler et al. |
| 2015/0165681 A1 | 6/2015 | Fish et al. |
| 2015/0165684 A1 | 6/2015 | Deane et al. |
| 2015/0174658 A1 | 6/2015 | Ljungblad |
| 2015/0174822 A1 | 6/2015 | Huang et al. |
| 2015/0178286 A1 | 6/2015 | Dhollander et al. |
| 2015/0185454 A1 | 7/2015 | Kalkbrenner et al. |
| 2015/0198052 A1 | 7/2015 | Pavlov et al. |
| 2015/0210013 A1 | 7/2015 | Teulet |
| 2015/0246485 A1 | 9/2015 | Guenster et al. |
| 2015/0251355 A1 | 9/2015 | Rehme |
| 2015/0268099 A1 | 9/2015 | Craig et al. |
| 2015/0283610 A1 | 10/2015 | Ljungblad et al. |
| 2015/0283611 A1 | 10/2015 | Takezawa et al. |
| 2015/0283613 A1 | 10/2015 | Backlund et al. |
| 2015/0298211 A1 | 10/2015 | Abe et al. |
| 2015/0298397 A1 | 10/2015 | Chen et al. |
| 2015/0306667 A1 | 10/2015 | Yao |
| 2015/0306820 A1 | 10/2015 | Colin et al. |
| 2015/0321422 A1 | 11/2015 | Boyer |
| 2015/0328839 A1 | 11/2015 | Willis et al. |
| 2015/0331402 A1 | 11/2015 | Lin et al. |
| 2015/0336330 A1 | 11/2015 | Herzog |
| 2015/0367415 A1 | 12/2015 | Buller et al. |
| 2015/0367416 A1 | 12/2015 | Buller et al. |
| 2015/0367418 A1 | 12/2015 | Buller et al. |
| 2015/0367419 A1 | 12/2015 | Buller et al. |
| 2015/0367447 A1 | 12/2015 | Buller et al. |
| 2015/0367453 A1 | 12/2015 | Herzog |
| 2015/0367574 A1 | 12/2015 | Araie et al. |
| 2015/0375456 A1 | 12/2015 | Cheverton et al. |
| 2016/0001401 A1 | 1/2016 | Dimter et al. |
| 2016/0022336 A1 | 1/2016 | Bateman |
| 2016/0059310 A1 | 3/2016 | Junker et al. |
| 2016/0059352 A1 | 3/2016 | Sparks et al. |
| 2016/0067779 A1 | 3/2016 | Dautova et al. |
| 2016/0082666 A1 | 3/2016 | De Pena et al. |
| 2016/0082668 A1 | 3/2016 | Perret et al. |
| 2016/0107263 A1* | 4/2016 | Koerber ............... B22F 3/1055 219/76.12 |
| 2016/0114431 A1 | 4/2016 | Cheverton et al. |
| 2016/0114432 A1* | 4/2016 | Ferrar ............... B22F 3/1055 219/76.12 |
| 2016/0114531 A1 | 4/2016 | Chuang et al. |
| 2016/0114535 A1 | 4/2016 | Kritchman et al. |
| 2016/0121399 A1 | 5/2016 | Buller et al. |
| 2016/0121548 A1 | 5/2016 | Nauka et al. |
| 2016/0129502 A1 | 5/2016 | Varetti |
| 2016/0136730 A1 | 5/2016 | McMurtry et al. |
| 2016/0136896 A1 | 5/2016 | Wighton |
| 2016/0144574 A1 | 5/2016 | Eilken et al. |
| 2016/0151860 A1 | 6/2016 | Engeli et al. |
| 2016/0154906 A1 | 6/2016 | Schmidt et al. |
| 2016/0179064 A1 | 6/2016 | Arthur et al. |
| 2016/0185048 A1 | 6/2016 | Dave et al. |
| 2016/0193696 A1 | 7/2016 | McFarland et al. |
| 2016/0193790 A1 | 7/2016 | Shuck et al. |
| 2016/0214175 A1 | 7/2016 | Nordstrom |
| 2016/0236279 A1 | 8/2016 | Ashton et al. |
| 2016/0236419 A1 | 8/2016 | Griffin et al. |
| 2016/0246908 A1 | 8/2016 | Komzsik |
| 2016/0250717 A1 | 9/2016 | Kruger et al. |
| 2016/0258045 A1 | 9/2016 | Carter, Jr. et al. |
| 2016/0271698 A1 | 9/2016 | Schmidt |
| 2016/0271884 A1 | 9/2016 | Herzog |
| 2016/0279706 A1 | 9/2016 | Domrose et al. |
| 2016/0297006 A1 | 10/2016 | Buller et al. |
| 2016/0299996 A1 | 10/2016 | Huang |
| 2016/0303687 A1 | 10/2016 | Ljungblad |
| 2016/0311025 A1 | 10/2016 | Kaneko |
| 2016/0320771 A1 | 11/2016 | Huang |
| 2016/0321384 A1 | 11/2016 | Pal et al. |
| 2016/0332384 A1 | 11/2016 | De Pena et al. |
| 2016/0339639 A1 | 11/2016 | Chivel |
| 2016/0361874 A1 | 12/2016 | Park et al. |
| 2017/0001371 A1 | 1/2017 | Sobue et al. |
| 2017/0001379 A1 | 1/2017 | Long |
| 2017/0014902 A1* | 1/2017 | Tanaka ............... B29C 70/386 |
| 2017/0021420 A1 | 1/2017 | Buller et al. |
| 2017/0021455 A1 | 1/2017 | Dallarosa et al. |
| 2017/0036404 A1 | 2/2017 | Rengers et al. |
| 2017/0066052 A1 | 3/2017 | Abe et al. |
| 2017/0066084 A1 | 3/2017 | Ladewig et al. |
| 2017/0087769 A1 | 3/2017 | Lancaster-Larocque et al. |
| 2017/0090461 A1 | 3/2017 | Chong et al. |
| 2017/0102689 A1 | 4/2017 | Khajepour et al. |
| 2017/0106603 A1* | 4/2017 | Pobihun ............... B33Y 30/00 |
| 2017/0123222 A1 | 5/2017 | Demuth et al. |
| 2017/0129052 A1 | 5/2017 | Buller et al. |
| 2017/0136574 A1 | 5/2017 | Zenzinger et al. |
| 2017/0136703 A1 | 5/2017 | Hayes et al. |
| 2017/0144254 A1 | 5/2017 | Buller et al. |
| 2017/0144874 A1 | 5/2017 | Huebinger et al. |
| 2017/0145586 A1 | 5/2017 | Xiao |
| 2017/0157845 A1 | 6/2017 | Bihari et al. |
| 2017/0165751 A1 | 6/2017 | Buller et al. |
| 2017/0165752 A1 | 6/2017 | Buller et al. |
| 2017/0165753 A1* | 6/2017 | Buller ............... B33Y 10/00 |
| 2017/0165754 A1 | 6/2017 | Buller et al. |
| 2017/0165792 A1 | 6/2017 | Buller et al. |
| 2017/0189963 A1 | 7/2017 | Buller et al. |
| 2017/0216917 A1 | 8/2017 | Zhang et al. |
| 2017/0217095 A1 | 8/2017 | Buller et al. |
| 2017/0225198 A1 | 8/2017 | Nevarez et al. |
| 2017/0232515 A1 | 8/2017 | Demuth et al. |
| 2017/0239719 A1 | 8/2017 | Buller et al. |
| 2017/0239720 A1 | 8/2017 | Levin et al. |
| 2017/0239721 A1 | 8/2017 | Buller et al. |
| 2017/0239752 A1 | 8/2017 | Buller et al. |
| 2017/0239891 A1 | 8/2017 | Buller et al. |
| 2017/0239892 A1 | 8/2017 | Buller et al. |
| 2017/0259337 A1 | 9/2017 | Furukawa |
| 2017/0259504 A1* | 9/2017 | Lin ............... B23K 26/12 |
| 2017/0266878 A1 | 9/2017 | Furukawa |
| 2017/0266887 A1 | 9/2017 | Roviaro et al. |

(56) References Cited

U.S. PATENT DOCUMENTS

| | | | |
|---|---|---|---|
| 2017/0274589 A1* | 9/2017 | Wu | B33Y 10/00 |
| 2017/0282245 A1* | 10/2017 | Yasuda | B29C 67/0077 |
| 2017/0282294 A1 | 10/2017 | Uchida | |
| 2017/0291372 A1 | 10/2017 | Milshtein et al. | |
| 2017/0297110 A1* | 10/2017 | Echigo | B22F 3/1055 |
| 2017/0304894 A1 | 10/2017 | Buller | |
| 2017/0304944 A1 | 10/2017 | Symeonidis et al. | |
| 2017/0305140 A1 | 10/2017 | Wüst | |
| 2017/0320265 A1* | 11/2017 | Baumann | B29C 64/295 |
| 2017/0333994 A1* | 11/2017 | Schmitt | B33Y 80/00 |
| 2017/0334024 A1 | 11/2017 | Buller et al. | |
| 2017/0341143 A1 | 11/2017 | Abe et al. | |
| 2017/0341183 A1 | 11/2017 | Buller et al. | |
| 2017/0348771 A1 | 12/2017 | Kawada et al. | |
| 2017/0355146 A1 | 12/2017 | Buller et al. | |
| 2017/0355147 A1 | 12/2017 | Buller et al. | |
| 2018/0001553 A1 | 1/2018 | Buller et al. | |
| 2018/0001556 A1 | 1/2018 | Buller et al. | |
| 2018/0001557 A1 | 1/2018 | Buller et al. | |
| 2018/0015670 A1 | 1/2018 | Gu et al. | |
| 2018/0056391 A1 | 3/2018 | Buller et al. | |
| 2018/0099454 A1 | 4/2018 | Hümmeler et al. | |
| 2018/0111320 A1 | 4/2018 | Zhao et al. | |
| 2018/0133635 A1 | 5/2018 | Hofmann et al. | |
| 2018/0178286 A1* | 6/2018 | Martin | B23K 15/0086 |
| 2018/0185915 A1 | 7/2018 | Beauchamp | |
| 2018/0186079 A1 | 7/2018 | Vilajosana et al. | |
| 2018/0186081 A1* | 7/2018 | Milshtein | B29C 64/135 |
| 2018/0250744 A1 | 9/2018 | Symeonidis et al. | |
| 2018/0250745 A1 | 9/2018 | Spink et al. | |
| 2018/0250746 A1 | 9/2018 | Symeonidis et al. | |
| 2018/0250771 A1 | 9/2018 | Brown et al. | |
| 2018/0250772 A1 | 9/2018 | Symeonidis et al. | |
| 2018/0250773 A1 | 9/2018 | Symeonidis et al. | |
| 2018/0250774 A1 | 9/2018 | Symeonidis et al. | |
| 2018/0250775 A1 | 9/2018 | Spink et al. | |

FOREIGN PATENT DOCUMENTS

| | | |
|---|---|---|
| CN | 103392153 A | 11/2013 |
| CN | 103561891 A | 2/2014 |
| CN | 103611934 A | 3/2014 |
| CN | 103612393 A | 3/2014 |
| CN | 103629198 A | 3/2014 |
| CN | 103676588 A | 3/2014 |
| CN | 105904729 A | 8/2016 |
| CN | 105921747 A | 9/2016 |
| DE | 19939616 A1 | 3/2001 |
| DE | 102004061836 A1 | 7/2006 |
| DE | 102007029142 A1 | 1/2009 |
| DE | 102009036153 A1 | 2/2011 |
| DE | 10201004833 A1 | 4/2012 |
| DE | 202013009787 U1 | 12/2013 |
| DE | 102013208651 A1 | 11/2014 |
| DE | 102014204528 A1 | 9/2015 |
| EP | 0296818 B1 | 4/1993 |
| EP | 1466718 A2 | 10/2004 |
| EP | 1622086 B1 | 9/2008 |
| EP | 1992709 A1 | 11/2008 |
| EP | 2277687 A1 | 1/2011 |
| EP | 2361704 A1 | 8/2011 |
| EP | 2522446 A1 | 11/2012 |
| EP | 2583773 A2 | 4/2013 |
| EP | 2620241 A1 | 7/2013 |
| EP | 2789413 A1 | 10/2014 |
| EP | 2832473 A1 | 2/2015 |
| EP | 2832474 A1 | 2/2015 |
| EP | 2873751 A1 | 5/2015 |
| EP | 2992942 A1 | 3/2016 |
| EP | 3127635 A1 | 2/2017 |
| EP | 3208077 A1 | 8/2017 |
| EP | 3263316 A1 | 1/2018 |
| JP | 2001009921 A | 1/2001 |
| JP | 2003502184 A | 1/2003 |
| JP | 2004143581 A | 5/2004 |
| JP | 2006150977 A | 6/2006 |
| JP | 2008291318 A | 12/2008 |
| JP | 2009001900 A | 1/2009 |
| JP | 2009512579 A | 3/2009 |
| JP | 2012502178 A | 1/2012 |
| JP | 2012213971 A | 11/2012 |
| JP | 2014227587 A | 12/2014 |
| KR | 20160059726 A | 5/2016 |
| KR | 20160076708 A | 7/2016 |
| NO | 317085 B1 | 8/2004 |
| SE | 524467 C2 | 8/2004 |
| WO | WO-9208592 A1 | 5/1992 |
| WO | WO-9511100 A1 | 4/1995 |
| WO | WO-9711837 A1 | 4/1997 |
| WO | WO-9828124 A2 | 7/1998 |
| WO | WO-9933641 A1 | 7/1999 |
| WO | WO-0102160 A1 | 1/2001 |
| WO | WO-0177988 A2 | 10/2001 |
| WO | WO-2004037469 A1 | 5/2004 |
| WO | WO-2006066939 A1 | 6/2006 |
| WO | WO-2008028443 A2 | 3/2008 |
| WO | WO-2008049384 A1 | 5/2008 |
| WO | WO-2008064620 A1 | 6/2008 |
| WO | WO-2008067496 A2 | 6/2008 |
| WO | WO-2008074287 A1 | 6/2008 |
| WO | WO-2008096105 A1 | 8/2008 |
| WO | WO-2008128502 A2 | 10/2008 |
| WO | WO-2009015619 A2 | 2/2009 |
| WO | WO-2009096750 A2 | 8/2009 |
| WO | WO-2013092997 A1 | 6/2013 |
| WO | WO-2013160188 A1 | 10/2013 |
| WO | WO-2013167903 A1 | 11/2013 |
| WO | WO-2013178825 A2 | 12/2013 |
| WO | WO-2013179017 A1 | 12/2013 |
| WO | WO-2013189473 A1 | 12/2013 |
| WO | WO-2014023657 A1 | 2/2014 |
| WO | WO-2014042970 A1 | 3/2014 |
| WO | WO-2014044589 A1 | 3/2014 |
| WO | WO-2014049159 A1 | 4/2014 |
| WO | WO-2014083292 A1 | 6/2014 |
| WO | WO-2014118783 A1 | 8/2014 |
| WO | WO-2014120991 A1 | 8/2014 |
| WO | WO-2014135136 A1 | 9/2014 |
| WO | WO-2014144255 A2 | 9/2014 |
| WO | WO-2014144482 A1 | 9/2014 |
| WO | WO-2014144630 A1 | 9/2014 |
| WO | WO-2014193406 A1 | 12/2014 |
| WO | WO-2015023612 A2 | 2/2015 |
| WO | WO-2015025171 A2 | 2/2015 |
| WO | WO-2015034362 A1 | 3/2015 |
| WO | WO-2015040433 A2 | 3/2015 |
| WO | WO-2015053946 A1 | 4/2015 |
| WO | WO-2015082677 A1 | 6/2015 |
| WO | WO-2015176709 A1 | 11/2015 |
| WO | WO-2015196149 A1 | 12/2015 |
| WO | WO-2016026852 A1 | 2/2016 |
| WO | WO-2016026853 A1 | 2/2016 |
| WO | WO-2016055523 A1 | 4/2016 |
| WO | WO-2016075025 A1 | 5/2016 |
| WO | WO-2016075026 A1 | 5/2016 |
| WO | WO-2016077250 A1 | 5/2016 |
| WO | WO-2016094827 A1 | 6/2016 |
| WO | WO-2016113253 A1 | 7/2016 |
| WO | WO-2016169768 A1 | 10/2016 |
| WO | WO-2016196223 A1 | 12/2016 |
| WO | WO-2016196382 A1 | 12/2016 |
| WO | WO-2017011456 A1 | 1/2017 |
| WO | WO-2017015217 A2 | 1/2017 |
| WO | WO-2017054842 A1 | 4/2017 |
| WO | WO-2017079091 A1 | 5/2017 |
| WO | WO-2017100695 A1 | 6/2017 |
| WO | WO-2017143077 A1 | 8/2017 |
| WO | WO-2017179001 A1 | 10/2017 |
| WO | WO-2018005439 | 1/2018 |
| WO | WO-2018075741 A1 | 4/2018 |
| WO | WO-2018106586 A1 | 6/2018 |
| WO | WO-2018128695 A2 | 7/2018 |
| WO | WO-2018129089 A1 | 7/2018 |

(56) References Cited

FOREIGN PATENT DOCUMENTS

OTHER PUBLICATIONS

Additive Manufacturing Research Group. Loughborough University. Accessed Jul. 29, 2015. 7 pages. http://www.lboro.ac.uk/research/amrg/about/the7categoriesofadditivemanufacturing/powderbedfusion/.
Anusci, Victor. Aerosint Is Developing the First Commercial Multi-powder SLS 3D Printer. 3D Printing Media Network. Web. Published Jan. 28, 2018. 4 pages. URL:< https://www.3dprintingmedia.network/aerosint-multi-powder-sls-3d-printer/>.
Arcam AB (ARCM.ST) (AMAVF). Powder Removal from 3D Structures. Posted Thursday, Apr. 23, 2015 11:23:59 AM. 4 pages. http://investorshub.advfn.com/boards/read_msg.aspx?message_id=113029094.
Arcam EBM at Sirris Belgium. Uploaded Jun. 17, 2010. 2 pages. https://www.youtube.com/watch?v=nR7EtduqVYw&list=PLD7ckJoR_kR6ua0GOMlyJ1mpCKh342iL1.
Arnet, et al. Extending Laser Bending for the Generation of Convex Shapes. Proc. Instn. Mech. Engrs., vol. 209, pp. 433-442.
Ashby, Mike. Teach Yourself: Phase Diagrams and Phase Transformations. 5th Edition, Mar. 2009, Cambridge. 55 pages.
Cheng, et al. Thermal Stresses Associated with Part Overhang Geometry in Electron Beam Additive Manufacturing: Process Parameter Effects. 25th Annual International Solid Freeform Fabrication Symposium—An Additive Manufacturing Conference, Austin, TX, USA. Aug. 4-6, 2014. 1076-1087.
Childs, et al. Raster scan of selective laser melting of the surface layer of a tool steel powder bed. Proc. IMechE. Jan. 26, 2005; vol. 219, Part B, pp. 379-384.
Childs, et al. Selective laser sintering (melting) of stainless and tool steel powders: experimental modelling. Proc. IMechE. 2005, Published Oct. 18, 2004; vol. 219 Part B, J. Engineering Manufacture, pp. 338-357.
Chivel, et al. On-line temperature monitoring in selective laser sintering/melting. Physics Procedia. Dec. 31, 2010; (5):515-521.
Cloots, et al. Assessing new support minimizing strategies for the additive manufacturing technology SLM. Aug. 16, 2013. sffsymposium.engr.utexas.edu/Manuscripts/2013/2013-50-Cloots.pdf. 13 pages.
Co-pending U.S. Appl. No. 15/719,084, filed Sep. 28, 2017.
Co-pending U.S. Appl. No. 15/719,133, filed Sep. 28, 2017.
Co-pending U.S. Appl. No. 15/719,229, filed Sep. 28, 2017.
Co-pending U.S. Appl. No. 15/788,364, filed Oct. 19, 2017.
Co-pending U.S. Appl. No. 15/788,418, filed Oct. 19, 2017.
Co-pending U.S. Appl. No. 15/788,463, filed Oct. 19, 2017.
Co-pending U.S. Appl. No. 15/788,495, filed Oct. 19, 2017.
Co-pending U.S. Appl. No. 15/788,532, filed Oct. 19, 2017.
Co-pending U.S. Appl. No. 15/788,568, filed Oct. 19, 2017.
Co-pending U.S. Appl. No. 15/788,662, filed Oct. 19, 2017.
Co-pending U.S. Appl. No. 15/803,675, filed Nov. 3, 2017.
Co-pending U.S. Appl. No. 15/803,683, filed Nov. 3, 2017.
Co-pending U.S. Appl. No. 15/803,686, filed Nov. 3, 2017.
Co-pending U.S. Appl. No. 15/803,688, filed Nov. 3, 2017.
Co-pending U.S. Appl. No. 15/803,692, filed Nov. 3, 2017.
Co-pending U.S. Appl. No. 15/808,434, filed Nov. 9, 2017.
Co-pending U.S. Appl. No. 15/808,777, filed Nov. 9, 2017.
Co-pending U.S. Appl. No. 15/830,421, filed Dec. 4, 2017.
Co-pending U.S. Appl. No. 15/830,470, filed Dec. 4, 2017.
Co-pending U.S. Appl. No. 15/853,700, filed Dec. 22, 2017.
Co-pending U.S. Appl. No. 15/855,744, filed Dec. 27, 2017.
Co-pending U.S. Appl. No. 15/861,544, filed Jan. 3, 2018.
Co-pending U.S. Appl. No. 15/861,548, filed Jan. 3, 2018.
Co-pending U.S. Appl. No. 15/861,553, filed Jan. 3, 2018.
Co-pending U.S. Appl. No. 15/861,561, filed Jan. 3, 2018.
Co-pending U.S. Appl. No. 15/870,561, filed Jan. 12, 2018.
Co-pending U.S. Appl. No. 15/873,832, filed Jan. 17, 2018.
Co-pending U.S. Appl. No. 15/886,544, filed Feb. 1, 2018.
Co-pending U.S. Appl. No. 15/893,523, filed Feb. 9, 2018.
Craeghs, et al. Feedback control of layerwise laser melting using optical sensors. Physics Procedia. Dec. 2010; 5:505-514.
Criales, et al. Laser material processing methods: micromachining, laser exfoliation and selective laser melting: prediction modeling of temperature field and melt pool size using finite element modeling of selective laser melting for inconel 625. Atilim University. Metal Forming Center of Excellence, Ankara, Turkey. Nov. 14, 2014. 77 pages.
Dahotre et al. Laser Fabrication and Machining of Materials. Springer. 2008. 561 pages. DOI: 10.1007/978-0-387-72344-0.
David et al. Welding: Solidification and microstructure. The Journal of the Minerals, Metals & Materials Society (TMS). Jun. 2003, vol. 55, Issue 6, pp. 14-20 .
Direct Manufacturing: ARCAM. Uploaded on Jun. 6, 2011. 2 pages. https://www.youtube.com/watch?v=M_qSnjKN7f8.
Doxygen. CGAL 4.11.1—Kinetic Data Structures. User Manual. Web. Published Apr. 8, 2006. 4 pages. URL:< https://doc.cgal.org/latest/Manual/how_to_cite_cgal.html>.
EOS. Direct Metal Laser Sintering Published Aug. 22, 2012. https://www.youtube.com/watch?v=cRE-Pzl6uZA.
European Search Report and Search Opinion dated Nov. 30, 2017 for European Patent Application No. EP17178143.8.
Ex Parte Quayle Action dated Apr. 19, 2017 for U.S. Appl. No. 15/374,821.
Extended European Search Report dated Jul. 7, 2017 for European Patent Application No. EP17156707.6.
Geiger, et al. The Mechanisms of Laser Forming. Annals of the CIRP, vol. 42, Jan. 1993, pp. 301-304.
Ghosh, et al. Selective Laser Sintering: A Case Study of Tungsten Carbide and Cobalt Powder Sintering by Pulsed Nd:YAG Laser. Lasers Based Manufacturing, Dec. 2014, pp. 441-458.
Gibson, et al. Additive Manufacturing Technologies. Springer 2010. 472 pages.
Gibson, et al. Additive Manufacturing Technologies, Springer 2010, Chapter 5, pp. 103-142. ISBN978-1-4419-1119-3 (Print978-1-4419-1120-9 (Online). Published: Dec. 14, 2009.
Gibson, et al. Additive Manufacturing Technologies, Springer 2010, ISBN978-1-4419-1119-3 (Print 978-1-4419-1120-9 (Online). Published: Dec. 14, 2009. 472 pages. pp. 27-31, 98-99, 264-267, 295, 382-383.
Gibson, et al. Additive Manufacturing Technologies, Springer 2015. Chapter 5, pp. 107-145. ISBN 978-1-4939-2113-3 (978-1-4939-2112-6; 978-1-4939-2113-3); DOI 10.1007/978-1-4939-2113-3. Published: Nov. 27, 2014.
Hauser, et al. Further Developments in Process Mapping and modelling in direct metal selective laser melting. Aug. 2004, 15th solid Free Form Fabrication Proceedings. Austin, Texas, pp. 448-459.
Hu, et al. Computer simulation and experimental investigation of sheet metal bending using laser beam scanning. International Journal of Machine Tools and Manufacture, 41, Mar. 2001, pp. 589-607.
Hu, et al. Experimental and numerical modeling of buckling instability of laser sheet forming. International Journal of Machine Tools & Manufacture, 42 (2002) pp. 1427-1439.
Hussein. The development of Lightweight Cellular Structures for Metal Additive Manufacturing. Nov. 2013, thesis of University of Exeter, pp. 1-228.
integrativemodeling.org. IMP, The Integrative Modeling Platform. Web. Published Jul. 26, 2013.1 page. URL:< https://integrativemodeling.org/>.
International Search Report and Written Opinion dated Jan. 9, 2018 for International PCT Patent Application No. PCT/2017/054043.
International Search Report and Written Opinion dated Jan. 16, 2017 for International PCT Patent Application No. PCT/US2016/059781.
International Search Report and Written Opinion dated Feb. 12, 2018 for International PCT Patent Application No. PCT/US2017/057340.
International Search Report and Written Opinion dated Feb. 14, 2017 for International PCT Patent Application No. PCT/US2016/042818.

(56) References Cited

OTHER PUBLICATIONS

International Search Report and Written Opinion dated Feb. 19, 2016 for International PCT Patent Application No. PCT/US2015/059790.
International Search Report and Written Opinion dated Apr. 5, 2017 for International PCT Patent Application No. PCT/US2016/066000.
International search report and written opinion dated Apr. 11, 2016 for PCT/US2015/065297.
International Search Report and Written Opinion dated May 18, 2017 for International PCT Patent Application No. PCT/US2017/018191.
International Search Report and Written Opinion dated Aug. 30, 2017 for International PCT Patent Application No. PCT/US2017/039422.
International Search Report and Written Opinion dated Sep. 20, 2016 for International PCT Patent Application No. PCT/US2016/034454.
International search report and written opinion dated Sep. 20, 2016 for PCT/US2016/034454.
International Search Report and Written Opinion dated Oct. 18, 2016 for International PCT Patent Application No. PCT/US2016/041895.
International search report and written opinion dated Oct. 30, 2015 for PCT Application No. US2015/036802.
International search report and written opinion dated Sep. 13, 2016 for PCT Application No. US-2016034857.
Kannatey-Asibu Jr, Elijah. Principles of laser materials processing. John Wiley & Sons, 2009, Chapter 10, pp. 231-405. Published: Apr. 20, 2009.
Kannatey-Asibu Jr, Elijah. Principles of laser materials processing. John Wiley & Sons, 2009, Chapter 16, pp. 502-668. Published: Apr. 20, 2009.
Kruth, et al. Feedback control of selective laser melting. Proceedings of the 3rd International Conference on Advanced Research in Virtual and Rapid Prototyping, Leiria, Portugal, Sep. 2007. 521-527.
Kruth, et al. Selective laser melting of iron-based power. Journal of Materials Processing Technology. Nov. 2004; 149:616-622.
Kumar. Development of an electrophotographic-based layered manufacturing test bed. Project proposal. Department of Mechanical Engineering, University of Florida. 2009. http://www.cis.rit.edu/microgrants/2008/Esterman_proposal.pdf (accessed on Jun. 29, 2015).
Kumar, et al. Designing and slicing heterogenous components for rapid prototyping. Department of Mechanical Engineering, University of Florida. Aug. 2000; 428-436.
Kumar, et al. Electrophotographic Layered Manufacturing. J. Manuf. Sci. Eng 126(3), 571-576 (Sep. 7, 2004) (6 pages) doi:10.1115/1.1765146.
Kumar, et al. Electrophotographic powder deposition for freeform fabrication. Department of Mechanical Engineering, University of Florida. Aug. 1999; 647-654.
Kumar, et al. Electrophotographic printing of part and binder powders. Rapid Prototyping Journal. Jul. 2004; 10(1):7-13.
Kumar, et al. Layered Manufacturing by Electrophotographic Printing. ASME 2003 International Design Engineering Technical Conferences and Computers and Information in Engineering Conference. Volume 2: 29th Design Automation Conference, Parts A and B. Chicago, Illinois, USA, Sep. 2-6, 2003. Paper No. DETC2003/DAC-48724, pp. 205-211; 7 pages.
Kumar, et al. Solid freeform fabrication by electrophotographic printing. Department of Mechanical and Aerospace Engineering, University of Florida. Aug. 2003; 39-49.
Kumar. Powder deposition and sintering for a two-powder approach to solid freeform fabrication. Department of Mechanical Engineering, University of Florida. Aug. 1998; 169-173.
Laser Engineered Net Shaping (LENS) 850-R system overview. System features and example application video clips. Published Jun. 3, 2012. https://www.youtube.com/watch?v=mkUVURLkxS4.
Leirvag. Additive Manufacturing for Large Products. Feb. 2013, thesis. Norwegian University of Science and Technology.
Lyckfeldt. Powder rheology of steel powders for additive manufacturing. Swerea IVF. Oct. 24, 2013.
Maji, et al. Finite Element Analysis and Experimental Investigations on Laser Bending of AISI304 Stainless Steel Sheet. Procedia Engineering 64 (2013) pp. 528-535.
Manfredi, et al. From Powders to Dense Metal Parts: Characterization of a Commercial AlSiMg Alloy Processed through Direct Metal Laser Sintering. Mar. 2013, Materials, vol. 6, pp. 856-869.
Manzhirov, et al. Mathematical Modeling of Additive Manufacturing Technologies. Proc. of the World Congress of Engineering 2014, vol. II. WCE 2014, Jul. 2-4, 2014, London, U.K. 6 pages.
Merriam-Webster. Definition of "reservoir". Retrieved Dec. 21, 2017. 13 pages. URL:< https://merriam-webster.com/dictionary/reservoir>.
Mertens, et al. Optimization fo scan strategies in selective laser melting of aluminum parts with downfacing areas. Journal of Manufacturing Science and Technology. Dec. 2014; 136:061012-1-7.
Morgan, et al. Experimental investigation of nanosecond pulsed Nd:YAG laser re-melted pre-placed powder beds. Rapid Prototyping Journal, Aug. 1, 2001, vol. 7 Issue: 3, pp. 159-172, doi: 10.1108/13552540110395565.
Moridi, et al. Cold spray coating: review of material systems and future perspectives. Surface engineering. Jun. 2014; 36(6):36-395.
Mumatz, et al. A Method to Eliminate Anchors/Supports from Directly Laser Melted Metal Powder Bed Processes. Aug. 2011, Additive Manufacturing Research Group, Wolfson School of Mechanical Engineering, Loughborough University, pp. 55-64.
Mumtaz, et al. A method to eliminate anchors/supports from directly laser melted metal powder bed processes. Additive Manufacturing Research Group, Wolfson School of Mechanical Engineering, Loughborough University. Reviewed Aug. 17, 2011. 10 pages.
Netfabb—Professional 5.2, User Manual, Netfabb GmbH 2014, Version: Jul. 29, 2014, Chapter 6: sections 6.1, 6.3, Chapter 7: section 7.7, Chapter 9: section 9.6.
Notice of Allowability dated Oct. 17, 2017 for U.S. Appl. No. 14/744,910.
Notice of allowance dated Jan. 5, 2017 for U.S. Appl. No. 15/085,884.
Notice of Allowance dated Jan. 12, 2018 for U.S. Appl. No. 15/435,120.
Notice of Allowance dated Jan. 12, 2018 for U.S. Appl. No. 15/435,128.
Notice of Allowance dated Feb. 6, 2018 for U.S. Appl. No. 15/374,821.
Notice of Allowance dated Feb. 16, 2018 for U.S. Appl. No. 15/435,120.
Notice of Allowance dated Feb. 21, 2018 for U.S. Appl. No. 15/435,128.
Notice of Allowance dated Feb. 28, 2018 for U.S. Appl. No. 15/374,821.
Notice of allowance dated Mar. 1, 2016 for U.S. Appl. No. 14/745,108.
Notice of Allowance dated Mar. 16, 2017 for U.S. Appl. No. 15/339,775.
Notice of Allowance dated Mar. 20, 2017 for U.S. Appl. No. 15/339,759.
Notice of allowance dated May 11, 2016 for U.S. Appl. No. 14/744,955.
Notice of allowance dated May 25, 2016 for U.S. Appl. No. 14/744,675.
Notice of allowance dated Jun. 20, 2016 for U.S. Appl. No. 14/744,675.
Notice of Allowance dated Aug. 7, 2017 for U.S. Appl. No. 14/744,910.
Notice of allowance dated Aug. 10, 2016 for U.S. Appl. No. 14/967,118.
Notice of allowance dated Sep. 6, 2016 for U.S. Appl. No. 14/745,032.
Notice of allowance dated Sep. 17, 2015 for U.S. Appl. No. 14/745,081.
Notice of allowance dated Sep. 28, 2015 for U.S. Appl. No. 14/745,081.
Notice of allowance dated Nov. 30, 2015 for U.S. Appl. No. 14/745,081.

(56) References Cited

OTHER PUBLICATIONS

Notice of Allowance dated Dec. 8, 2017 for U.S. Appl. No. 15/435,128.
Notice of Allowance dated Dec. 9, 2016 for U.S. Appl. No. 15/188,939.
Notice of Allowance dated Dec. 11, 2017 for U.S. Appl. No. 15/435,120.
Notice of allowance dated Dec. 14, 2015 for U.S. Appl. No. 14/745,081.
Notice of allowance dated Dec. 15, 2015 for U.S. Appl. No. 14/745,081.
Notice of Allowance (second) dated Apr. 6, 2017 for U.S. Appl. No. 15/339,759.
Office Action dated Jan. 2, 2018 for U.S. Appl. No. 15/288,251.
Office action dated Jan. 7, 2016 for U.S. Appl. No. 14/744,859.
Office action dated Jan. 11, 2016 for U.S. Appl. No. 14/745,032.
Office Action dated Jan. 24, 2018 for U.S. Appl. No. 15/615,004.
Office Action dated Jan. 25, 2018 for U.S. Appl. No. 15/634,727.
Office Action dated Feb. 7, 2017 for U.S. Appl. No. 14/744,988.
Office Action dated Feb. 7, 2018 for U.S. Appl. No. 15/614,979.
Office Action dated Feb. 7, 2018 for U.S. Appl. No. 15/719,229.
Office Action dated Feb. 8, 2017 for U.S. Appl. No. 14/744,859.
Office action dated Feb. 10, 2016 for U.S. Appl. No. 14/744,910.
Office Action dated Feb. 14, 2018 for U.S. Appl. No. 15/634,228.
Office action dated Feb. 16, 2016 for U.S. Appl. No. 14/744,955.
Office action dated Mar. 4, 2016 for U.S. Appl. No. 14/744,988.
Office Action dated Mar. 6, 2017 for U.S. Appl. No. 14/744,910.
Office action dated Mar. 7, 2017 for U.S. Appl. No. 15/339,712.
Office Action dated Mar. 7, 2017 for U.S. Appl. No. 15/399,712.
Office Action dated Mar. 7, 2018 for U.S. Appl. No. 15/399,186.
Office action dated Mar. 10, 2016 for U.S. Appl. No. 14/744,675.
Office Action dated Mar. 23, 2017 for U.S. Appl. No. 15/399,186.
Office Action dated Apr. 28, 2017 for U.S. Appl. No. 15/374,616.
Office Action dated Jun. 15, 2017 for U.S. Appl. No. 15/288,251.
Office action dated Jun. 29, 2016 for U.S. Appl. No. 14/744,859.
Office Action dated Jun. 29, 2017 for U.S. Appl. No. 15/435,128.
Office action dated Jul. 1, 2016 for U.S. Appl. No. 14/745,032.
Office Action dated Jul. 3, 2017 for U.S. Appl. No. 15/435,120.
Office action dated Jul. 19, 2016 for U.S. Appl. No. 15/085,884.
Office action dated Jul. 21, 2016 for U.S. Appl. No. 14/744,910.
Office Action dated Jul. 28, 2017 for U.S. Appl. No. 14/744,988.
Office Action dated Aug. 2, 2017 for U.S. Appl. No. 15/435,090.
Office Action dated Aug. 18, 2017 for U.S. Appl. No. 15/374,318.
Office action dated Aug. 25, 2016 for U.S. Appl. No. 14/744,988.
Office Action dated Aug. 25, 2017 for U.S. Appl. No. 15/339,712.
Office action dated Sep. 10, 2015 for U.S. Appl. No. 14/744,675.
Office Action dated Sep. 11, 2017 for U.S. Appl. No. 15/374,821.
Office action dated Sep. 13, 2016 for U.S. Appl. No. 15/188,939.
Office Action dated Sep. 15, 2017 for U.S. Appl. No. 15/374,616.
Office Action dated Sep. 18, 2017 for U.S. Appl. No. 15/634,228.
Office action dated Oct. 2, 2015 for U.S. Appl. No. 14/744,955.
Office action dated Oct. 19, 2017 for U.S. Appl. No. 15/399,186.
Office action dated Nov. 1, 2016 for U.S. Appl. No. 15/085,884.
Office action dated Nov. 12, 2015 for U.S. Appl. No. 14/745,108.
Office action dated Nov. 16, 2017 for U.S. Appl. No. 15/634,267.
Office action dated Nov. 18, 2016 for U.S. Appl. No. 15/188,939.
Office Action dated Nov. 27, 2017 for U.S. Appl. No. 15/374,318.
Office Action dated Dec. 8, 2017 for U.S. Appl. No. 15/435,090.
Office Action dated Dec. 15, 2017 for U.S. Appl. No. 15/435,110.
Optomec. Lens 850R 3D Printer for Structual Metals. Optomec. YouTube—Web. Published on Jun 3, 2012. 3 pages. URL:< https://www.youtube.com/watch?v=mkUVURLkxS4>.
Papadakis, et al. Numerical computation of component shape distortion manufactured by selective laser melting. Procedia CIRP. Aug. 2014; 18:90-95.
Proto Labs. Direct Metal Laser Sintering (DMLS). Published Sep. 10, 2014. https://www.protolabs.com/additive-manufacturing/direct-metal-laser-sintering 2 pages.
Rhinehart, R.R. §2.13 Control Theory: Mode-Based Control, in Bela G. Liptak, Instrument Engineers' Handbook, vol. 2: Process Control and Optimization, 209-213 (4th ed., CRC Press (part of Taylor & Francis Group), 2006), ISBN-13: 978-0849310812.
Riecker, et al. 3D multi-material metal printing of delicate structures. EuroPM 2014—AM Technologies, http://www.ifam.fraunhofer.de/content/dam/ifam/de/documents/dd/Publikationen/2014/Euro_PM_2014_Riecker_3D%20Multi-Material_Metal_Printing_of_Delicate_Structures_EPMA.pdf (accessed on Jun. 29, 2015).
Sandvik Materials Technology website. Accessed Nov. 14, 2014. http://www.smt.sandvik.com/en/products/metal-powder/additive-manufacturing/.
Saunders, Marc. Real-time AM monitoring opens up new process control opportunities. Web: LinkedIn. Published on Jan. 3, 2018. 12 pages. URL:<https://www.linkedin.com/pulse/real-time-am-monitoring-opens-new-process-control-marc-saunders/>.
Schott. Tie-19: Temperature Coefficient of the Refractive Index. Technical Information: Advanced Optics. Schott AG. Jul. 2016. 10 pages.
Schott. Tie-19: Temperature Coefficient of the Refractive Index. Technical Information: Advanced Optics. Schott North America, Inc. Jul. 2008. 12 pages.
Scime et al. Anomaly detection and classification in a laser powder bed additive manufacturing process using a trained computer vision algorithm. Additive Manufacturing. vol. 19, Jan. 2018, pp. 114-126.
Selective Laser Sintering (SLS) Process at Loughborough University. Published May 4, 2015. 2 pages. https://www.youtube.com/watch?v=oO77VKDB891.
Shen, et al. An analytical model for estimating deformation in laser forming. Computational Materials Science, 37 (2006) pp. 593-598.
Shen, et al. Modelling of laser forming—An review. Computational Materials Science 46 (2009) pp. 834-840.
Spears, et al. In-process sensing in selective laser melting (SLM) additive manufacturing. Integrating Materials and Manufacturing Innovation. Feb. 11, 2016; 5:2. DOI: 10.1186/s40192-016-0045-4.
Strano, et al. A new approach to the design and optimisation of support structures in additive manufacturing. Int J Adv Manuf Technol (2013) 66:1247-1254 DOI 10.1007/s00170-012-4403-x. Published online: Aug. 2, 2012.
Stratasys. Direct Manufacturing. Direct Metal Laser Sintering (DMLS). Published Oct. 11, 2013. https://www.stratasysdirect.com/resources/direct-metal-laser-sintering-dmls/ 7 pages.
Symeonidis, Kimon. The Controlled Diffusion Solidification Process: Fundamentals and Principles. Ph.D. Thesis. Worcester Polytechnic Institute. Apr. 2009. 137 pages.
Thorlabs, Inc. Fiber Optic Reflection/Backscatter Probe Bundles. Web. Copyright 1999-2018. Printed Mar. 28, 2018. 5 pages. URL:< https://www.thorlabs.com/newgrouppage9.cfm?objectgroup_id=7794>.
U.S. Appl. No. 15/374,616 Office Action dated Mar. 26, 2018.
U.S. Appl. No. 15/719,133 Office Action dated Mar. 28, 2018.
Van Der Eijk, et al. Metal printing process: development of a new rapid manufacturing process for metal parts. Proceedings of the World PM 2004 conference held in Vienna. Oct. 17-21, 2004. 5 pages.
Wang et al. Effects of thermal cycles on the microstructure evolution of Inconel 718 during selective laser melting process. Additive Manufacturing. vol. 18, Dec. 2017, pp. 1-14.
Wang, et al. Research on the fabricating quality optimization of the overhanging surface in SLM process. Int J Adv Manuf Technol (2013) 65:1471-1484 DOI 10.1007/s00170-012-4271-4. Published online: Jun. 16, 2012.
Wilkes, et al. Emerald Article: Additive manufacturing of ZrO2—Al2O3 ceramic components by selective laser melting. Rapid Prototyping Journal, vol. 19, Issue 1, Aug. 7, 2012.
Wright, Roger. Wire Technology, Process Engineering and Metallurgry, Ch. 19, Elsevier, 2011, pp. 279-283. Published: Nov. 17, 2010.
Xiao, et al. Numerical Simulation of Direct Metal Laser Sintering of Single-Component Powder on Top of Sintered Layers. Journal of Manufacturing Science and Engineering. vol. 130, Aug. 2008. 10 pages.
Yin. Accurately quantifying process-relevant powder properties for AMPM applications. Freeman Technology. May 2014. 39 pages.

(56) References Cited

OTHER PUBLICATIONS

Bohnet, M. Advances in the Design of Pneumatic Conveyors. International Chemical Engineering, vol. 25, No. 3, Jul. 1985, pp. 387-405.
Co-pending U.S. Appl. No. 16/030,795, filed Jul. 9, 2018.
Co-pending U.S. Appl. No. 16/031,896, filed Jul. 10, 2018.
De Dietrich Process Systems, Inc. Powder Pump™. Product Brochure. Created Jul. 3, 2012. 2 pages.
Gordon et al. Single-pixel phase-corrected fiber bundle endomicroscopy with lensless focussing capability. J Lightwave Technol. Author manuscript; available in PMC Jun. 6, 2016. Published in final edited form as: J Lightwave Technol. Aug. 15, 2015; 33(16): 3419-3425.
PCT/US2017/064474 International Search Report and Written Opinion dated Apr. 30, 2018.
PCT/US2018/012250 International Search Report and Written Opinion dated Apr. 30, 2018.
RP Photonics Consulting GmbH. Definition of "Optical Intensity". Encyclopedia of Laser Physics and Technology. Jun. 2012. 3 pages. URL:< https://www.rp-photonics.com/optical_intensity.html>.
U.S. Appl. No. 15/339,712 Notice of Allowance dated Jul. 10, 2018.
U.S. Appl. No. 15/339,712 Notice of Allowance dated Jun. 18, 2018.
U.S. Appl. No. 15/339,712 Notice of Allowance dated May 23, 2018.
U.S. Appl. No. 15/374,318 Notice of Allowance dated Apr. 20, 2018.
U.S. Appl. No. 15/374,442 Office Action dated May 21, 2018.
U.S. Appl. No. 15/374,535 Office Action dated Apr. 20, 2018.
U.S. Appl. No. 15/435,090 Office Action dated May 18, 2018.
U.S. Appl. No. 15/435,110 Office Action dated Apr. 19, 2018.
U.S. Appl. No. 15/614,979 Office Action dated Jun. 8, 2018.
U.S. Appl. No. 15/615,004 Office Action dated Jun. 8, 2018.
U.S. Appl. No. 15/634,228 Office Action dated Jun. 14, 2018.
U.S. Appl. No. 15/634,727 Office Action dated May 25, 2018.
U.S. Appl. No. 15/719,084 Office Action dated Jul. 12, 2018.
U.S. Appl. No. 15/830,470 Office Action dated Jul. 5, 2018.
U.S. Appl. No. 15/855,744 Office Action dated Apr. 27, 2018.
U.S. Appl. No. 15/870,561 Office Action dated Jun. 15, 2018.
U.S. Appl. No. 15/893,523 Notice of Allowance dated Jun. 15, 2018.
U.S. Appl. No. 15/893,523 Notice of Allowance dated May 7, 2018.
U.S. Appl. No. 15/909,784 Office Action dated Jul. 13, 2018.
U.S. Appl. No. 15/909,826 Office Action dated May 2, 2018.
Barriobero-Vila et al. Inducing Stable $\alpha + \beta$ Microstructures during Selective Laser Melting of Ti-6Al-4V Using Intensified Intrinsic Heat Treatments. Materials (Basel). Mar. 2017; 10(3): 268.
Bayerlein et al. Validation of modeling assumptions for the buildup simulation of laser beam melting on the basis of the residual stress distribution. Proceedings of ECCOMAS Congress 2016: VII European Congress on Computational Methods in Applied Sciences and Engineering. Crete Island, Greece, Jun. 5, 2016-Jun. 10, 2016. 11 pages.
Co-pending U.S. Appl. No. 16/125,644, filed Sep. 7, 2018.
Co-pending U.S. Appl. No. 16/137,295, filed Sep. 20, 2018.
EP15809160.3 European Search Report dated Aug. 7, 2018.
EP15866668.5 European Search Report dated Aug. 7, 2018.
Kant et al. An integrated FEM-ANN model for laser bending process with inverse estimation of absorptivity. Mechanics of Advanced Materials and Modern Processes. Dec. 2015, 1:6.
PCT/US2017/060035 International Search Report and Written Opinion dated Jul. 20, 2018.
PCT/US2018/020406 International Search Report and Written Opinion dated Jun. 28, 2018.
PCT/US2018/024667 International Search Report and Written Opinion dated Jul. 17, 2018.
Bondhus. Crystals, grains, and cooling. Web article. Copyright © 2009 Bondhus Corp. First published Feb. 10, 2005. Accessed Jul. 13, 2016. Printed on Jul. 30, 2018. 1 page. URL:< http://bondhus.com/metallurgy/body-3.htm>.
U.S. Appl. No. 15/374,616 Office Action dated Aug. 15, 2018.
U.S. Appl. No. 15/399,186 Notice of Allowance dated Sep. 17, 2018.
U.S. Appl. No. 15/435,065 Office Action dated Aug. 16, 2018.
U.S. Appl. No. 15/435,078 Office Action dated Aug. 16, 2018.
U.S. Appl. No. 15/634,267 Office Action dated Sep. 6, 2018.
U.S. Appl. No. 15/634,727 Office Action dated Sep. 20, 2018.
U.S. Appl. No. 15/803,686 Office Action dated Sep. 19, 2018.
U.S. Appl. No. 15/803,688 Office Action dated Sep. 20, 2018.
U.S. Appl. No. 15/830,421 Office Action dated Jul. 26, 2018.
U.S. Appl. No. 15/853,700 Office Action dated Sep. 11, 2018.
U.S. Appl. No. 15/861,548 Office Action dated Sep. 6, 2018.
U.S. Appl. No. 15/861,553 Office Action dated Aug. 7, 2018.
U.S. Appl. No. 15/886,544 Office Action dated Aug. 27, 2018.
U.S. Appl. No. 15/909,406 Office Action dated Aug. 27, 2018.
U.S. Appl. No. 15/909,806 Office Action dated Aug. 13, 2018.
U.S. Appl. No. 15/909,809 Office Action dated Aug. 10, 2018.
U.S. Appl. No. 15/909,826 Notice of Allowance dated Aug. 30, 2018.
U.S. Appl. No. 15/937,778 Office Action dated Sep. 21, 2018.
U.S. Appl. No. 15/937,812 Office Action dated Sep. 7, 2018.
Xu et al. In situ tailoring microstructure in additively manufactured Ti-6Al-4V for superior mechanical performance. Acta Materialia. vol. 125, Feb. 15, 2017, pp. 390-400.

* cited by examiner

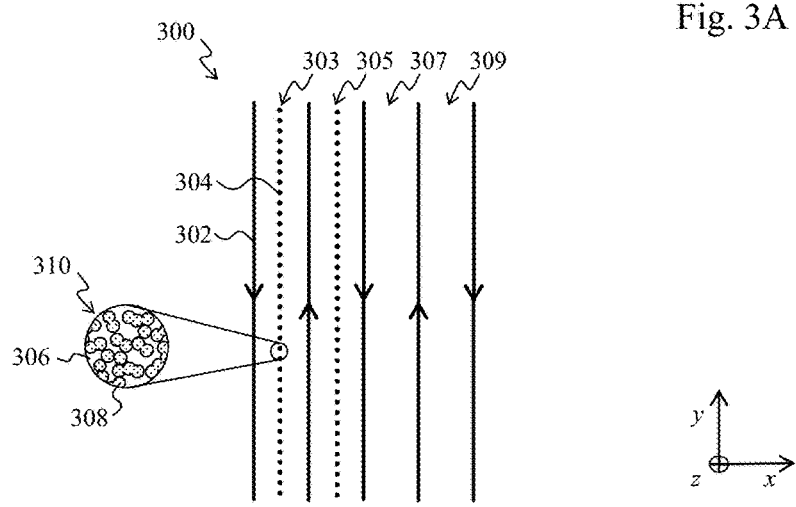
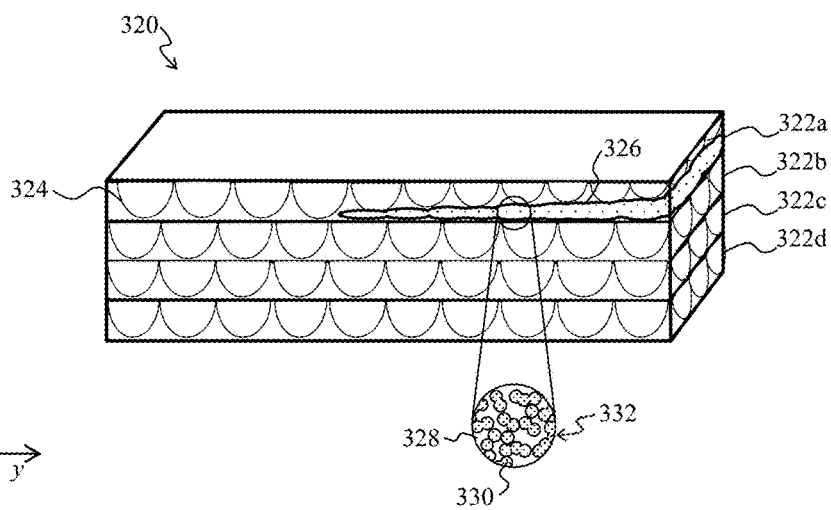

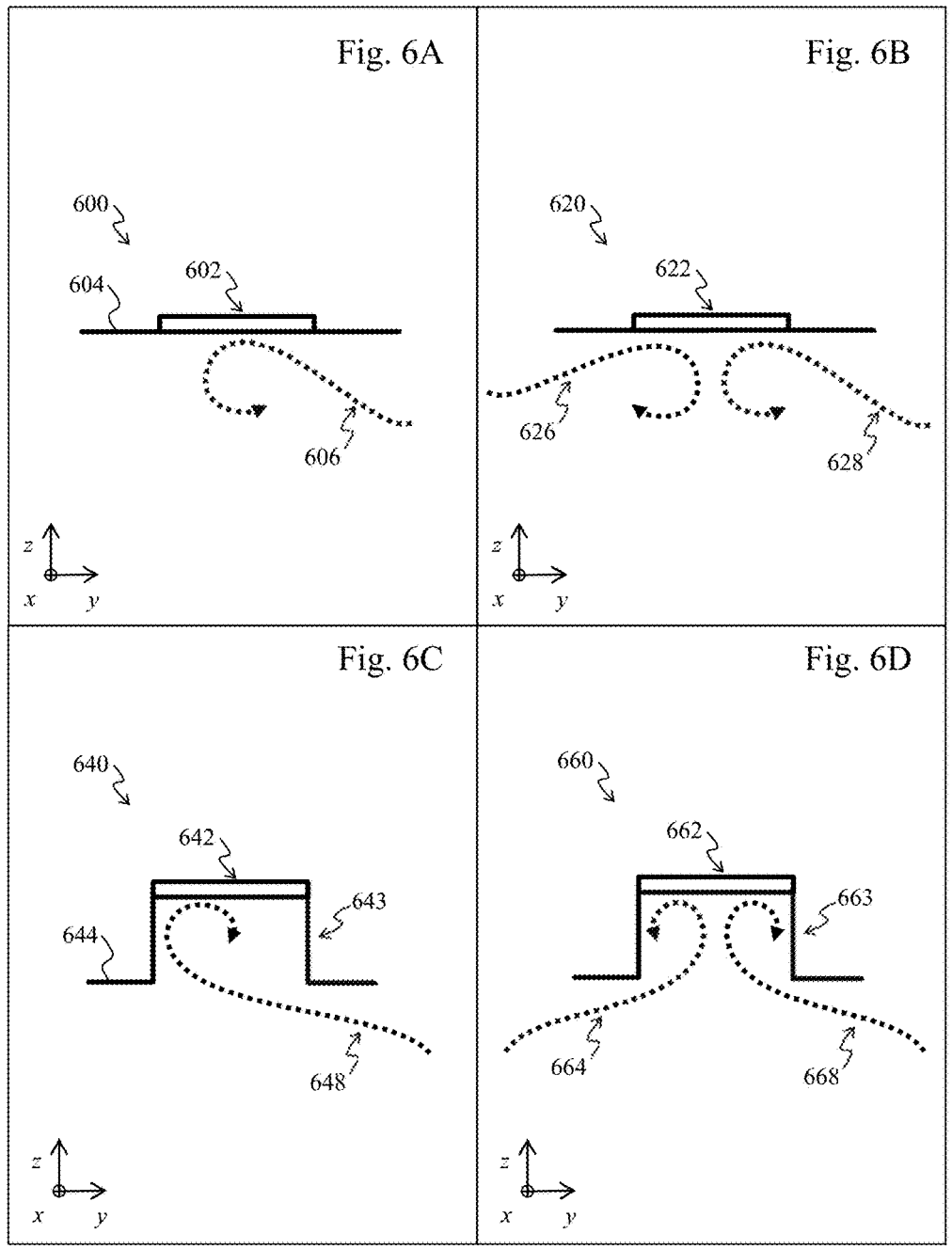

THREE-DIMENSIONAL PRINTING SYSTEMS AND METHODS OF THEIR USE

BACKGROUND

Three-dimensional (3D) printing is a process for making objects by sequential deposition of material, at times under computer control. For example, the objects can be made sequentially by forming multiple layers of material that are joined together to form a 3D object having desired dimensions. A variety of materials can be used, including metal, ceramic, or polymeric materials. 3D printing systems can vary in the method by which a starting material is transformed to print the 3D object. The transformation methods can include melting, sintering, softening, hardening, or liquifying a starting material to form the 3D object. The quality of a 3D object can depend on the processing methodology and conditions for printing the 3D object. For example, the type of material, the temperatures used to perform the transformation, as well as atmospheric conditions surrounding the 3D object during its formation, may influence characteristics of the 3D object. These characteristics may include the shape, roughness, and porosity, of the 3D object. Currently needed are improved 3D printing systems and methods for controlling the characteristics of 3D objects to obtain the requested 3D object.

SUMMARY

In one aspect, systems, apparatuses, methods, controllers, and/or non-transitory computer-readable media (e.g., software) for printing three-dimensional objects is described.

In another aspect, an apparatus for printing a three-dimensional object comprises: a platform configured to support a powder bed comprising a powder material; a layer forming device configured to form multiple layers of the powder as part of the powder bed, which layer forming device comprises a blade or a roller configured to translate in a first direction over an exposed surface of the powder bed to planarize the exposed surface of the powder bed; an elevator operationally coupled with the platform, wherein the elevator comprises a motor configured to translate the platform in a second direction substantially perpendicular to the first direction; a processing chamber having an internal volume configured to enclose at least the exposed surface of the powder bed during the printing, wherein the processing chamber includes a ceiling wall; a laser configured to generate a laser beam that melts at least a portion of the powder bed to a molten material as part of the three-dimensional object during the printing; a window coupled to the ceiling wall of the processing chamber, which window is configured to permit the laser beam to pass therethrough to the internal volume of the processing chamber; a gas flow system configured to provide a flow of gas within the internal volume of the processing chamber, which flow of gas provides a stream of particles that progressively deposits an optical mask on an internal surface of the window, which optical mask progressively absorbs energy from the laser beam and modifies a peak power density of the laser beam during melting of at least one of the multiple layers of powder, wherein the optical mask causes the peak power density of the laser beam to vary by (i) at least 5% after forming 3,000 cm3 of the molten material compared to a variation of the peak power density of the laser beam transmitted through the window excluding the optical mask and (ii) at least 10% after forming 5,000 cm3 of the molten material compared to the variation of the peak power density of the laser beam transmitted through the window excluding the optical mask; a galvanometer scanner configured to translate the laser beam across the exposed surface of the powder bed in accordance with a path, wherein the galvanometer scanner is external to the internal volume of the processing chamber; and one or more controllers operationally coupled with the elevator, the layer forming device and the galvanometer scanner, which one or more controllers is configured to direct (a) the elevator to translate the platform in the second direction, (b) the layer forming device to translate in the first direction, and (c) the galvanometer scanner to direct the laser beam at the powder bed in accordance with the path.

In some embodiments, the optical mask causes the peak power density of the laser beam to increase during at least part of the melting of the at least one of the multiple layers of powder. In some embodiments, the optical mask causes the peak power density of the laser beam to decrease during at least part of the melting of the at least one of the multiple layers of powder. In some embodiments, during the printing, the apparatus is configured to melt at least about five (5) cubic centimeters of the molten material per hour. In some embodiments, the varied peak power density of the laser beam in accordance with one or both of (i) and (ii) is associated with forming regions of porosity within the three-dimensional object. In some embodiments, the regions of porosity are gradations of porosity across at least part of the multiple layers of the three-dimensional object. In some embodiments, the varied peak power density of the laser beam in accordance with one or both of (i) and (ii) is associated with forming regions of surface roughness on the three-dimensional object. In some embodiments, the peak power density is measured at the exposed surface of the powder bed. In some embodiments, the stream of particles includes particles that become entrained within the flow of gas at or above the exposed surface of the powder bed. In some embodiments, the particles comprise powder, soot, or spatter. In some embodiments, the one or more controllers is operationally coupled with the gas flow system, which one or more controllers is configured to control a velocity of the stream of particles. In some embodiments, the control is in real time during the printing of the three-dimensional object. In some embodiments, the apparatus is configured generate at least about five (5) milligrams per second (mg/sec) of gas-borne particles (e.g., from the powder bed) during the printing. In some embodiments, the gas flow system is configured to facilitate a turbulent movement of the stream of particles in the internal volume of the processing chamber. In some embodiments, (I) a (e.g., side) wall of the processing chamber and/or (II) a baffle in the processing chamber, is configured to facilitate the turbulent movement of the stream of particles. In some embodiments, (III) the wall of the processing chamber and/or (IV) the baffle in the processing chamber, is (e.g., substantially) normal to the internal surface of the window. In some embodiments, the turbulent movement is directly adjacent to the window. In some embodiments, the turbulent movement of the stream of particles comprises a cyclic movement, a backflow, a vortex, or a chaotic movement of the stream of particles. In some embodiments, the window is in a recessed portion of the processing chamber, wherein a side wall of the recessed portion causes the turbulent movement of the stream of particles to preferentially deposit particles on a select region of the internal surface of the window. In some embodiments, the select region is at an edge or a center of the window. In some embodiments, the select region is between an edge and a center of the window. In some embodiments, the wall of the recessed portion is (e.g., substantially) normal to the internal surface of the window. In some embodiments, the window is in a recessed portion of the processing chamber, wherein walls of the recessed portion causes the turbulent movement of the stream of particles to deposit particles substantially evenly across the internal surface of the window. In some embodiments, the gas flow system is configured to provide the flow of gas at a substantially constant velocity within the processing chamber during at least the melting of the at least the portion of the powder bed. In some embodiments, the flow of gas comprises an inert gas. In some embodiments, the flow of gas has a velocity ranging from about 0.2 to about 2 meters per second (m/sec). In some embodiments, particles within the stream of particles have average fundamental length scale (e.g., diameter) ranging from about 0.1 and about 1 micrometer (m). In some embodiments, particles within the stream of particles comprise at least about 10% metal oxide by volume. In some embodiments, the flow of gas has a peak horizontal velocity at a distance of about 15 to about 100 millimeters (mm) above the exposed surface of the powder bed In some embodiments, the flow of gas comprises a primary flow of gas and a recirculating flow of gas derived from the primary flow of gas, wherein the stream of particles is within the recirculating flow of gas In some embodiments, the gas flow system comprises one or more inlet openings and one or more outlet openings, wherein a primary portion of the flow of gas flows directly from the one or more inlet openings to the one or more outlet openings. In some embodiments, the one or more inlet openings or the one or more outlet openings correspond to openings of a perforated plate, a screen, a mesh or a gas permeable material. In some embodiments, the one or more inlet openings or the one or more outlet openings are operatively couple to, or comprise: a perforated plate, a screen, a mesh, or a gas permeable material. The gas permeable material can be a block or slab of material. The gas permeable material may be a material comprising (e.g., random) passages, voids (e.g., bubbles), and/or holes. The gas permeable material may comprise elemental metal, metal alloy, ceramic, an allotrope of elemental metal, a polymer, or a resin. The gas permeable material can be organic or inorganic. The gas permeable material may comprise a cloth. The gas permeable material may comprise a thread. In some embodiments, the primary portion of the flow of gas is in a (e.g., substantially) vertical direction. In some embodiments, the primary portion of the flow of gas in a (e.g., substantially) horizontal direction. In some embodiments, the one or more inlet openings are within an inlet region coupled to the ceiling wall of the processing chamber, and the one or more outlet openings are within a side wall or a floor of the processing chamber. In some embodiments, the one or more inlet openings are within a first side wall of the processing chamber, and the one or more outlet openings are within a second side wall or a floor of the processing chamber. In some embodiments, the laser is configured to generate the laser beam having an average power density ranging from about 100 to about 30,000 per centimeter squared (kW/cm2), which power density is measured at the exposed surface of the powder bed. In some embodiments, a power of the laser is configured to be modified during the printing. In some embodiments, the system further comprises an optical system configured to modify at least one characteristic of the laser beam, wherein the optical system is configured to focus or defocus the laser beam at the exposed surface of the powder bed. In some embodiments, the system further comprises a build module removably coupled to the processing chamber during the printing, wherein the processing chamber and the build module are configured to decouple from each other after the printing of the three-dimensional object. In some embodiments, decoupling processing chamber and the build module causes an external atmosphere to enter the internal volume of the processing chamber. In some embodiments, the stream of particles is disrupted before decoupling the processing chamber and the build module. In some embodiments, decoupling the processing chamber and the build module disrupts the stream of particles. In some embodiments, during the printing, the laser is configured to melt from about 1 to about 50 cubic centimeters per hour (cm3/hr) of the molten material. In some embodiments, during the printing is at least during the melting of the at least the portion of the powder bed to the molten material. In some embodiments, the apparatus comprises multiple lasers, multiple windows and/or multiple galvanometer scanners. In some embodiments, the window is at least about 85% transparent to the laser beam. In some embodiments, the window comprises silica or quartz. In some embodiments, the varied peak power density of the laser beam in accordance with one or both of (i) and (ii) is associated with forming a pattern of porosity and/or surface roughness within and/or on the three-dimensional object. In some embodiments, the pattern of porosity or surface roughness comprises (a) a gradual increase or decrease in porosity, or (b) a gradual increase or decrease in surface roughness, as measured across an area or length of the three-dimensional object. In some embodiments, the pattern of porosity comprises repetitive gradations in porosity and/or surface roughness in and/or on the three-dimensional object. In some embodiments, the controller is configured to facilitate cleaning of the window. In some embodiments, the cleaning is during the printing of the three-dimensional object. In some embodiments, the controller is configured to facilitate formation of a pattern of porosity and/or surface roughness, in and/or on the three-dimensional object. In some embodiments, the varied peak power density of the laser beam in accordance with one or both of (i) and (ii) is associated with forming a first region of the three-dimensional object having a first porosity of greater than about 1% and a second region of the three-dimensional object having a second porosity of about 1% or less. In some embodiments, the varied peak power density of the laser beam in accordance with one or both of (i) and (ii) is associated with forming a first region of the three-dimensional object having a first surface roughness of greater than about 50 micrometers and a second region of the three-dimensional object having a second surface roughness of about 50 micrometers or less. In some embodiments, the laser is configured generate the laser beam having a laser power density ranging from about 100 to about 30,000 Kilo Watts per centimeter squared (kW/cm2) at the exposed surface of the powder bed. In some embodiments, the gas flow system is configured to form the optical mask within the internal volume of the processing chamber. In some embodiments, a distance between the internal surface of the window and the exposed surface of the powder bed ranges from about 10 and about 100 centimeters (cm). In some embodiments, the one or more controllers operationally coupled with the gas flow system, which one or more controllers are configured to direct the gas flow system to provide the flow of gas within the processing chamber. In some embodiments, the one or more controllers operationally coupled with the gas flow system, which one or more controllers are configured to adjust the gas flow. In some embodiments, the one or more controllers operationally coupled with the gas flow system, which one or more controllers are configured to adjust the rate and/or location of particle deposition on at least a portion of the window.

Another aspect of the present disclosure provides a method for using the apparatuses disclosed herein (e.g., according to its intended function).

In another aspect, an apparatus for printing one or more 3D objects comprises a controller that is programmed to direct a mechanism used in a 3D printing methodology to implement (e.g., effectuate) any of the method and/or functions of the apparatuses disclosed herein, wherein the controller is operatively coupled to the mechanism.

In another aspect, a computer software product, comprising a non-transitory computer-readable medium in which program instructions are stored, which instructions, when read by a computer, cause the computer to direct a mechanism used in the 3D printing process to implement (e.g., effectuate) any of the method and/or functions of the apparatuses disclosed herein, wherein the non-transitory computer-readable medium is operatively coupled to the mechanism.

Another aspect of the present disclosure provides a non-transitory computer-readable medium comprising machine-executable code that, upon execution by one or more computer processors, implements any of the methods and/or functions of the apparatuses disclosed herein.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods and/or functions of the apparatuses disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig." and "Figs." herein), of which:

FIGS. 3A and 3B schematically illustrate various views of 3D objects;

FIGS. 6A-6D schematically illustrate portions of 3D printers;

Figure 1:
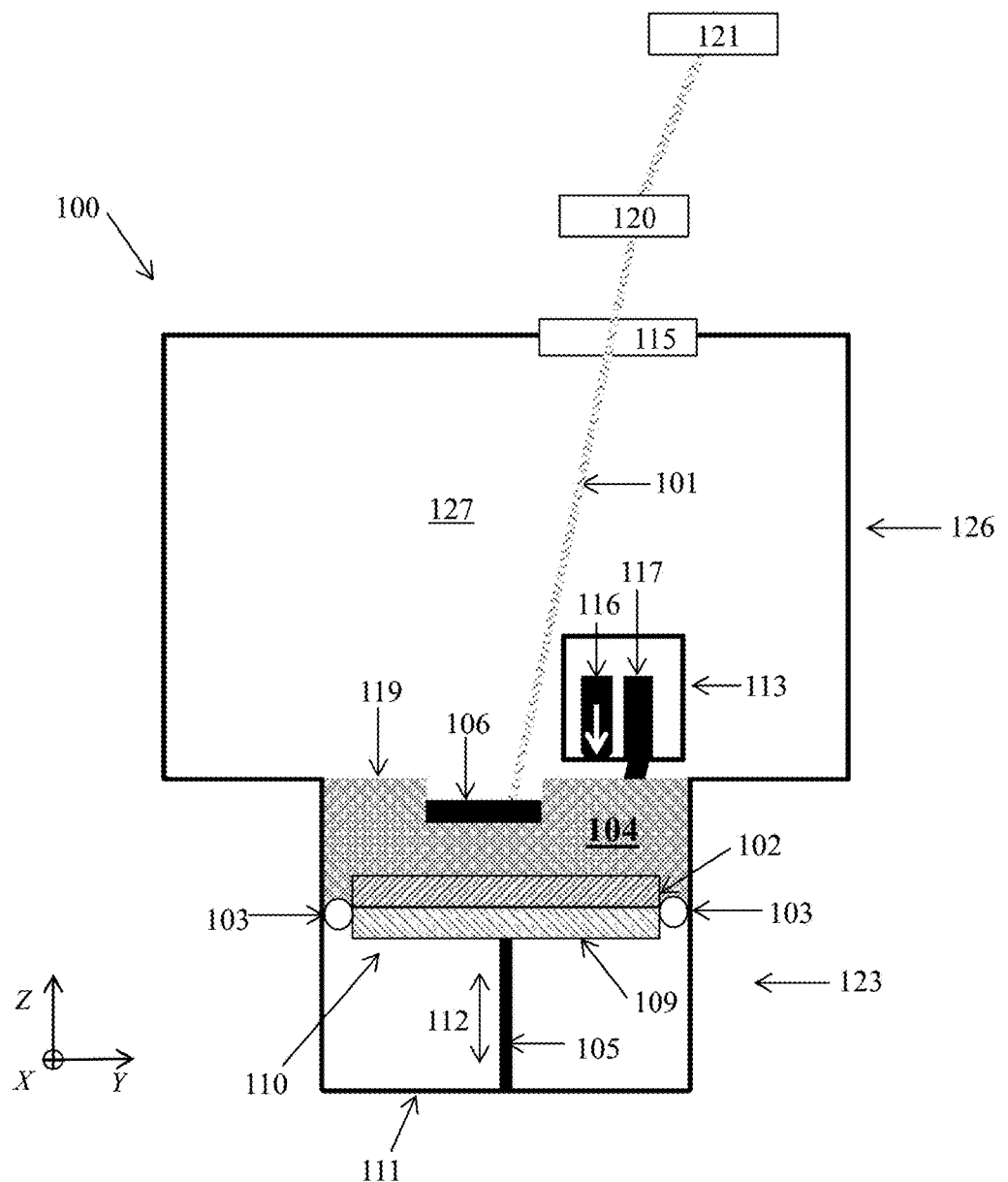
FIG. 1 schematically illustrates a section view of a portion of a three-dimensional (3D) printer.

The figures and components therein may not be drawn to scale. Various components of the figures described herein may not be drawn to scale.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

The present disclosure provides apparatuses, systems and methods for controlling aspects of printing 3D objects. In some embodiments, the apparatuses, systems and methods are used to form features, such as porous or rough regions, within and/or on the 3D objects. In some cases, the 3D object includes gradations of porous or rough regions, where the porosity or roughness gradually transitions from a less porous or rough region to a more porous or rough region within the 3D object. In some embodiments, the energy (e.g., laser) beam power is varied such that certain portions of a powder bed (used to form the 3D object) experience higher power density than other portions of the powder bed. In some embodiments, an optical mask is used to absorb some of the energy of the laser beam, thereby modifying the characteristics of the laser beam before it impinges upon the powder bed. In some embodiments, the optical mask progressively changes during a printing process to allow for (e.g., gradual) changes in laser beam peak power density. The optical mask may be formed on an optical element, such as a window, of the 3D printer. In some embodiments, the optical mask is formed by (e.g., gradual) accumulation of debris on the optical element, e.g., particles transited to the window by a stream of gas.

The term "operatively coupled" or "operatively connected" refers to a first mechanism that is coupled (or connected) to a second mechanism to allow the intended operation of the second and/or first mechanism. The term "configured to" refers to an object or apparatus that is (e.g., structurally) configured to bring about a result.

Terms such as "a," "an" and "the" are not intended to refer to only a singular entity, but include the general class of which a specific example may be used for illustration. The terminology herein is used to describe specific embodiments, but their usage does not limit the specified embodiments.

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

Fundamental length scale (abbreviated herein as "FLS") can refer herein as to any suitable scale (e.g., dimension) of an object. For example, a FLS of an object may comprise a length, a width, a height, a diameter, a spherical equivalent diameter, or a diameter of a bounding sphere. In some cases, FLS may refer to an area, a volume, a shape, or a density.

The present disclosure provides three-dimensional (3D) printing apparatuses, systems, software, and methods for forming 3D objects. A powder, as understood herein, is a granular material before it has been melted using a printing operation (also referred to as "printing"). During melting can refer to the time frame in which a laser beam is impinging on the powder material and transforming (e.g., melting) the powder material to a molten state. The melting can be complete or partial melting. During printing can refer to the time frame in which one or more 3D objects are being formed. Reference is made herein as to a "build," which can refer to the one or more 3D objects being printed above (e.g., on) a build platform. During a build can refer to the time frame for printing one or more 3D objects above (e.g., on) a build platform. In some cases, the printing apparatus is continuously in operation (e.g., printing a portion of the one or more 3D objects and/or forming a layer of powder) during a build. In some cases, one or more operations of the printing apparatus is/are paused (e.g., interrupted) during a build. The printer may be referred herein as a "printing system" and a "printing apparatus."

In some embodiments, the size of the particles of the powder range from about 10 micrometers (μm) to about 50 μm in fundamental length scale (e.g., diameter). The printing can include sequentially melting multiple sequentially deposited layers of powder respectively, where one layer of melted (molten) material fuses with an adjacent layer to form at least a portion of a 3D object. Some of the printing techniques described herein are in accordance with selective laser melting (SLM), selective heat sintering (SHS), or selective laser sintering (SLS) techniques. The powder can be made of any suitable material. For example, the powder may comprise an elemental metal or metal alloy. In some embodiments, the material comprises a metal, such as steel (e.g., stainless steel), aluminum, aluminum alloys, nickel, nickel alloys (e.g., Inconel), titanium and/or titanium alloys.

The printing system may include an enclosure. FIG. 1 shows a cross-section side view of an example printer having an enclosure 100, which includes a processing chamber 126 and a build module 123 that is configured to accommodate the powder bed 104. The processing chamber has walls that define an internal volume 127. The internal volume of the processing chamber can accommodate a laser beam 101 generated by a laser 121. In some cases, the laser beam is directed through a window 115 that is coupled to a wall of the processing chamber. The window may be referred herein as an "optical window." In some embodiments, the window is coupled to a ceiling (e.g., top wall) of the processing chamber. The window 115 can be made of any suitable material. In some embodiments, the window is made of a material that is at least about 85%, 90%, 95% or 99% transparent to certain wavelengths of the laser beam. In some cases, the window is comprised of a silica (e.g., fused silica) or quartz (e.g., fused quartz). The laser beam is directed at an exposed surface 119 of the powder bed to melt at least a portion of the powder. The impinged-on portion of the powder bed that has been melted, subsequently cools to a hardened material 106 as part of the 3D object. The 3D object may be anchored to the platform (e.g., comprising a base such as 102), or be suspended anchorlessly in the powder bed (e.g., 104). Any of the enclosure structure parts and/or platform may comprise elemental metal, metal alloy, or ceramic (e.g., as described herein).

The internal volume of the processing chamber is configured to enclose at least the exposed surface (e.g., 119) of the powder bed (e.g., 104) and maintain an atmosphere while the melting process occurs. For example, the walls of the processing chamber can at least partially isolate the internal atmosphere from an external environment (e.g., ambient environment). In some cases, the external environment is the environment of a room in which the printer is located. In some cases, the processing chamber is further enclosed within another environment different than the external environment. For example, the processing chamber, build module and/or additional chambers (e.g., unpacking station) may be enclosed within a larger enclosure that has its own internal environment. In some embodiments, the atmosphere in the processing chamber includes one or more inert gases, such as argon and/or nitrogen. In some cases, the walls of the processing chamber may function to protect users of the printer from contents of the atmosphere, laser beam, debris, and/or the powder, from users of the printer. For example, the walls may provide protection against the laser beam and/or any combustible material.

The laser can be any suitable type of laser, such as a fiber laser, a solid-state laser, or a diode laser. In some embodiments, the laser is configured to generate an optical power output (laser power) ranging from about 100 Watts to about 1,000 Watts. In some embodiments, the laser power is modified (e.g., increased and/or decreased) during a printing operation. The laser power modification can be controlled manually and/or automatically (e.g., using a controller). In some embodiments, the laser may be configured to generate a laser beam having a power density on the powder bed ranging from about 100 kilowatts per centimeter squared ($kW/cm^2$) to about 30,000 $kW/cm^2$. In some embodiments, the laser is configured to generate a laser beam having peak wavelength in a range of about 800 nm to about 1,500 nm. In some embodiments, the laser is configured to generate a laser beam having a spot size on the powder bed having a diameter ranging from about 50 micrometers (μm) to about 500 μm.

Characteristics and/or movement of the laser beam can be modified by one or more optical elements (e.g., 120), which may be situated inside or outside of the enclosure and/or processing chamber. In some embodiments, the optical elements and/or the laser are enclosed within a separate chamber (e.g., external) (e.g., adjacent) to the processing chamber and/or part of the enclosure of the printer). The optical elements can include one or more scanners (e.g., galvanometer scanners), polygons, mechanical stages (e.g., X-Y stages), piezoelectric devices, gimbles, mirror, lenses, windows, beam splitters, and/or prisms. The scanners can be configured to direct (e.g., by deflection) the laser beam across the surface of the powder bed in accordance with a (e.g., predetermined) path. In some embodiments, the scanners are configured to provide scan speeds up to about 5 meters per second (m/s). The laser path can include one or more hatches. The laser path can be in accordance with a stripe pattern, island pattern and/or chessboard pattern. The laser beam scanning may be unidirectional, bidirectional, spiral and/or double scan. The window (e.g., 115) can be considered an optical element in that it allows transmission of laser beam (e.g., 101) into the internal volume (e.g., 127) of the processing chamber.

The enclosure may include one or more build modules (e.g., 123). A build module can be removably coupled with the processing chamber or be integrally coupled to the processing chamber. The build module can include an internal volume configured to enclose at least a portion of a platform (e.g., 110) (also referred to herein as a "build platform"), which is configured to support the powder bed. In some cases, the platform includes a base (e.g., 102) and/or a substrate (e.g., 109). In some embodiments, the surface of the platform that supports the powder bed has an area ranging from about 100 square centimeters ($cm^2$) to about 10,000 $cm^2$. The internal volume of the build module can be configured to enclose at least a portion of an elevator (e.g., 105) that is configured to move (e.g., vertically translate) the platform. In some embodiments, the platform is configured to translate in vertical steps ranging from about 20 micrometers (μm) to about 500 μm. In some embodiments, the platform is configured to support a powder bed having a height (e.g., in Z direction of FIG. 1) ranging from about 100 millimeters (mm) to about 1,000 mm. In some embodiments, one or more seals (e.g., 103) enclose the powder in a selected area within the build chamber (e.g., away from the elevator). The elevator may comprise an actuator (e.g., a motor).

The build module may be removably engageable with the processing chamber (e.g., configured to engage and disengage). For example, the build module may be engaged with the processing chamber during a printing operation to at least partial isolate the internal volume of processing chamber from the external atmosphere. After a printing operation, the build module can be disengaged from the processing chamber. In some cases, the disengagement opens the internal volume of the processing chamber and/or the build module to the external atmosphere. In some embodiments, the build module and/or the processing chamber (each) includes a shutter that isolates the atmosphere within the build module and/or the processing chamber upon disengagement.

Figure 2:
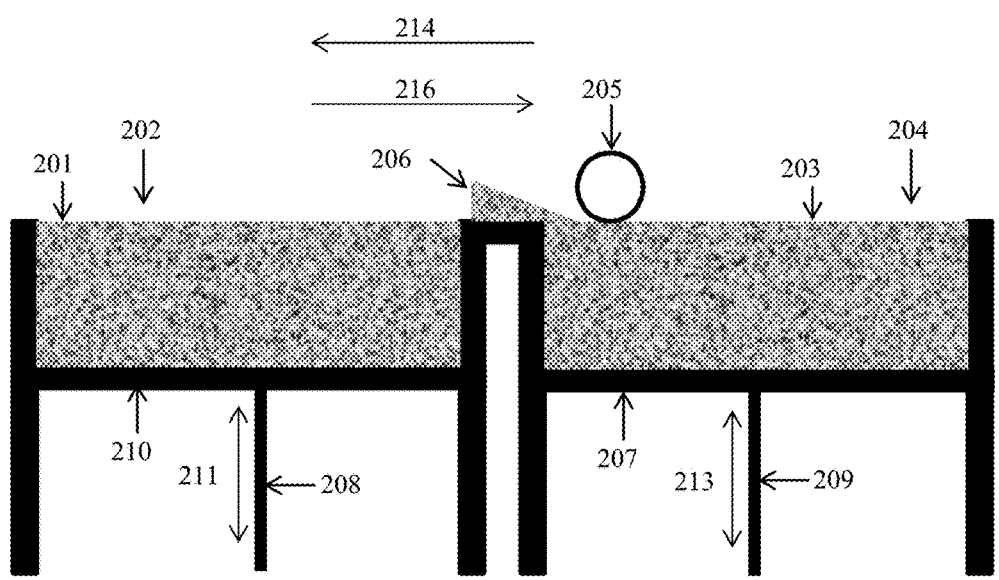
FIG. 2 schematically illustrates a section view of a portion of a 3D printer.

The 3D printer may include a layer forming devices (e.g., 113) (also referred to herein as a "layer dispenser"). The layer forming device may include a powder dispenser (e.g., 116) and/or a leveler (e.g., 117). The leveler (also referred to herein as "planarizer") can include at least one blade or roller that contacts the powder bed a provide a leveled (e.g., planar) exposed surface for the powder bed. In some embodiments, the 3D printer includes a container for holding a supply of powder (e.g., a reservoir). FIG. 2 shows a side view of an example container 204 adjacent build module 202, which includes platform 210. The platform can be (e.g., vertically) translatable 211 by an elevator 208 (comprising an actuator). In some cases, the layer forming device translates and pushes a portion (e.g., 206) of the powder from the container to the region above the platform. The translation can be in a first direction (e.g., 214) toward a region above the platform, and in a second direction (e.g., 216) toward the container (e.g., to prepare for forming a subsequent layer). In some embodiments, a second elevator (e.g., 209) of the container is translatable (e.g., 213) so as to translate the supply of powder (e.g., upward). The translating of the layer dispenser can be in directions (e.g., substantially) perpendicular to a translation direction (e.g., 211) of the platform and/or a translation direction (e.g., 213) of the support member (e.g., 207) of the container. In some embodiments, the layer dispenser is configured to provide a layer of powder having a thickness ranging from about 20 micrometers (μm) to about 500 μm.

Figure 8:
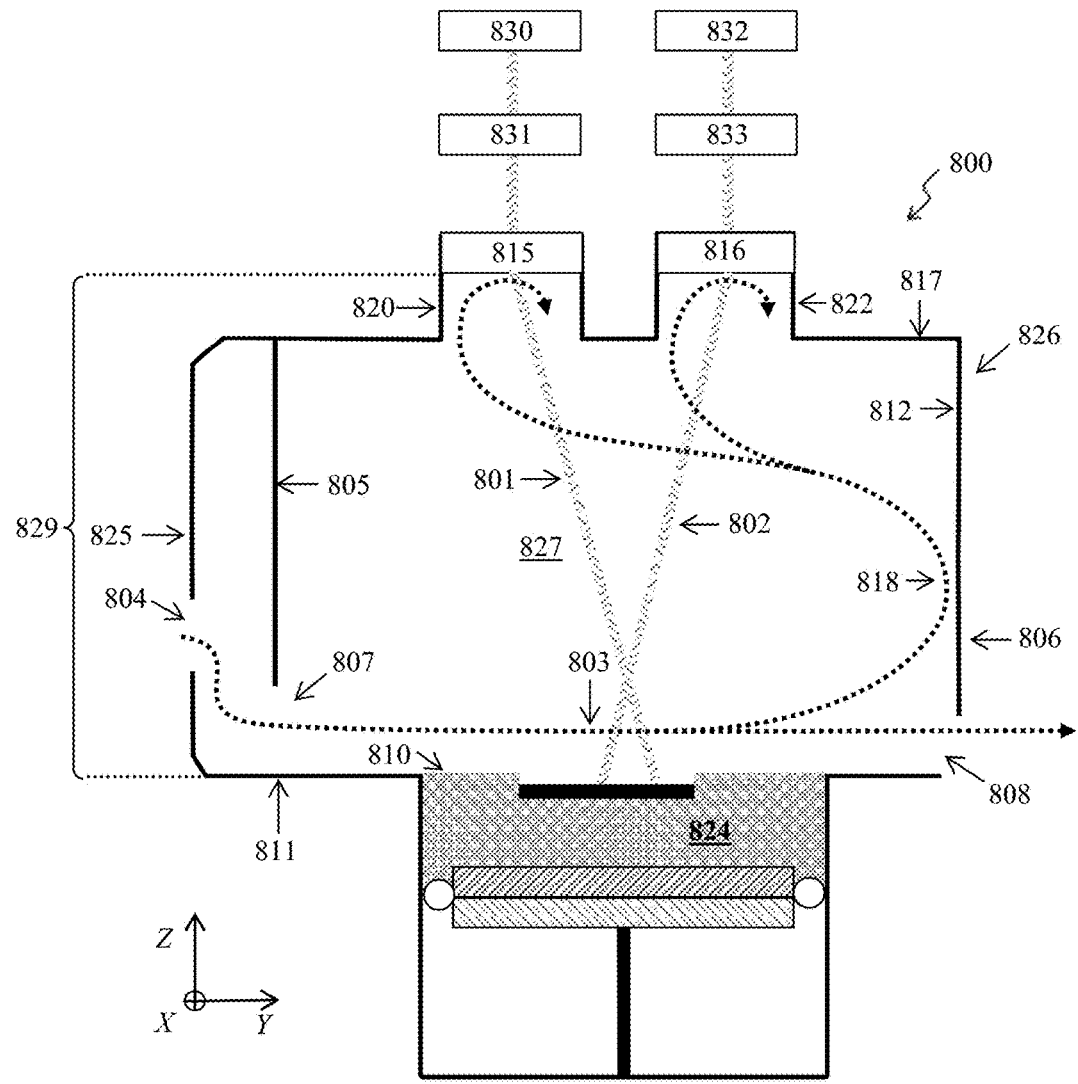
FIG. 8 schematically illustrates a section view of a portion of a 3D printer.

In some cases, the printer includes more than one laser. For example, the printer can have two, three, four, five, or more lasers. FIG. 8 shows a section view of a portion of an example printer having two lasers 830 and 832, optical elements 831 and 833 and windows 815 and 816 for directing laser beams 801 and 802 respectively toward the powder bed 824. At one time, at least two of the lasers can be used simultaneously or sequentially (e.g., one at a time). In some applications, multiple laser beams (e.g., 2, 3, 4, or 5) are used in parallel. In some cases, at least two laser beams are scanned at different rates, and/or along different paths. For example, the movement of a first laser beam may be faster than the movement of a second laser beam. In some cases, at least two laser beams are scanned at (e.g., substantially) the same rates, and/or along (e.g., substantially) the same paths.

The printing systems described herein are configured to change a characteristic of the laser beam(s). In some embodiments, the laser beam characteristic is changed during a printing operation (e.g., in situ and in real-time). In some embodiments, the power of the laser can be modified to change the power density of the laser beam at the exposed surface of the powder bed. In some embodiments, the one or more optical elements are used to modify the laser beam spot size and/or focus at the exposed surface of the powder bed. A different laser beam energy may cause the powder to melt in different ways. For example, a first laser beam characteristic(s) can cause the powder to melt in a way that results in pores forming in the 3D object, while a second laser beam characteristic(s) can cause the powder to melt without forming pores in the 3D object. As another example, a first laser beam characteristic(s) can cause the powder to melt in a way that results in a rough surface on the 3D object, while a second laser beam characteristic(s) can cause the powder to melt in a way that results in a smooth surface on the 3D object. A smooth surface may be a low roughness surface, e.g., having a low Ra value. Low roughness may be relative to a rough surface that has a high roughness, e.g., having a high Ra value. The laser beam characteristic(s) can be a set of laser beam characteristics. Changing the laser beam characteristic(s) during the printing process can cause different portions of the 3D object to have regions of differing porosity and/or surface roughness. For example, a first object (or a first portion of an object) can have a porosity less than about 1%, 2%, 3%, 4% or 5% by volume, and a second object (or a second portion of the object) can have a porosity greater than about 1%, 2%, 3%, 4% or 5% by volume. For example, a first object (or a first portion of an object) can have a surface roughness (Ra) less than about 50 micrometers (μm), 60 μm, 70 μm, 80 μm, 90 μm, 100 μm or 150 μm, and a second object (or a second portion of the object) can have an Ra greater than about 50 μm, 60 μm, 70 μm, 80 μm, 90 μm, 100 μm or 150 μm. The laser beam characteristic may comprise power density, speed, trajectory, Andrew number, footprint on the exposed surface, cross-section, pulse frequency, dwell time, intermission time, or focus.

Figure 16:
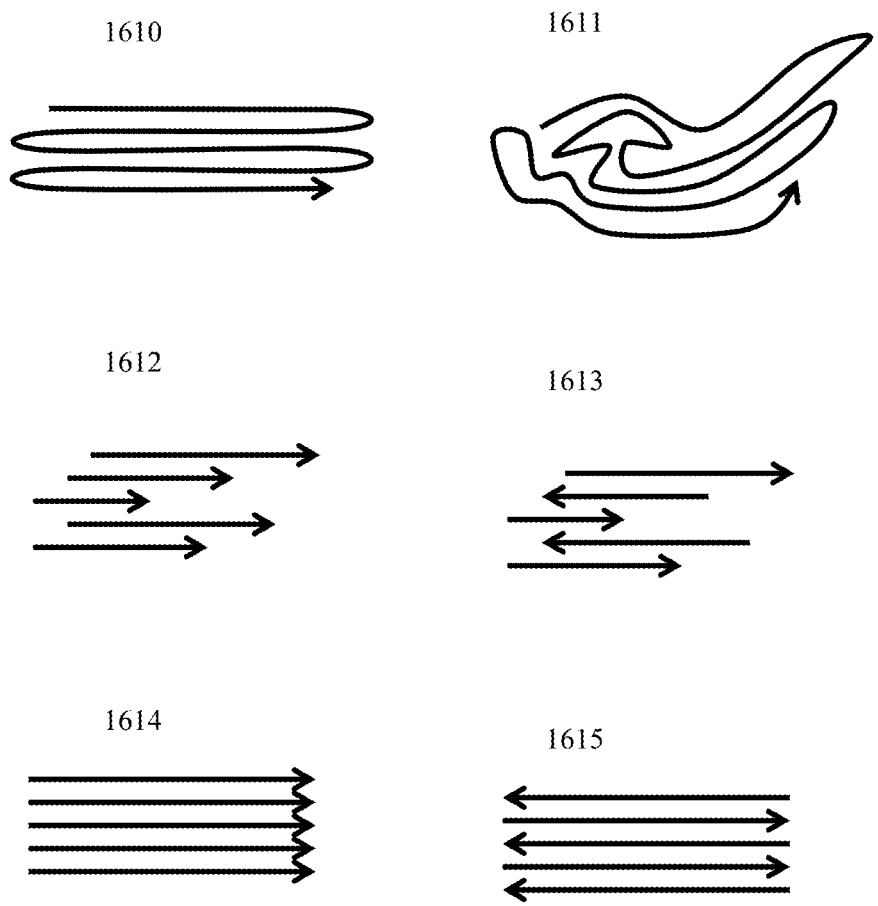
FIG. 16 schematically illustrates various paths.

In some cases, a pattern of pores is formed in accordance with a path of the laser beam. FIG. 3A illustrates a top view of a portion of an object 300 having a pattern of pores 304. During a printing operation, the center of the laser beam can be scanned across a layer of the powder bed along a path 302. The path can be in straight lines, curved lines, and/or winding (e.g., serpentine) lines, and can be continuous or discontinuous. FIG. 16 shows top-down view examples of various paths along which a laser beam may travel. The path may have any suitable shape (e.g., paths 1610-1615), and can be continuous (e.g., 1610, or 1611) or discontinuous (e.g., 1612, 1613, 1614, or 1615). The paths may be parallel or non-parallel with respect to each other. The laser beam can move along the path in opposite directions (e.g., shown by arrows in FIG. 3A) or in the same direction. The intervening regions (e.g., 303, 305, 307 and 309) between the paths (e.g., 302) may experience more or less energy provided by the laser beam, depending on one or more of the laser beam characteristics. When the energy is sufficiently high to cause the powder to melt (e.g., at or above the melting point), and sufficiently low to prevent the molten powder from evaporating, the powder particles may fuse together with substantially no pores (as shown in intervening regions examples of 307 and 309). When the energy is sufficiently low to cause the powder to only partially melt, the powder particles may partially fuse together and form pores (as shown in intervening regions examples of 303 and 305). The pores may also manifest if the energy of the laser is sufficiently high to cause part of the molten material to evaporate. In the example shown in FIG. 3, inset 310 shows powder particles 308 that are partially fused together to form pores 306.

In some cases, pores may be associated with partially melting through a thickness of a layer of powder. FIG. 3B illustrates a perspective section view of a portion of an object 320, having multiple layers 322a, 322b, 322c and 322d. During printing, the laser beam can melt a layer of powder to a corresponding layer of molten material, which hardens to hardened material. The printing process can involve forming melt pools (e.g., 324) in each layer. The melt pools may have (e.g., substantially) hemispherical shapes. In some cases, the laser beam transmits insufficient energy to melt the powder through the entire thickness of a layer of powder. This can cause regions (e.g., 326) of one or more of the layers to be only partially melted, thereby making these regions more porous. Inset 332 shows powder particles 330 that are partially fused together so as to form pores 328. In some cases, the thickness-related porous regions have a planar shape (e.g., in accordance with a layer).

Figure 4:
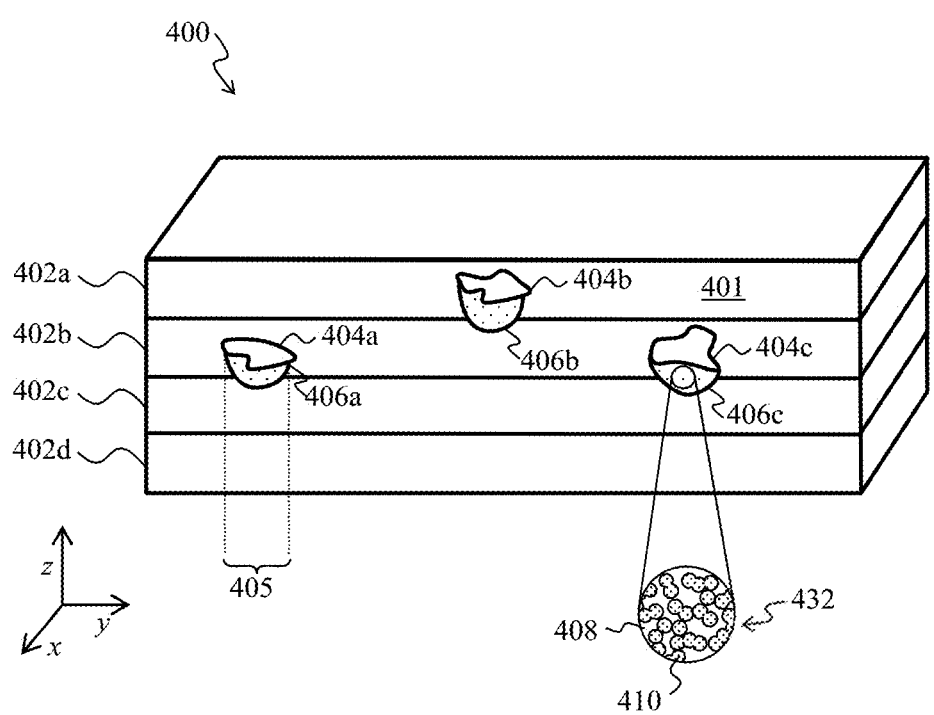
FIG. 4 schematically illustrates a 3D object.

In some cases, the pores are associated with spatter that may form during the printing process. FIG. 4 illustrates a perspective section view a portion of object 400 having spatter 404a, 404b and 404c. The spatter may correspond to droplets of molten or partially molten material ejected from the surface of powder bed due to the impingement (e.g., irradiation) of the laser beam. The ejected spatter can fall on the powder bed and/or the object, and may be incorporated in the object. The spatter may be situated within a single layer (e.g., 402a, 402b, 402c or 402d) or span multiple layers of the object. Spatter may or may not be detectable within the object. For example, the spatter may re-melt during the printing process such that the spatter has (e.g., substantially) the same composition (e.g., microstructure) as surrounding portions 401 of the object. In some cases, the spatter has a different microstructure than surrounding portions 401 of the object. During formation of subsequent layers, the spatter may at least partially occlude regions of powder, (e.g., below the splatter) from the laser beam. This can cause regions 406a, 406b and 406c of one or more layers to only partially fuse together. Inset 432 shows powder particles 410 that are partially fused together to form pores 408. Porous regions 406a, 406b and 406c may be detectable even if the spatter 404a, 404b and 404c is not. The detection may be using X-ray radiation (e.g., of the 3D object), or microscopy (e.g., inspecting a slice of the 3D object). The shape and size of the spatter-related porous regions can vary depending, in part, on the size and shape of the corresponding spatter. The debris may comprise spatter.

Figure 5A:
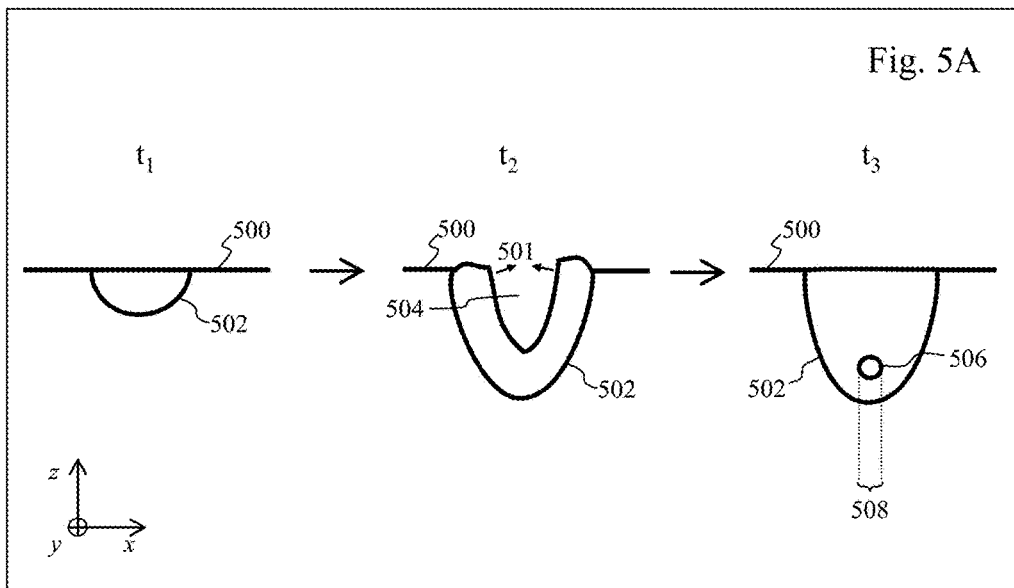
FIGS. 5A and 5B schematically illustrate various views of 3D objects.
Figure 5B:
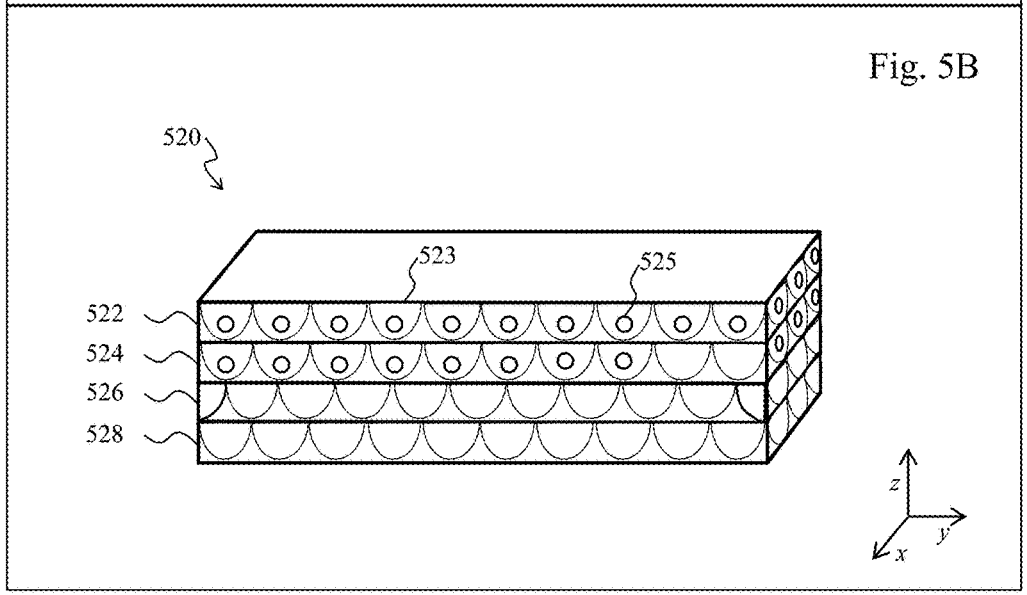

In some cases, the pores are associated with keyholing. Keyholing can occur when the laser beam has an intensity great enough to cause the molten material to evaporate (e.g., form gas), which may cause a void to form within a central region of the melt pool. Keyholing is often associated with forming high aspect ratio melt pools, where a depth of the melt pool is larger than a width of the exposed surface of the melt pool in at least one vertical cross section of the melt pool. FIG. 5A shows section views of a portion of an object experiencing keyholing. At a first time $t_1$, a laser beam first impinges upon the powder bed (e.g., 500) to form a melt pool (e.g., 502). At a second time t2, the energy imparted by the laser beam is sufficiently high to form a keyhole (e.g., 504), corresponding to a voided region within a central region of the melt pool. The surface tension of the liquefied or partially liquefied material of the melt pool can cause edges of the keyhole toward each other, in accordance with arrows (e.g., 501). At a third time t3, the edges of the keyhole can fuse together and form a porous region (e.g., 506) to remain within the central region of the melt pool. The porous region (e.g., 506) may have one or more pores (e.g., bubbles). The keyhole-related porous region can have a diameter (e.g., 508) that are (e.g., substantially) equal to or less than the diameter of its associated melt pool. In some embodiments, the average diameter (e.g., 508) of the melt pool in the porous region (e.g., 506) ranges between about 10 micrometer (μm) and about 500 μm. FIG. 5B shows a perspective view of an object (e.g., 520) having multiple keyhole-related porous regions (e.g., 525) residing within central regions of at least some of the melt pools (e.g., 523). In some cases, process conditions can be controlled to form keyhole-related porous regions within some layers (e.g., 522 and 524), while other layers (e.g., 526 and 528) are (e.g., substantially) pore-free. Keyhole-related pores can be formed by increasing the amount of energy delivered by the laser to the exposed surface of the powder bed. The increase in the amount of energy delivered can be (i) by increasing the laser power and/or (ii) by removing or partially removing an optical mask from a window (e.g., between printing operations). In some cases, the optical mask is removed (or partially removed) after melting a prescribed portion of the layer, a prescribed number layers of powder, or after a prescribed number of objects have been formed.

It should be noted that the shapes and sized of the pores may vary depending on how they are formed. For example, lack of fusion related pores described above with reference to FIGS. 3A-3B and 4 may have irregular shapes and differing sizes. For example, keyhole related pores described above with reference to FIGS. 6A-6B may have (e.g., substantially) spherical shapes.

The printing systems described herein can include one or more controllers that is configured to execute the methods used to form 3D objects having gradations of porosity and/or surface roughness. For example, one or more characteristics (e.g., peak intensity and/or focus) of the laser beam(s) can be changed during formation of a 3D object. The change can take place during melting of a single layer of powder, or take place during melting of multiple layers of powder. The change can be gradual or abrupt. The 3D object can have a pattern of porosity or surface roughness. In some embodiments, the pattern of porosity or surface roughness is a gradual increase or decrease in porosity or surface roughness as measured across an area or length of the 3D object. In some embodiments, the optical mask forms a first region of the 3D object having a porosity of greater than about 1% and a second region of the 3D object having a porosity of about 1% or less. In some embodiments, the optical mask forms a first region of the 3D object having a surface roughness (Ra) of greater than about 50 micrometers and a second region of the 3D object having a surface roughness of about 50 micrometers or less. Porosity can refer to the volume of voids as a percentage of a total volume of the 3D object. Surface roughness (Ra) can correspond to the arithmetic average of the absolute values of the profile height deviations from the mean line, recorded within the evaluation length, e.g., in accordance with American Society of Mechanical Engineers (ASME) B46.1 standards. In some applications, the surface roughness is measured along a surface of the 3D object that is at a prescribed angle in relation to the exposed surface of the powder bed and/or the support surface of the platform. Such surface roughness may stem from the layer-wise formation of the 3D object. Such surface roughness may relate to the height of the powder layer used to form a layer of solid material as part of the 3D object. The 3D object may comprise a plurality of layers having an average layering plane. In some embodiments, the surface roughness is measured along a surface of the 3D object that is at an angle relative to the average layering plane. The average layering plane may be (e.g., substantially) parallel to the exposed surface of the powder bed and/or the support surface of the platform, during the printing. The average layering plane may be (e.g., substantially) perpendicular to the gravitational field vector. The acute angle between the exposed surface (portion) and the average layering plane may range from about 1 degrees to about 30, 35, 45, 50, 80, or 85 degrees.

One way of controlling the one or more characteristics of laser beam(s) is by using one or more controllers operatively coupled to the printing system. For example, the controller (s) can be configured to increase and/or decrease the laser beam intensity while melting a layer of powder, and/or between melting layers of powder. In some cases, the one or more controllers are configured to cause the one or more optical elements to adjust the depth of field (effective focus range) of the laser beam(s) during a printing operation. In some embodiments, the change is based on input from the one or more sensors, such as thermal sensor that measure a thermal signal of the powder as it is being melted.

Another way of controlling characteristics of the laser beam(s) is by using an optical mask. The optical mask can be configured to absorb at least some of the energy (e.g., light) of the laser beam before the laser beam reaches the powder bed. The optical mask may be disposed on an optical element, such as a mirror or a window, where a path of the laser beam travels. In some embodiments, the optical mask is formed by a stream of particles that progressively deposits the particles on the optical element during a printing operation. FIGS. 6A-6D show section views of windows of 3D printing systems, indicating streams of particles that form various optical masks, in accordance with some embodiments. FIG. 6A shows printing system 600 having a window 602 coupled to an enclosure having a wall 604 and configured to allow a laser beam to travel therethrough to an internal volume of the enclosure (e.g., a processing chamber). The internal surface of the window (e.g., 602) can (e.g., substantially) flush with an internal surface of the enclosure wall (e.g., 604). A stream of particles (e.g., 606), which corresponds to a flow of gas that has entrained particles, can be configured to carry particles toward an internal surface of the window to deposit at least a portion of the particles on the internal surface. The stream of particles (e.g., 606) can be provided by a turbulent movement of gas within the enclosure (e.g., processing chamber). The turbulent movement may include a cyclic (e.g. circulating) movement, a backflow, a vortex and/or a chaotic movement. FIG. 6B shows a printing system 620 where a plurality (e.g., two) streams of particles 626 and 628 are configured to carry and deposit particles onto an internal surface of a window 622. The plurality of streams may be symmetric or asymmetric (e.g., having a mirror symmetry). FIG. 6C shows printing system 640 having a recessed portion 643 that recesses window 642 with respect to an internal surface of an enclosure 644. A stream of particles (e.g., 648) can enter the recessed portion and deposit particles onto the internal surface of the window (e.g., 642). In some cases, the recessed portion (e.g., 643) can cause the stream of particles to change course (e.g., recirculate) within the recessed portion. The change of course may comprise a turbulent movement (e.g., a backflow). FIG. 6D shows printing system 660 having a window 662 that is recessed in recessed portion 663, with a plurality (e.g., two) streams of particles 664 and 668 entering the recessed portion for depositing particles onto the internal surface of window 662. The plurality of streams may be symmetric or asymmetric (e.g., having a mirror or rotational symmetry).

Figure 7A:
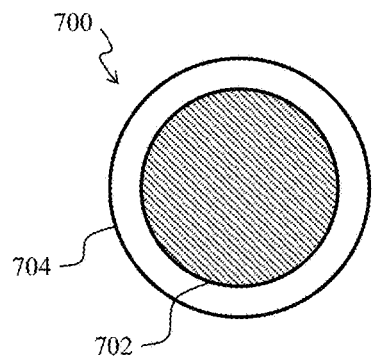
FIGS. 7A and 7B schematically illustrate section views of particles.
Figure 7B:
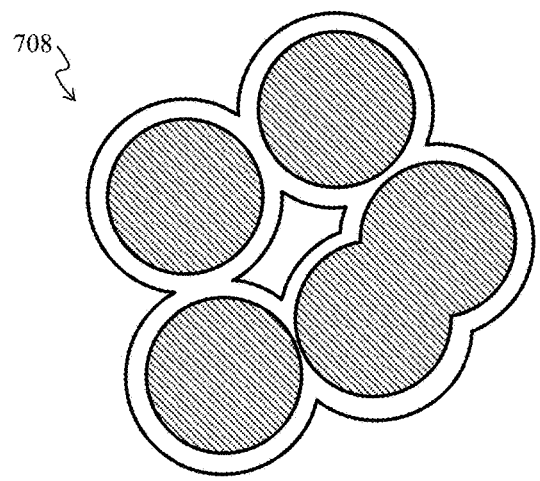

The optical mask can be composed of any suitable type of particles. The particle may comprise a powder, splatter, spatter, or soot. The powder may be the starting material used for the 3D printing. In some embodiments, the particles are comprised of an organic material, such as a polymer material. The particles may comprise elemental metal or a metal alloy. In some embodiments, the particles are comprised of a metal material, such iron, nickel, titanium, chromium, and/or aluminum, or alloys of metals such as steel or Inconel. In some embodiments, the particles are comprised of a metal oxide, such iron oxide, titanium oxide, and/or aluminum oxide. In some embodiments, the particles are comprised of material formed during the printing process. For example, melting of the powder may generate particles near the exposed surface of the powder bed chamber during the printing process, which can become gas-borne and travel into the atmosphere of the processing chamber. In some cases, such particles are continuously generated and expelled into the internal volume of the processing chamber. In some cases, the particles exit the surface of the powder bed as plumes of gas-borne particles. The gas-borne particles can include powder particles that are melted, sintered, or partially melted or sintered. The gas-borne particles may include powder that was not melted. The gas-borne particles can include particles of partially or fully oxidized metal (e.g., metal oxide). In some cases, the gas-borne particles include particles having diameters ranging from about 0.1 micrometers (µm) to about 1 µm. In some cases, the particles comprise smaller particles (e.g., less than 0.1 micrometers µm). FIG. 7A shows a section view of an example soot particle 700. In some cases, the soot particles include about 70% to about 95% metal 702 (e.g., core) and about 5% to about 30% metal oxide 704 (e.g., outer shell) by volume. In some cases, the soot particles include at least about 10% metal oxide by volume. The oxide layer may cover the particle core at least in part. In some cases, the soot particles fuse together in clusters. FIG. 7B shows a section view of an example of a cluster of soot particles 708.

The rate of gas-borne particle production within the processing chamber can depend, in part, on the rate of melting of the powder. Melting may comprise fully melting or partially melting (e.g., sintering). In some applications, the rate of melting is at least about 1 cubic centimeters per hour (cm³/hr), 2 cm³/hr, 3 cm³/hr, 4 cm³/hr, 5 cm³/hr, 10 cm³/hr, 20 cm³/hr, 30 cm³/hr, 40 cm³/hr, 50 cm³/hr, 100 cm³/hr, 150 cm³/hr, 200 cm³/hr, 250 cm³/hr, 300 cm³/hr, 400 cm³/hr, or 500 cm³/hr per laser. The rate of melting may range between any of the afore-mentioned values (e.g., from about 1 cm³/hr to about 500 cm³/hr, from about 5 cm³/hr to about 100 cm³/hr, from about 100 cm³/hr to about 500 cm³/hr, or from about 1 cm³/hr to about 50 cm³/hr) per laser. In some embodiments, the rate of gas-borne particle production is at least about 10 micrograms per second (m/sec), 50 μg/sec, 100 μg/sec, 200 μg/sec, 300 μg/sec, 400 μg/sec, 500 μg/sec, 1 milligram (mg/sec), 5 mg/sec, or 10 mg/sec per laser. The rate of gas-borne particle production may range between any of the afore-mentioned values (e.g., from about 10 μg/sec to about 10 mg/sec, from about 300 μg/sec to about 10 mg/sec, from about 10 μg/sec to about 300 μg/sec, or from about 10 μg/sec to about 5 mg/sec) per laser. Other factors that may influence the rate of gas-borne particle production can include one or more characteristics the power density of the laser beam(s) at the surface of the powder bed. The laser power density can vary depending on the type of laser(s) and desired process conditions for particular applications. In some embodiments, the laser power density ranges from about 100 Kilo Watts per centimeter squared (kW/cm²) to about 30,000 kW/cm² per laser.

In some embodiments, the printing apparatus includes a gas flow system for controlling the rate at which the particles deposit onto the internal surface of the window. FIG. 8 shows a section view of a portion of 3D printer having an enclosure 800 that includes a gas flow system. The gas flow system can include an inlet region (e.g., 825), which includes one or more inlet ports (e.g., 804) that is/are operationally coupled with a gas source. The gas source may provide an inert gas, such as nitrogen and/or argon. The inert gas may be (e.g., substantially) non-reactive (e.g., non-chemically reactive) with the powder during a printing operation. In some embodiments, the inlet region includes a wall (e.g., 805) that separates the inlet region from the internal volume (e.g., 827) of the processing chamber (e.g., 826). The gas can enter the inlet region at the one or more inlet ports and exit the inlet region via one or more inlet openings (e.g., 807). In some embodiments, the one or more inlet ports correspond to the one or more inlet openings (e.g., in case wall 805 does not exist). The inlet region can include any suitable number of inlet ports and/or inlet openings (e.g., at least 1, 2, 3, 4, 5, 6, 7, 8, 9, or 10). In some embodiments, the inlet ports and/or inlet openings correspond to openings within, or comprise: a perforated plate, a screen, a mesh or a gas permeable material.

The gas flow system can include an outlet region (e.g., 806), which includes one or more outlet openings (e.g., 808) for the flow of gas to exit the processing chamber. In some cases, the gas may flow through the processing chamber (at least in part) toward the outlet openings due to a pressure difference between the inlet and outlet regions. In some cases, the one or more outlet openings (e.g., fluidly) coupled one or more pumps that assist movement of the gas through the processing chamber. The pump(s) may include a positive displacement pump (e.g., rotary) and/or a vacuum pump (e.g., Venturi). The one or more outlet openings can be operationally coupled with a gas recycling system that recycles the gas back through the one or more inlet ports (e.g., after filtering out debris). The outlet region can include any suitable number of outlet openings (e.g., at least 1, 2, 3, 4, 5, 6, 7, 8, 9, or 10). In some embodiments, the one or more outlet openings correspond to openings in, or comprise: a perforated plate, a screen, a mesh or a gas permeable material. The inlet and outlet regions can be coupled to any wall of the processing chamber. For example, the inlet and/or outlet regions may be coupled to side walls (e.g., wall 812 or wall 805), a ceiling (e.g., 817), and/or a floor (e.g., 811) of the processing chamber.

In some embodiments, the inlet port(s), inlet opening(s), and/or outlet opening(s) are operationally coupled to one or more valves and/or nozzles. The valve(s) and/or nozzle(s) can control an amount (e.g., on or off) and/or a velocity of the flow of gas into the processing. The valve(s) and/or nozzle(s) may be controlled manually or automatically (e.g., using one or more controllers). The nozzle(s) may include jet (e.g., gas jet) nozzle, high velocity nozzle, propelling nozzle, magnetic nozzle, spray nozzle, vacuum nozzle, Venturi nozzle, or shaping nozzle (e.g., a die). The nozzle can be a convergent or a divergent nozzle. The spray nozzle may comprise an atomizer nozzle, an air-aspirating nozzle, or a swirl nozzle.

According to some embodiments, the inlet and outlet regions are positioned so as to provide a primary flow of gas (e.g., 803) over at least part of the exposed surface (e.g., 810) of the powder bed (e.g., 824). The particles generated at the exposed surface of the powder bed can become entrained with the flow of gas (e.g., 803) and exit the processing chamber via the outlet region. In this way, the primary flow of gas (e.g., 803) can be used to remove some of the gas-borne particles from the processing chamber as they are being generated. In some cases, the inlet region is along one side wall of the processing chamber, and the outlet region is along an opposing side wall of the processing chamber. The openings and/or interior walls of the processing chamber may be configured to facilitate a flow of gas along the surface of the powder bed (e.g., laterally) across a width or length of the processing chamber. In some cases, the inlet region is along the ceiling (e.g., 817) of the processing chamber and the outlet region is along one or more side walls (e.g., wall 812 or wall 805) and/or the floor (e.g., 811) of the processing chamber. The flow of gas can travel toward the powder bed, then travel along the surface of the powder bed before exiting the outlet opening. At least a portion of the primary flow of gas can flow laminarly at least above the surface of powder bed. At least a portion of the primary flow of gas can be (e.g., substantially) parallel to the surface of powder bed. A (e.g., substantially) parallel flow of gas can be in a direction that is about 0 degrees (s), 1°, 5°, 10°, 20°, 30° or 40° relative to the exposed surface of the powder bed and/or the platform. In some embodiments, at least a portion of the primary flow of gas is (e.g., substantially) laminar immediately above the powder bed, for example, just above the exposed surface (e.g., 810).

The primary flow of gas (e.g., 803) can create a secondary flow of gas 818 that recirculates and redistributes some of the gas-borne particles within the processing chamber. An internal shape of the processing chamber may be configured to facilitate the recirculating movement of the gas-borne particles. The openings and/or interior walls of the processing chamber may be configured to facilitate a flow of gas towards the window(s). For example, a wall (e.g., 812 (e.g., a side wall)) of the processing chamber may facilitate movement of the secondary flow of gas (e.g., 818) to a region of the processing chamber proximate to the windows (e.g., 815 and 816). In some embodiments, the secondary flow of gas has a vertical (e.g., upward) component, which is opposite a direction toward the powder bed (e.g., 824). The secondary flow of gas (e.g., 818) can include entrained gas-borne particles, and therefore can bring particles generated at the powder bed to the internal surface of the windows. In this way, secondary flow of gas can correspond to a stream of particles that cumulatively forms optical masks on the windows. The recirculating flow of gas can be referred to as a backflow. In some embodiments, the recirculating flow is in accordance with a turbulent movement. The turbulent movement can include a cyclic (e.g. circulating) movement, a backflow, a vortex and/or a chaotic movement. In embodiments where the windows are recessed within recessed portions (e.g., 820 and 822, respectively), the secondary flow of gas (e.g., 818) can travel within the walls of the recessed portion. The rate of particle deposition onto the windows may depend, in part, on a (e.g., vertical) distance (e.g., 829) between the windows and the surface (e.g., 810) of the powder bed (e.g., 824), the gas flow velocity, and/or the concentration of the particles in the gas flow. In some embodiments, distance (e.g., 824) ranges from about 10 centimeters (cm) and about 100 cm.

Figure 9:
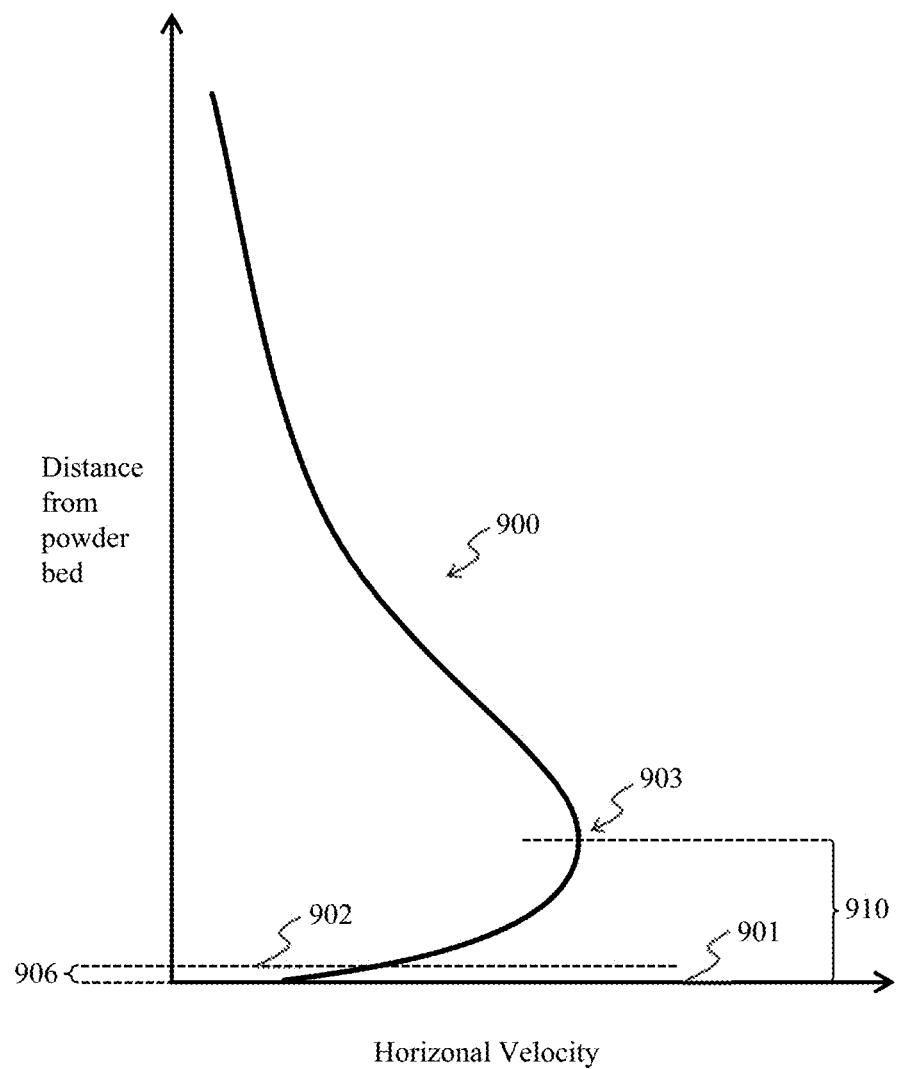
FIG. 9 illustrates a graph indicating gas flow parameters.

The number of particles deposited on the window(s) can depend, in part, on the velocity of the stream of particles at the internal surface of the window(s), which can be controlled by controlling one or more characteristics of the primary flow of gas. In some embodiments, at least a portion of the primary flow of gas is in a direction that is (e.g., substantially) parallel to the exposed surface of the powder bed. In some cases, the primary flow of gas is in a (e.g., substantially) horizontal direction. A substantially horizontal flow of gas can be in a direction that is about 60°, 70°, 80°, 85°, 89° or 90° with respect to a gravity vector. FIG. 9 shows a profile 900 indicating horizontal velocity of a primary flow of gas within a processing chamber as a function of distance from a surface 901 of the powder bed, in accordance with some embodiments. The gas flow can have a peak horizontal velocity (e.g., 903) at a peak velocity height (e.g., 910) in relation to the exposed surface (e.g., 901) of the powder bed. The peak velocity height (e.g., 910) can vary depending on a number of factors including the positions (e.g., heights) of the inlet and outlet openings and/or the lateral distance along the length of the powder bed and/or the platform, and/or the internal shape of the enclosure. In some embodiments, the peak velocity height (e.g., 910) is at least about 5 mm, 6 mm, 7 mm, 8 mm, 9 mm, 10 mm, 12 mm, 15 mm, 20 mm, 25 mm, 30 mm, 40 mm, 50 mm, 60 mm, 70 mm, 80 mm, 90 mm, 100 mm, 120 mm, 150 mm, or 200 mm from the exposed surface of the powder bed and/or platform. The peak velocity height (e.g., 910) can range between any of the afore-mentioned values (e.g., from about 5 mm to about 200 mm, from about 1 mm to about 30 mm, from about 30 mm to about 200 mm, from about 15 mm to about 50 mm, or from about 15 mm and about 100 mm) above the surface of the powder bed and/or platform. The peak velocity height (e.g., 910) can be above a height (e.g., 902) of a boundary layer, which refers to a region immediately above the surface of the powder bed where effects of viscosity may be significant such that horizontal velocity immediately across the powder bed may be relatively low. In some embodiments, the height (e.g., 902) of the boundary layer is at most about 1 mm, 2 mm, 3 mm, 4 mm, 5 mm, 6 mm, 7 mm, 8 mm, 9 mm or 10 mm from the surface of the powder bed.

In some cases, the flow of gas is continuously provided in the processing chamber during a printing operation. In some cases, the flow of gas is provided in the processing chamber during only a portion of the printing operation. In some cases, the velocity of the flow of gas remains (e.g., substantially) the same during the printing operation. In some cases, the velocity of the flow of gas is varied during the printing operation. In some cases, the velocity of the flow of gas is continuous during the printing operation (e.g., and during the build). In some cases, the velocity of the flow of gas is intermittent during the printing operation. For example, a flow of gas may persist during irradiation of the laser, and cease during planarization of the exposed surface of the powder bed. One or more valves of the inlet port(s), inlet opening(s) and/or outlet opening(s) can be used to control the velocity and or amount (e.g., on/off) of the flow of gas. In some cases, the velocity (i.e., volumetric flow rate) of the flow of gas is at least about 0.01 m/s, 0.05 m/s 0.1 m/s, 0.5 m/s, 1 m/s, 2 m/s, 3 m/s, 5 m/s, 10 m/s, 15 m/s, 20 m/s, 30 m/s or 50 m/s. The velocity of the flow of gas can be at most about 0.1 m/s, 0.2 m/s, 0.3 m/s, 0.5 m/s, 0.7 m/s, 0.8 m/s, 1 m/s, 2 m/s, 3 m/s, 5 m/s, 10 m/s, 15 m/s, 20 m/s, 30 m/s, or 50 m/s. The velocity of the flow of gas can be between any of the afore-mentioned values (e.g., from about 0.01 m/s to about 50 m/s, from about 0.01 m/s to about 2 m/s, from about 2 m/s to about 50 m/s, or from about 0.2 m/s to about 2 m/s). The velocity can be measured using any suitable technique(s) and device(s). For example, one or more flow meters (e.g., anemometer, sonar flow meter, air flow meter, particle image velocimetry device, or laser Doppler velocimetry device) may be used to measure the gas flow velocity across one or more prescribed distances above the surface of the powder bed.

In some embodiments, the gas-borne particles within the processing cone region is reduced by allowing a gas (e.g., an inert gas, clean air, or an external atmosphere) to enter the internal volume of the processing chamber. The gas can displace (purge) at least some of the gas-borne particles, thereby reducing its concentration in the processing cone region. In some embodiments, the purging gas enters the processing chamber when the build module is separated from the processing chamber. The purging gas may be allowed to enter before, during or after a printing operation (e.g., between builds). The external atmosphere may be allowed to enter before, during or after a printing operation (e.g., between builds). The entry of the gas may be controlled manually and/or automatically (e.g., using on or more controllers).

Figure 10:
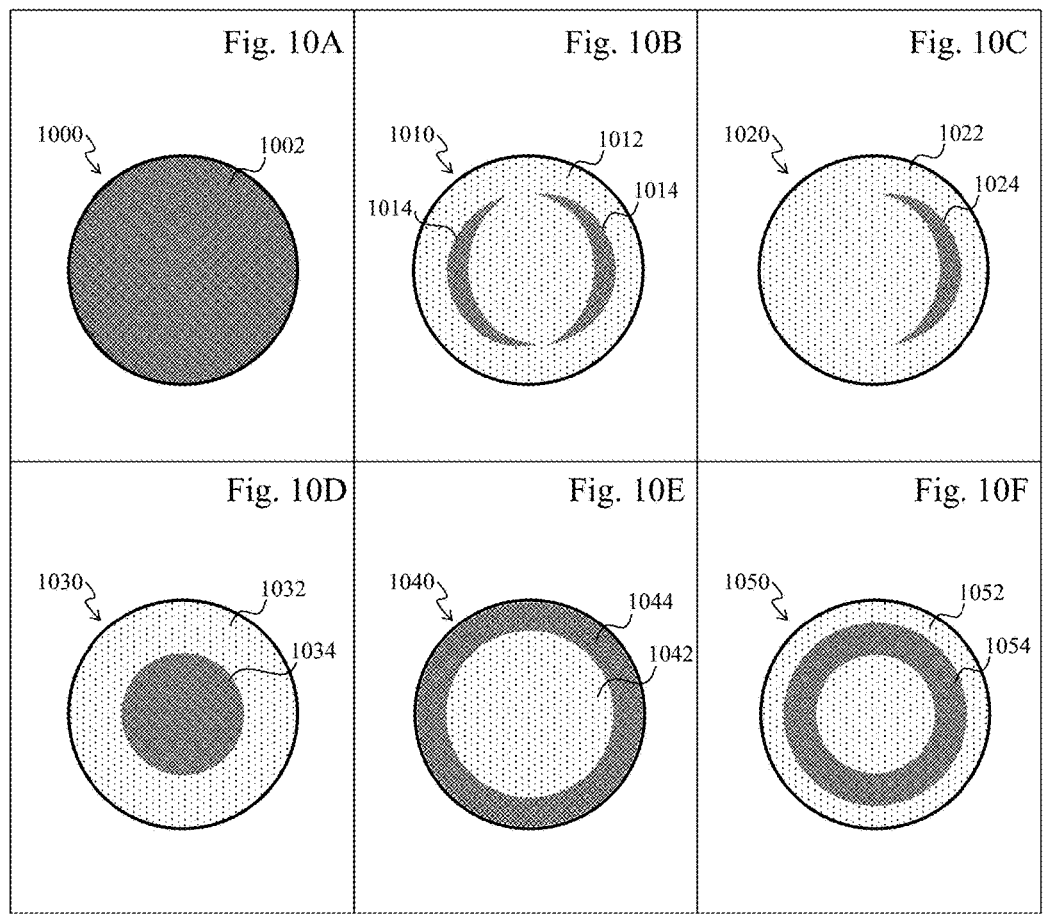
FIGS. 10A-10F schematically illustrate plan views of masks.

In some cases, an amount of energy absorbed by the optical mask changes during a printing operation. For example, the gas flow system can be configured to cause particles to progressively accumulate on the window such that the accumulated particles progressively absorb more light. In some cases, the particles accumulate in a pattern on the window. In some cases, the particles accumulate in a preferred location on the window. In some cases, the particles accumulate randomly in at least a portion of the window. In some cases, the pattern of deposited particles can be detectable by an optical detector (or by human eye) as darker and lighter regions of the optical mask on the window, with the darker regions having a thicker coating of particles and absorbing more laser energy than the lighter regions. FIGS. 10A-10F show aerial perspectives of various optical windows showing examples of optical masks with different patterns, in accordance with some embodiments. FIG. 10A shows window 1000 with an optical mask 1002 having an (e.g., substantially) uniformly distributed thickness of particles. FIG. 10B shows window 1010 with an optical mask having a first portion 1012 with a thinner coating of particles and a second portion 1014 with a thicker coating of particles, where the second portion 1014 corresponds to two crescent-shaped regions of higher absorption. FIG. 10C shows window 1020 with an optical mask having a first portion 1022 with a thinner coating of particles and a second portion 1024 with a thicker coating of particles, where the second portion 1024 corresponds to a single crescent-shaped region of higher absorption. FIG. 10D shows window 1030 with an optical mask having a first portion 1032 with a thinner coating of particles and a second portion 1034 with a thicker coating of particles, where the second portion 1034 corresponds to a circular-shaped region of higher absorption at a center of the window. FIG. 10E shows window 1040 with an optical mask having a first portion 1042 with a thinner coating of particles and a second portion 1044 with a thicker coating of particles, where the second portion 1044 corresponds to a ring-shaped region of higher absorption at a perimeter of the window. FIG. 10F shows window 1050 with an optical mask having a first portion 1052 with a thinner coating of particles and a second portion 1054 with a thicker coating of particles, where the second portion 1054 corresponds to a ring-shaped region of higher absorption at a region between the center and perimeter of the window. It should be noted that the window can have any suitable shape, and is not limited to a round (circular) shape as shown in FIGS. 10A-10F. In some embodiments, the window has a polygonal (e.g., square, rectangular, or triangular), oval or elliptical shape.

The pattern of the optical mask (i.e., regions of lower and higher absorption) can be controlled (e.g., manually and/or automatically, e.g., using at least one controller). For example, the pattern may be controlled by the direction of the stream of particles with respect to the internal surface of the window, and/or structures of (and/or in) the processing chamber that direct the stream of particles at select regions of the window. Returning to FIGS. 6A-6D, for example, the internal surface of the window can be (e.g., substantially) flush with internal surface of the processing chamber (e.g., FIGS. 6A and 6B), or walls of a recessed portion of the processing chamber can partially occlude select portions of the window (e.g., FIGS. 6C and 6D). That is, the walls of the recessed portion of processing chamber can act as baffles that deflect the stream of particles from some regions of the window and/or toward other regions of the window.

The optical mask can modify characteristics (e.g., peak intensity and/or focus) of the laser beam prior to the laser beam reaching the exposed surface of the powder bed. In some embodiments, the optical mask forms on the internal surface of a window that is within the internal volume of the processing chamber. Thus, in some embodiments, the optical mask modifies the characteristics of the laser beam while the laser beam is within the processing chamber.

Figure 17:
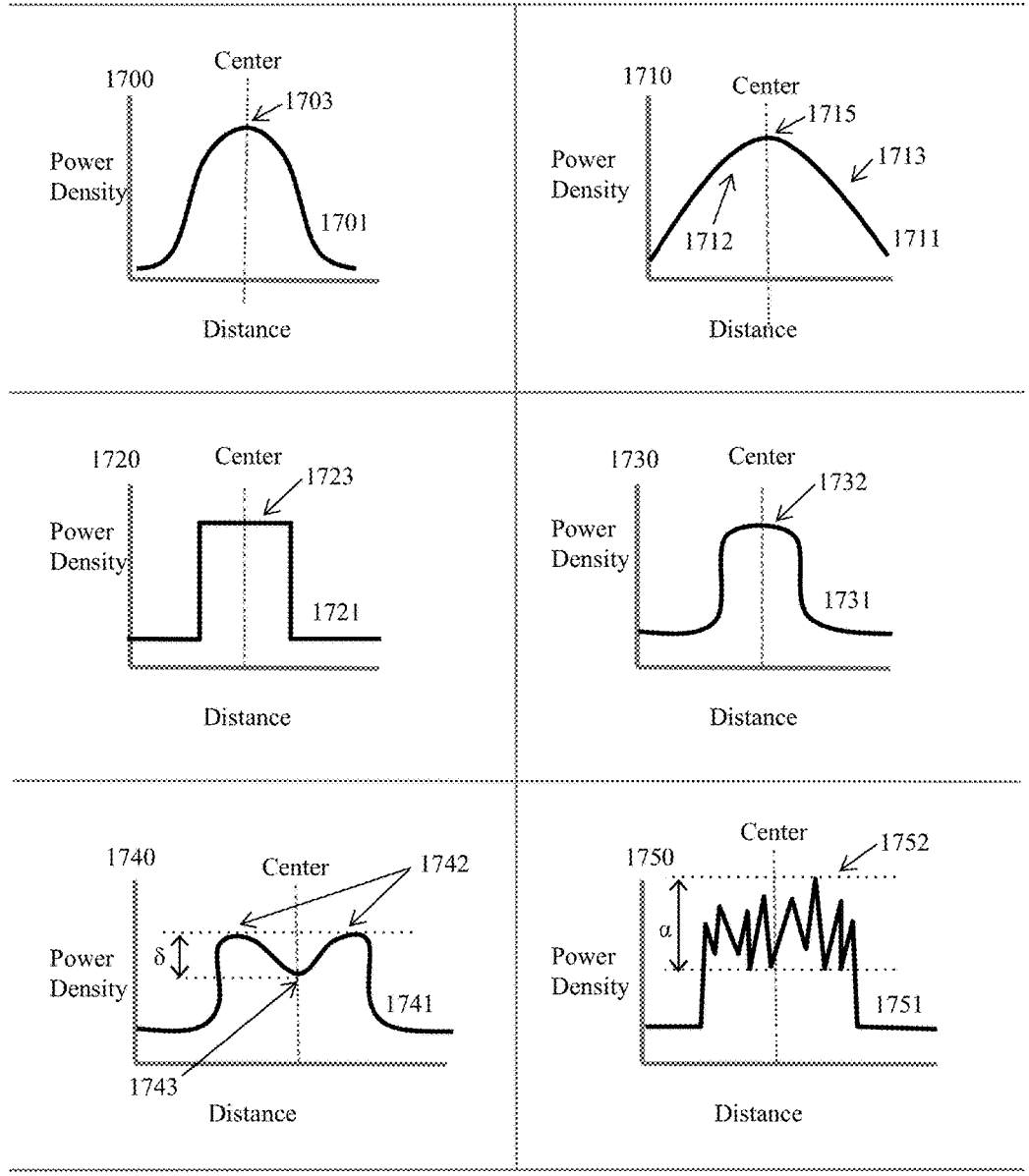
FIG. 17 schematically illustrates power density profiles of various energy beams.

The absorption by the optical mask can vary during printing. When this occurs, the methods can be used to (e.g., predictably) determine the rate in which absorption by the optical mask changes. In some embodiments, these methods include determining a peak power density of the laser beam at the target surface (e.g., exposed surface of the powder bed). The peak power density of the laser beam may vary depending on the spatial distribution of the energy of the laser beam. FIG. 17 show examples of power density profiles at a target surface using various laser beams. Graph 1700 shows a power density profile 1701 using a laser beam having a shape in accordance with a Gaussian curve, where the peak power density 1703 is (e.g., substantially) in the center of the laser beam cross-section. Graph 1710 shows a power density profile 1711 characterized as having a gradually increasing section 1712 and gradually decreasing section 1713, wherein the peak power density 1715 is (e.g., substantially) in the center of the laser beam cross-section. Graph 1720 shows a power density profile 1721 having a peak power density 1723 within a central plateau region of the laser beam cross-section (e.g., top hat laser beam shape). Graph 1730 shows a power density profile 1731 having a peak power density 1732 within a central plateau region (e.g., top hat laser beam shape) that less abruptly transitions between power density maximum(s) and minimum(s) compared to that of profile 1721. Graph 1740 shows a power density profile 1741 having two peak power densities regions 1742 separated by a central region 1743 having a lower power density (by delta "δ"). Graph 1750 shows a power density profile 1751 with a central peak power density region 1752 having a fluctuating power density. The peak power density can correspond to a calculated average power density of the range (alpha "α") of values within the peak power density region 1752.

Figure 11:
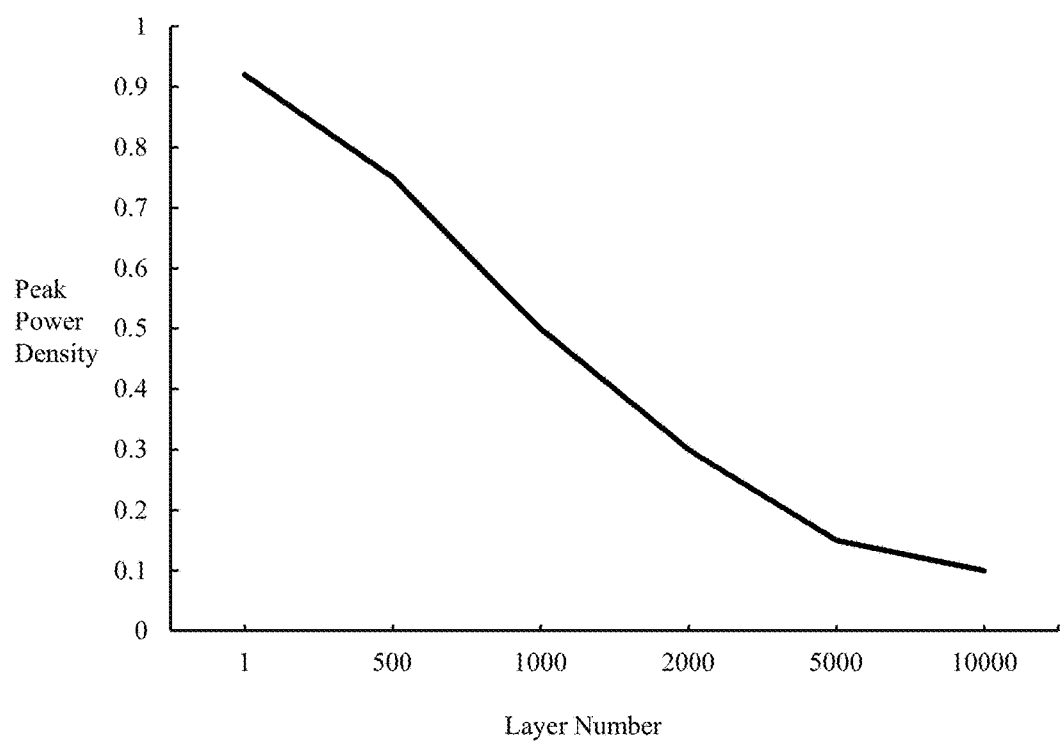
FIG. 11 illustrates a graph indicating laser beam peak power density changes.

The FIG. 11 shows a graph indicating changes in the peak power density (normalized) of a laser beam at a target surface due to a progressively absorbing optical mask, in accordance with some embodiments. The intensity of a laser beam transmitted through a window accumulating an optical mask was measured after melting 1, 500, 1000, 2000, 5000 and 10000 layers of powder. The peak power density of the laser beam at a target surface (e.g., exposed surface of a powder bed) was calculated based on the intensity measurements. The graph of FIG. 11 indicates a relationship between an amount of molten material and an amount of variation of the peak power density due to an evolving optical mask that comprises an accumulating amount of material (e.g., accumulating particles). The evolving optical mask may reduce the peak power density with increasing number of powder layers that are processed (e.g., by the laser beam).

Figure 12A:
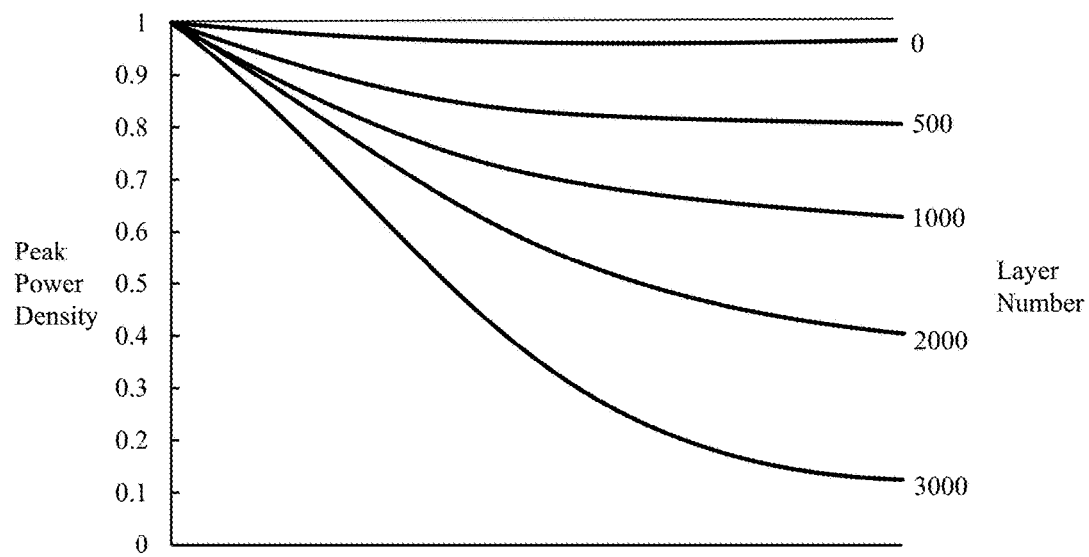
FIGS. 12A and 12B illustrate graphs indicating laser beam power density changes.
Figure 12B:
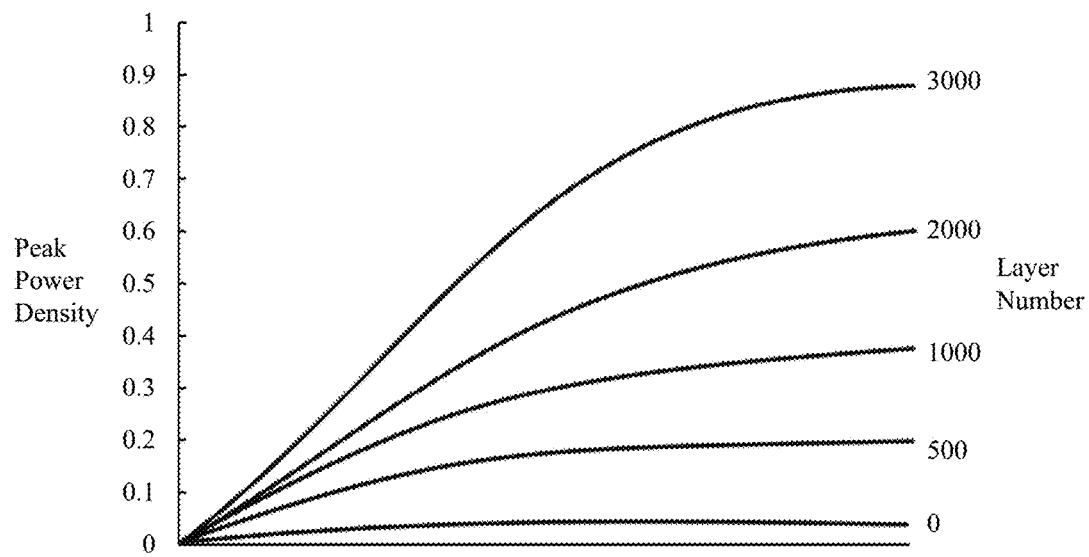

In some embodiments, the peak power density of the laser beam varies during melting of each layer of powder (e.g., portion thereof) and/or varies differently depending on which layer of the 3D object is being printed. Without being bound to theory, this variation may be due to optical distortion influenced by a built-up thermal effects. FIGS. 12A and 12B show example graphs indicating (normalized) peak power density of a laser beam on a target surface over time, in accordance with some embodiments. FIG. 12A illustrates embodiments where the peak power density decreases during the melting of various layers of powder. For example, the peak power density decreases during the printing of layer 500, layer 1,000, layer 2,000 and layer 3,000 of a build. In addition, the peak power density decreases more with each successive layer. For example, the peak power density during printing of layer 1,000 decreases by a greater percentage than during printing of layer 500; the peak power density during printing of layer 2,000 decreases by a greater percentage than during printing of layer 1,000; and the peak power density during printing of layer 3,000 decreases by a greater percentage than during printing of layer 2,000. FIG. 12B illustrates example embodiments where the peak power density increases during the melting of various layers of powder. For example, the peak power density increases during the printing of layer 500, layer 1,000, layer 2,000 and layer 3,000 of a build. In addition, the peak power density increases more with each successive layer. For example, the peak power density during printing of layer 1,000 increases by a greater percentage than during printing of layer 500; the peak power density during printing of layer 2,000 increases by a greater percentage than during printing of layer 1,000; and the peak power density during printing of layer 3,000 increases by a greater percentage than during printing of layer 2,000.

The optical mask can cause laser beam peak power density to vary with respect to a volume of molten material that is formed. The amount of molten material formed during printing of each layer and during an overall printing operation can vary depending on particular applications.

However, laser beam peak power density variation cause by the optical mask can generally increase with the volume of molten material formed. For example, in some embodiments, the optical mask causes the peak power density to vary by at least about 2%, 3%, 4%, 5%, 10% or 15% after forming a first amount of molten material compared to the window without the optical mask. The first amount of molten material can be at least about 2000 cm$^3$, 2500 cm$^3$, 3000 cm$^3$, 2500 cm$^3$, or 4000 cm$^3$. The optical mask can cause the peak power density to vary between any of the afore-mentioned values (e.g., from about 2% to about 15%, from about 2% to about 5%, from about 5% to about 15%, or from about 3% to about 5%) after forming the first amount of molten material compared to the window without the optical mask. In some embodiments, the density of the deposited mask (e.g., particles) on the window after forming the first amount of molten material is at least about 1 nanograms per square millimeters (ng/mm$^2$), 10 ng/mm$^2$, 30 ng/mm$^2$, 50 ng/mm$^2$, 70 ng/mm$^2$, or 100 ng/mm$^2$. In some embodiments, the density of the deposited mask on the window after forming the first amount of molten material ranges between any of the afore-mentioned amounts (e.g., from about 1 ng/mm$^2$ to about 100 ng/mm$^2$, from about 1 ng/mm$^2$ to about 50 ng/mm$^2$, from about 20 ng/mm$^2$ to about 70 ng/mm$^2$, or from about 50 ng/mm$^2$ to about 100 ng/mm$^2$). In some embodiments, the optical mask causes the peak power density to vary by at least about 5%, 6%, 7%, 8%, 9%, 10%, 15% 20% or 30% after forming a second amount of molten material (e.g., powder) compared to the window without the optical mask. The second amount of molten material can be at least about 4500 cm$^3$, 5000 cm$^3$, 5500 cm$^3$, or 6000 cm$^3$. The optical mask can cause the peak power density to vary between any of the afore-mentioned values (e.g., from about 5% to about 30%, from about 5% to about 15%, from about 15% to about 30%, or from about 5% to about 10%) after forming the second amount of molten material compared to the window without the optical mask. The percentages are measured volume per volume. In some embodiments, the density of the deposited mask on the window after forming the second amount of molten material is at least about 50 ng/mm$^2$, 70 ng/mm$^2$, 100 ng/mm$^2$, 150 ng/mm$^2$, 200 ng/mm$^2$, 300 ng/mm$^2$, or 500 ng/mm$^2$. In some embodiments, the density of the deposited mask on the window (density of the mask) after forming the second amount of molten material ranges between any of the afore-mentioned amounts (e.g., from about 50 ng/mm$^2$ to about 500 ng/mm$^2$, from about 100 ng/mm$^2$ to about 500 ng/mm$^2$, from about 50 ng/mm$^2$ to about 250 ng/mm$^2$, or from about 250 ng/mm$^2$ to about 500 ng/mm$^2$).

Once the peak power density reduction is measured over a printing operation or several printing operations, the peak power density reduction can be predicted in subsequent printing operations. This information can be used to predict corresponding changes in the 3D object. For example, a first 3D object can be printed using predetermined process conditions (e.g., predetermined laser beam power and gas flow velocity), where the peak power density evolution over time is measured between melting a number of layers (or volumes) of melted material. The first 3D object is then examined to determine at which layer (or volume, respectively) of melted material that the optical mask reduced the laser beam intensity to a level sufficient for pores and/or surface roughness to occur in the first 3D object. Subsequent (e.g., second, third and fourth) 3D objects having (e.g., predictably located) pores and/or surface roughness can then be printed using the same process conditions. Furthermore, the process conditions (e.g., laser beam power and/or gas flow velocity) can be adjusted to achieve porosity and/or surface roughness at select locations within a 3D object. Moreover, process conditions can be chosen such that optical mask gradually increases light absorption at a predetermined rate, such that corresponding gradual changes in porosity and/or surface roughness manifest in the 3D object.

In some embodiments, the optical mask is removed, or partially removed, from the window during or between printing operations. For example, the optical mask may be removed after it is determined that the laser beam peak power density is reduced to or above a threshold percentage. In some embodiments, the optical mask is removed by cleaning (e.g., removing, wiping or ablating) the particles off the internal surface of the window. The cleaning can be done manually or automatically (e.g., using a controller) during or after the 3D printing. When the cleaning is done during the printing, printing subsequent to the cleaning can be done, where a new optical mask is progressively formed on the internal surface of the window. Repetitive formation of masks during the 3D printing may form repetitive gradually porous structure in the object (e.g., a series of pore graduations in the 3D object).

The 3D printers described herein can include one or more controllers that are operatively coupled with one or more components of the 3D printer, which one or more controllers direct(s) operation of the one or more components. In some cases, the controller(s) control the motion of one or more components. The one or more controllers can be part of a control system. The control system may be able to receive signals relating to the one or more components to be used (e.g., in feedback, feed-forward, open loop, and/or closed loop control schemes). The operations can be before, during and/or after a printing operation. For example, the controller(s) may direct the engagement and/or disengagement of the build module with the processing chamber. The controller(s) may direct transiting the build module to a further processing station (e.g., a polishing, heat treatment, or an unpacking station). The controller(s) may direct movement (e.g., vertical translation) of the platform. The controller(s) can direct the one or more lasers to generate the one or more laser beams (e.g., laser beams). The controller(s) may regulate the one or more aspects (e.g., characteristics) of the laser beams (e.g., wavelength range, laser power, power density, speed, dwell time, intermission time, focus, cross-section, pulsing frequency, and/or irradiating as a continuous beam). The controllers can control the laser source (e.g., by controlling its power). The controller(s) may control the position(s) of the one or more laser beams with respect to the platform (e.g., control the trajectory of the energy beam). For example, the controller(s) may control the optical element(s) (e.g., lenses, mirrors, beam-splitters, and/or scanners). The controller(s) may control the operation of one or more valves of the printer (e.g., for controlling the flow of gas), such as by directing the valve(s) to open or close based on predetermined conditions. The valves may comprise pinch valves. The controller(s) may control the velocity of the flow of gas within the processing chamber (e.g., via the valve(s) or nozzle(s)). The controller(s) may control the operation of one or more sensors of the printer (e.g., for sensing a pressure within the processing chamber), such as by directing the sensors to turn on or off based on predetermined conditions. The sensor may be position sensors to determine positions of one or more of the components (e.g., vertical position of the platform). The controller(s) may control the operation of the layer forming device (e.g., any of its components), such as by directing movement (e.g., translation) of the layer forming device. The controller(s) may control the operation of the one or more pumps, such as by directing the pump(s) to turn on or off based on predetermined conditions. The controller(s) may control locking and/or unlocking of doors and/or windows of the enclosure (e.g., processing chamber). The controller(s) may control aspects of software of the printer (e.g., printing directions). The controller may direct operations based on a control scheme (e.g., feedback and/or feedforward control). The control may direct operations based open loop control and/or closed loop control scheme.

The 3D printer can include any suitable number of controllers, and can be used to control any number of suitable (e.g., different) operations. For example, in some embodiments, one or more controllers is used to control one or more components and another one or more controllers is used to control another one or more components. In some embodiments, a number of controllers are used to control one component. In some embodiments, a controller (e.g., single controller) used to control a number of components. For example, in some embodiments, one or more controllers is used to control the laser(s), and another one or more controllers is used to control aspects of the flow of gas (e.g., velocity). Control may comprise regulate, manipulate, restrict, direct, monitor, adjust, attenuate, maintain, modulate, or manage.

Figure 13:
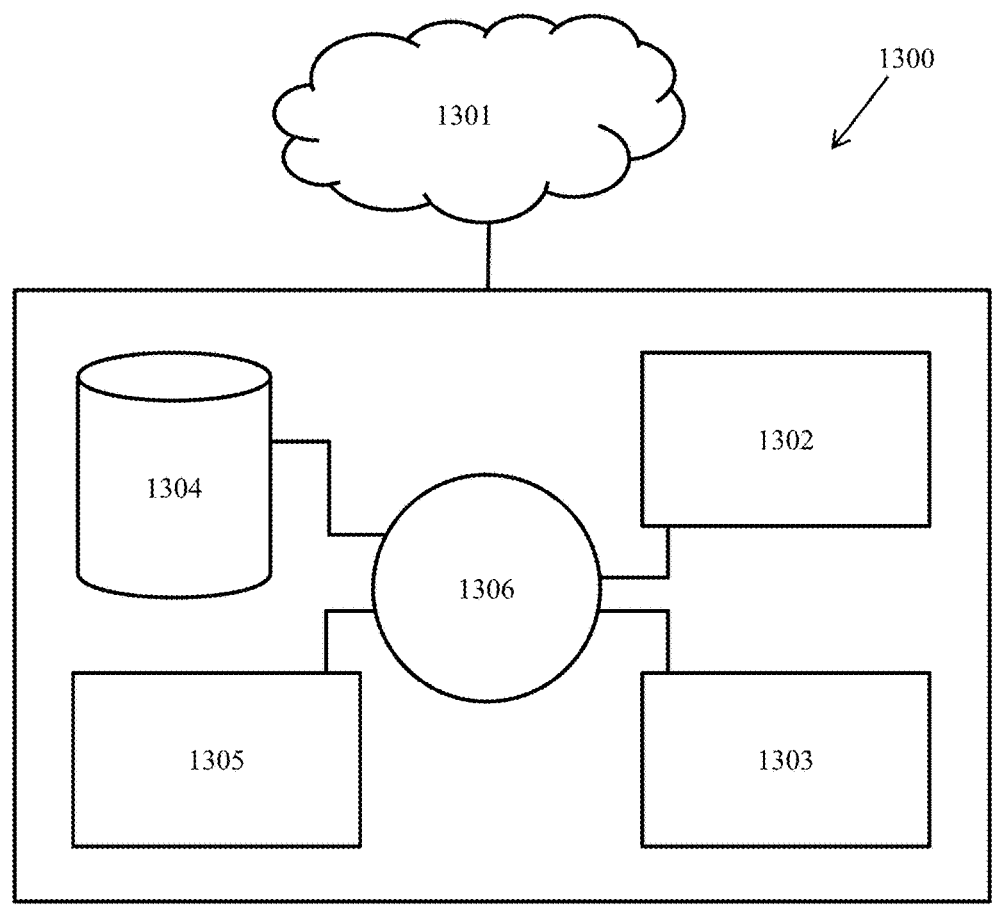
FIG. 13 schematically illustrates a computer system.

The printers described herein can include, or be in communication with, a computer system that may be operatively coupled to the one or more controllers. FIG. 13 schematically illustrates an example computer system 1300 in accordance with some embodiments. The computer system can include a processing unit (e.g., FIG. 13, 1306) (also referred to herein as a "processor," "computer" or "computer processor"), a memory (e.g., FIG. 13, 1302) (e.g., random-access memory, read-only memory, and/or flash memory), an electronic storage unit (e.g., FIG. 13, 1304) (e.g., hard disk), communication interface (e.g., FIG. 13, 1303) (e.g., network adapter) for communicating with one or more other systems, and peripheral devices (e.g., FIG. 13, 1305), such as cache, other memory, data storage and/or electronic display adapters. The memory storage unit interface, and peripheral devices can be in communication with the processing unit through a communication bus, such as a motherboard. The storage unit can be a data storage unit (or data repository) for storing data. The computer system can be operatively coupled to a computer network ("network") (e.g., FIG. 13, 1301) with the aid of the communication interface. Instructions may be stored in the memory and can be directed to the processing unit, which can subsequently program or otherwise configure the processing unit to implement methods described herein. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet. The computer system can communicate with one or more remote computer systems through a network. For instance, the computer system can communicate with a remote computer system of a user (e.g., operator). Examples of remote computer systems include personal computers, tablet computers, telephones, smart phones, or personal digital assistants. Methods as described herein can be implemented by way of machine (e.g., computer processor) executable code stored on an electronic storage location of the computer system, such as, for example, on the memory or electronic storage unit. The machine executable or machine-readable code can be provided in the form of software. During use, the processor can execute the code. In some cases, the code can be retrieved from the storage unit and stored on the memory for ready access by the processor. In some situations, the electronic storage unit can be precluded, and machine-executable instructions are stored on the memory.

The printers described herein can include one or more power supplies to supply power to any of the components. The power can be supplied by a grid, generator, local, or any combination thereof. The power supply can be from renewable or non-renewable sources. The renewable sources may comprise solar, wind, hydroelectric, or biofuel. The power supply can comprise rechargeable batteries.

Example 1

Figure 14A:
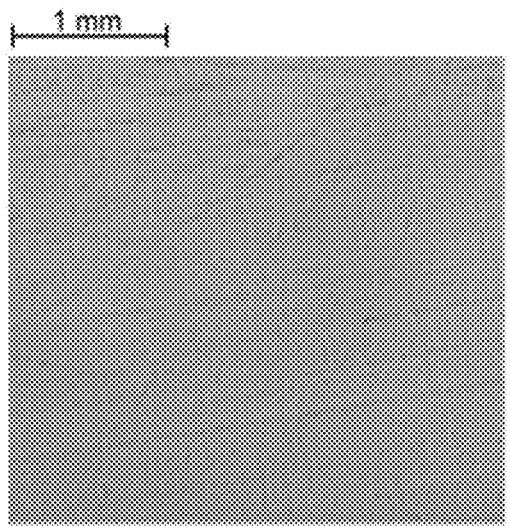
FIGS. 14A-14D show sections of 3D objects.
Figure 14B:
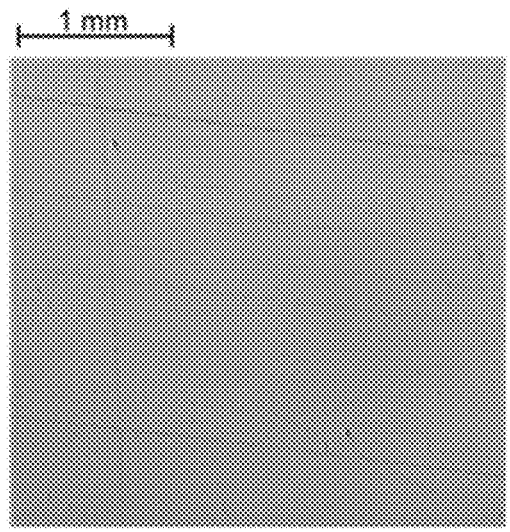
Figure 14C:
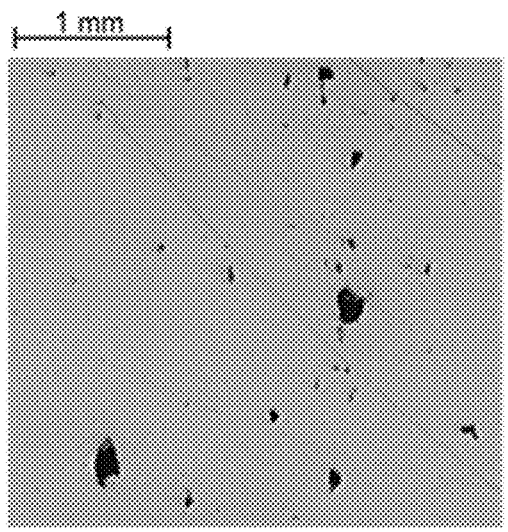
Figure 14D:
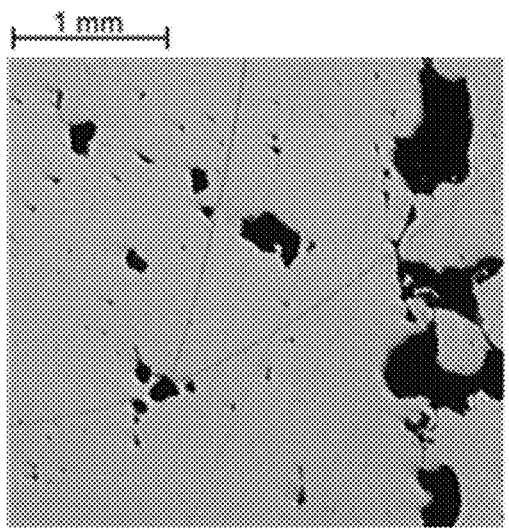

In a 25 cm by 25 cm by 30 cm container at ambient temperature and pressure, 1718 powder of average particle size 35 μm is deposited in a container accommodating a powder bed. The container is disposed in an enclosure. The enclosure is purged with Argon gas. A 1064 diode laser was used to melt a portion of the powder bed and generate four 3D objects. FIGS. 14A-14D show images of the resultant 3D objects using a Nikon EPIPHOT 300 microscope. The object of FIG. 14A was formed using a laser beam fluence 18.8 kW/mm$^2$ and energy density (at the powder bed) of 2.8 J/mm$^2$. The objects of FIGS. 14B-14D were formed using progressively lower laser beam fluence and/or energy density. The objects of FIGS. 14B-14D show increasing amounts of lack of fusion porosity.

Example 2

Figure 15:
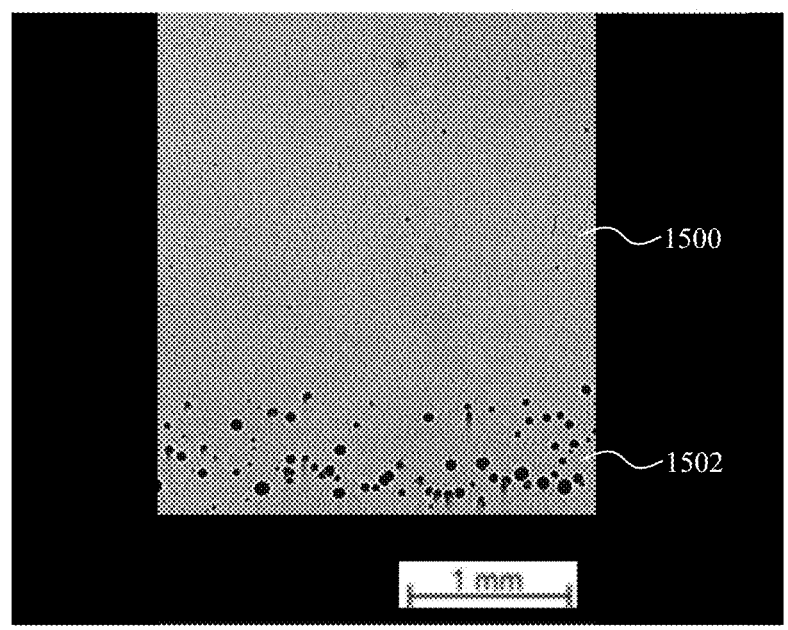
FIG. 15 shows a section of a 3D object.

In a 25 cm by 25 cm by 30 cm container at ambient temperature and pressure, 1718 powder of average particle size 35 μm is deposited in a container accommodating a powder bed. The container is disposed in an enclosure. The enclosure is purged with Argon gas. A 1064 diode laser was used to melt a portion of the powder bed and generate a 3D object. FIG. 15 shows an image of the resultant 3D object using a Nikon EPIPHOT 300 microscope. The 3D object has a first portion 1500 formed using a first laser beam intensity (laser power 240 Watts, spot size 113 micrometers) and a second portion 1502 formed using a second laser beam intensity (laser power 160 Watts, spot size 75 micrometers). The second portion has spherically shaped pores related to keyholing. The second portion has a higher porosity than the first portion of the 3D object.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. An apparatus for printing a three-dimensional object, the apparatus comprising:
    a platform configured to support a powder bed comprising a powder material;
    a layer forming device configured to form multiple layers of the powder material as part of the powder bed, which layer forming device comprises a blade or a roller configured to translate in a first direction over an exposed surface of the powder bed to planarize the exposed surface of the powder bed;
    an elevator operationally coupled with the platform, wherein the elevator comprises a motor configured to translate the platform in a second direction substantially perpendicular to the first direction;
    a processing chamber having an internal volume configured to enclose at least the exposed surface of the powder bed during the printing, wherein the processing chamber includes a ceiling wall;
    a laser configured to generate a laser beam that melts at least a portion of the powder bed to a molten material as part of the three-dimensional object during the printing;
    a window coupled to the ceiling wall of the processing chamber, which window is configured to permit the laser beam to pass therethrough to the internal volume of the processing chamber;
    a gas flow system configured to provide a flow of gas within the internal volume of the processing chamber, which processing chamber comprises at least one internal wall configured to direct the flow of gas in the internal volume to provide a stream of particles to progressively deposit as an optical mask on an internal surface of the window, which optical mask progressively absorbs energy from the laser beam and modifies a peak power density of the laser beam during melting of at least one of the multiple layers of the powder material, wherein the optical mask causes the peak power density of the laser beam to vary by (i) at least 5% after forming 3,000 cm$^3$ of the molten material as compared to a variation of the peak power density of the laser beam transmitted through the window excluding the optical mask, and (ii) at least 10% after forming 5,000 cm$^3$ of the molten material as compared to the variation of the peak power density of the laser beam transmitted through the window excluding the optical mask;
    a galvanometer scanner configured to translate the laser beam across the exposed surface of the powder bed in accordance with a path, wherein the galvanometer scanner is external to the internal volume of the processing chamber; and
    one or more controllers operationally coupled with the elevator, the layer forming device and the galvanometer scanner, which one or more controllers is configured to direct (a) the elevator to translate the platform in the second direction, (b) the layer forming device to translate in the first direction, and (c) the galvanometer scanner to translate the laser beam across the exposed surface of the powder bed in accordance with the path.

2. The apparatus of claim 1, wherein the optical mask causes the peak power density of the laser beam to increase during at least part of the melting of the at least one of the multiple layers of the powder material.

3. The apparatus of claim 1, wherein the optical mask causes the peak power density of the laser beam to decrease during at least part of the melting of the at least one of the multiple layers of the powder material.

4. The apparatus of claim 1, wherein during the printing, the apparatus is configured to melt at least about five (5) cubic centimeters of the powder material per hour.

5. The apparatus of claim 1, wherein the variation of the peak power density of the laser beam in accordance with one or both of (i) and (ii) is associated with forming regions of (a) porosity within the three-dimensional object and/or (b) surface roughness on the three-dimensional object.

6. The apparatus of claim 1, wherein the one or more controllers is operatively coupled with the gas flow system, which one or more controllers is configured to control a velocity of the stream of particles.

7. The apparatus of claim 6, wherein the one or more controllers is configured to control the velocity of the stream of particles in real time during the printing of the three-dimensional object.

8. The apparatus of claim 1, wherein the apparatus is configured generate at least about five (5) milligrams per second (mg/sec) of gas-borne particles during the printing.

9. The apparatus of claim 1, wherein the gas flow system is configured to facilitate a turbulent movement of the stream of particles in the internal volume of the processing chamber.

10. The apparatus of claim 9, wherein (I) a wall of the processing chamber and/or (II) a baffle in the processing chamber, is configured to facilitate the turbulent movement of the stream of particles.

11. The apparatus of claim 10, wherein (III) the wall of the processing chamber and/or (IV) the baffle in the processing chamber, is normal or substantially normal to the internal surface of the window.

12. The apparatus of claim 9, wherein the gas flow system is configured to facilitate the turbulent movement directly adjacent to the window.

13. The apparatus of claim 9, wherein the window is in a recessed portion of the processing chamber, wherein a side wall of the recessed portion causes the turbulent movement of the stream of particles to preferentially deposit particles on a select region of the internal surface of the window.

14. The apparatus of claim 1, wherein the gas flow system is configured to provide the flow of gas at a substantially constant velocity within the processing chamber during at least the melting of the at least one of the multiple layers of the powder material.

15. The apparatus of claim 1, wherein the flow of gas has a velocity ranging from about 0.2 to about 2 meters per second (m/sec).

16. The apparatus of claim 1, wherein particles within the stream of particles comprise at least about 10% metal oxide by volume.

17. The apparatus of claim 1, wherein the flow of gas has a peak horizontal velocity at a distance of about 15 to about 100 millimeters (mm) above the exposed surface of the powder bed.

18. The apparatus of claim 1, wherein the gas flow system comprises one or more inlet openings and one or more outlet openings, wherein the one or more inlet openings or the one or more outlet openings are operatively coupled to, or comprise: a perforated plate, a screen, a mesh, or a gas permeable material.

19. The apparatus of claim 1, wherein the gas flow system comprises one or more inlet openings and one or more outlet openings, wherein a primary portion of the flow of gas flows directly from the one or more inlet openings to the one or more outlet openings, wherein the primary portion of the flow of gas is in a vertical or substantially vertical direction.

20. The apparatus of claim 1, wherein the gas flow system comprises one or more inlet openings and one or more outlet openings, wherein a primary portion of the flow of gas flows directly from the one or more inlet openings to the one or more outlet openings, wherein the primary portion of the flow of gas is in a horizontal or substantially horizontal direction.

21. The apparatus of claim 1, wherein the gas flow system comprises one or more inlet openings and one or more outlet openings, wherein the one or more inlet openings are within an inlet region coupled to the ceiling wall of the processing chamber, and wherein the one or more outlet openings are within a side wall or a floor of the processing chamber.

22. The apparatus of claim 1, wherein the gas flow system comprises one or more inlet openings and one or more outlet openings, wherein the one or more inlet openings are within a first side wall of the processing chamber, and wherein the one or more outlet openings are within a second side wall or a floor of the processing chamber.

23. The apparatus of claim 1, wherein the laser is configured to generate the laser beam having an average power density ranging from about 100 kilowatt per centimeter squared ($kW/cm^2$) to about 30,000 $kW/cm^2$, which average power density is measured at the exposed surface of the powder bed.

24. The apparatus of claim 1, wherein during the printing, the laser is configured to melt the powder material at a rate from about 1 cubic centimeter per hour ($cm^3/hr$) to about 50 $cm^3/hr$.

25. The apparatus of claim 1, wherein a variation of the peak power density of the laser beam in accordance with one or both of (i) and (ii) is associated with forming a first region of the three-dimensional object having a first porosity of greater than about 1% and a second region of the three-dimensional object having a second porosity of about 1% or less.

26. The apparatus of claim 1, wherein a variation of the peak power density of the laser beam in accordance with one or both of (i) and (ii) is associated with forming a first region of the three-dimensional object having a first surface roughness of greater than about 50 micrometers and a second region of the three-dimensional object having a second surface roughness of about 50 micrometers or less.

27. The apparatus of claim 1, wherein the laser is configured generate the laser beam having a laser power density ranging from about 100 Kilowatts per centimeter squared ($kW/cm^2$) to about 30,000 $kW/cm^2$, at the exposed surface of the powder bed.

28. The apparatus of claim 1, wherein a distance between the internal surface of the window and the exposed surface of the powder bed ranges from about 10 centimeters (cm) to about 100 cm.

29. The apparatus of claim 1, wherein the at least one internal wall comprises the ceiling wall.

30. The apparatus of claim 1, wherein the at least one internal wall comprises a side wall or a floor of the processing chamber.

* * * * *